(12) United States Patent
Chiluvuri

(10) Patent No.: US 8,392,877 B1
(45) Date of Patent: Mar. 5, 2013

(54) SYSTEM AND METHOD OF APPLICATION DEVELOPMENT USING REPLACEABLE SELF-CONTAINED COMPONENTS (RSCCS)

(76) Inventor: Raju Chiluvuri, Hyderabad (IN)

(*) Notice: Subject to any disclaimer, the term of this patent is extended or adjusted under 35 U.S.C. 154(b) by 421 days.

(21) Appl. No.: 12/819,231

(22) Filed: Jun. 21, 2010

Related U.S. Application Data

(60) Continuation-in-part of application No. 12/493,135, filed on Jun. 26, 2009, which is a continuation-in-part of application No. 11/465,511, filed on Aug. 18, 2006, now Pat. No. 7,840,937, which is a division of application No. 10/951,066, filed on Sep. 27, 2004, now Pat. No. 7,827,527.

(60) Provisional application No. 60/544,212, filed on Feb. 12, 2004, provisional application No. 61/082,477, filed on Jul. 21, 2008.

(51) Int. Cl.
G06F 9/44 (2006.01)
(52) U.S. Cl. .................................. 717/107; 717/106
(58) Field of Classification Search .................. 717/100, 717/106–109
See application file for complete search history.

(56) References Cited

U.S. PATENT DOCUMENTS

| 6,237,135 B1* | 5/2001 | Timbol | 717/107 |
| 6,490,719 B1* | 12/2002 | Thomas | 717/107 |
| 2002/0108099 A1* | 8/2002 | Paclat | 717/102 |

OTHER PUBLICATIONS

Clemens Szperski, Component Software Beyond Object-oriented programming, 2003, Second Edition, entire document, ACM Press.

* cited by examiner

Primary Examiner — Wei Zhen
Assistant Examiner — Qing Chen
(74) Attorney, Agent, or Firm — Prakash Nama

(57) ABSTRACT

A method and system for creating a software application code including multiple Replaceable Self-Contained Components (RSCCs) is disclosed. In one embodiment, the method includes creating each RSCC by instantiating and initializing an object instance of a Replaceable Component Class (RCC) that substantially encapsulates construction code of a Self-Contained Component (SCC), creating an RSCC registration module which resides in each of a first set of RSCCs for registering each of the services provided by each of the first set of RSCCs with the service registration object, and creating an RSCC service finding module which resides in each of a second set of RSCCs for consuming each of the services provided by one of the first set of RSCCs for facilitating communication between the RSCCs in the software application code upon an event selected from the group consisting of a user event, a sensor event, a timer event, and a data/state change event.

24 Claims, 42 Drawing Sheets

---

Create multiple large RSCCs using RCCs in an application, where each large RSCC is included by instantiating and initializing an object instance of a RCC, which substantially encapsulates construction code of a SCC

1351

1352

Create communication code to enable inter-component communication or collaboration between the RSCCs, for example by properly coupling each of the required services of each of the service consuming RSCCs with a service providing RSCCs that provides the required service The following figure shows an application containing 3 self-contained components: A stock quote Table, a line chart for intraday stock movement and a line chart for one year stock movement.

▲ A component is self-contained if it is also possible to implement its construction code in order to operate the component independently outside its container application.

▲ It is possible to implement construction code of each of the 3 components in order to operate it as an independent application, so each of the components is self-contained.

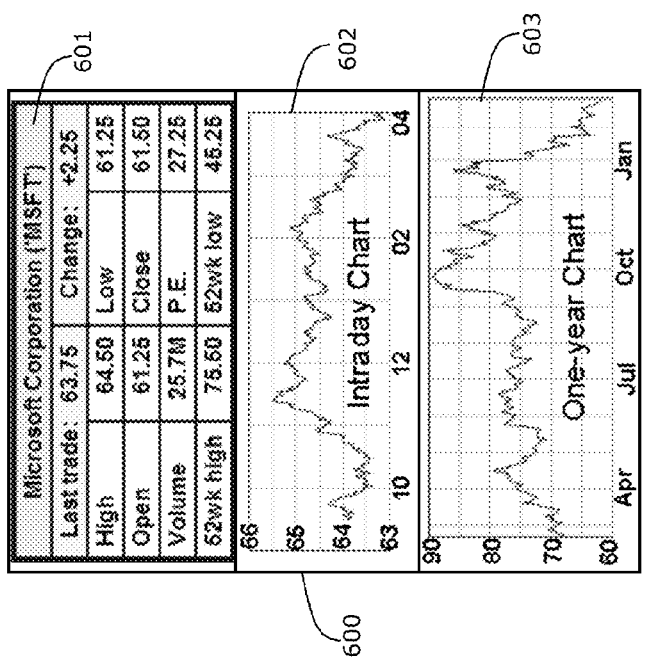

FIG. 6a

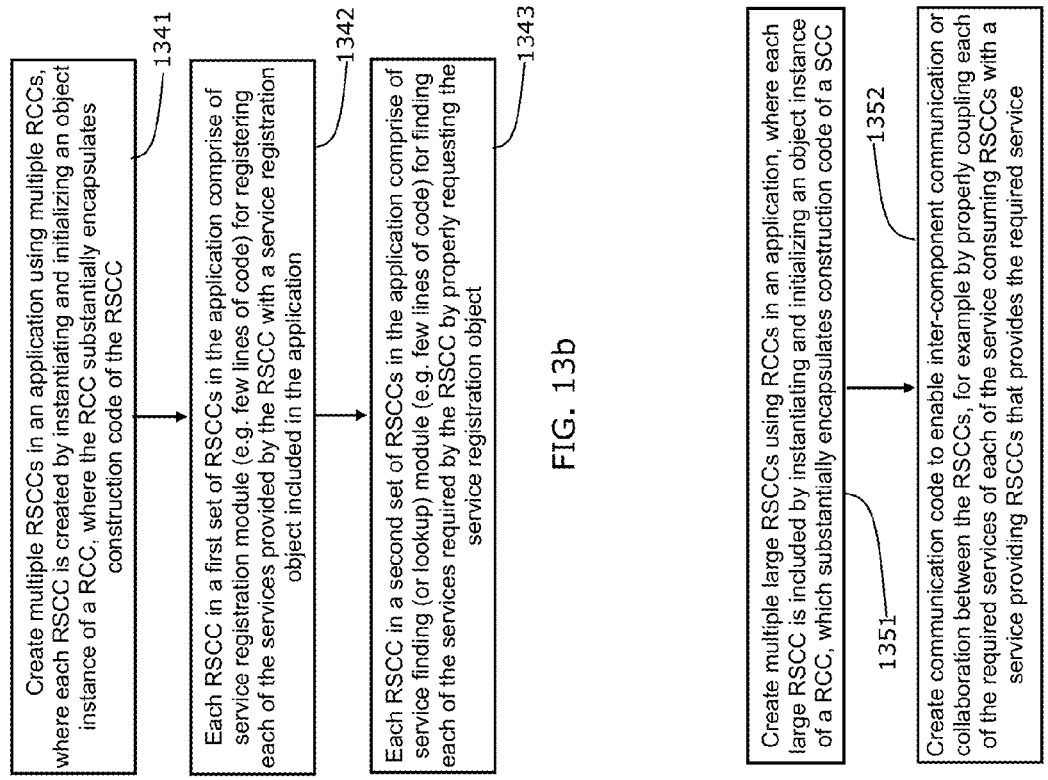

SYSTEM AND METHOD OF APPLICATION DEVELOPMENT USING REPLACEABLE SELF-CONTAINED COMPONENTS (RSCCS)

CROSS-REFERENCE TO RELATED APPLICATIONS

This application is a continuation-in-part application of patent application Ser. No. 12/493,135, filed Jun. 26, 2009, now pending, which is a continuation-in-part application of U.S. patent application Ser. No. 11/465,511, field Aug. 18, 2006, now U.S. Pat. No. 7,840,937, which is a divisional application of U.S. patent application Ser. No. 10/951,066, filed Sep. 27, 2004, now U.S. Pat. No. 7,827,527, which claims priority from Provisional Patent Application Ser. No. 60/544,212, filed Feb. 12, 2004; U.S. patent application Ser. No. 12/493,135 also claims priority from Provisional Patent Application Ser. No. 61/082,477, filed Jul. 21, 2008, the entire contents of all of which are hereby incorporated herein by reference in their entireties.

COPYRIGHT NOTICE AND USE PERMISSION

A portion of the disclosure of this patent document contains material that is subject to copyright protection. The copyright owner has no objection to the facsimile reproduction of the patent document or the patent disclosure by anyone as it appears in the U.S. Patent and Trademark Office patent file or records, but otherwise reserves all copyright rights whatsoever. The following notice applies to the software and data as described below and in the drawings hereto: Copyright 2009, Raju Chiluvuri, All Rights Reserved.

FIELD OF THE INVENTION

Embodiments of the present invention relate to application development, and particularly to software development and method for modularization of code of the software applications. This invention discloses a new kind of components called RSCCs (Replaceable Self Contained Components) and methods for creating the RSCCs, methods for building each of the applications by including multiple RSCCs and methods for coupling the RSCCs to allow communication or collaboration between the RSCCs included in the application.

BACKGROUND OF THE INVENTION

The world-wide-web (WWW) interface protocol over Internet provides a convenient mechanism for distributing information from web servers to web users on the client computers which are connected to the web servers through Internet or private networks.

When a web server receives a request from a client computer for a dynamic web page, it runs the Common Gateway Interface (CGI) (e.g., Java Server Pages "JSP" or Servlet) associated with the URL and passes the browser information and other parameters to the CGI. This executable CGI may access and retrieve data stored on the web server or other connected computers to generate a web page (which includes application code to render the web page). When the data in the real world is changed or updated, the image view of the web page necessarily changes in some aspects.

Computer applications often use graphics to present information and use Graphic User Interface (GUI) as the interface between computers and their users. While text interface is still in use, it is not favored. GUI is characterized by use of menu selection lists, popup-windows, and visual-presentation components such as interactive charts, dials, trees, graphs and maps. Because of the intensive use of graphics, it may require considerable effort to develop and modify the contents of the web pages.

Commercially available web browsers support many presentation technologies such as Dynamic Hypertext Markup Language (DHTML), Extensible Hypertext Markup Language (XHTML) Document Object Model (DOM), JavaScript, Cascading Style Sheets (CSS), eXtensible Stylesheet Language (XSL), three-dimensional modeling language (e.g., X3D), Silverlight/XAML (eXtensible Application Markup Language), MXML/Flash and Scalable Vector Graphics (SVG), Synchronized Multimedia Integration Language (SMIL), and XForms. The use of such a combination of programming languages makes programming more complex. To present a component on a web page, the JSP/Servlet must create the code to present the component and include the code in the file of the web page. Programming for Internet applications requires experience in both Java (or equivalent languages) for the server and DHTML/JavaScript and SVG/XAML (or equivalent languages) for the client computer. It might be necessary to create and debug several hundreds to thousands of lines of code to present a web page.

In addition, different browsers require slightly different DHTML/JavaScript code instructions to present a component, and therefore, different application code must be developed for different browsers and devices to present the same component. Each browser supports a few unique HTML tags or inbuilt JavaScript functions, which are not understood by browsers from other vendors or browser of older versions. To develop a more complicated web application, application developers often need to write code in appropriate languages and presentation technologies such as DHTML, DOM, JavaScript, CSS, XML, XSL, SVG and XAML for each specific browser (or plug-in viewer).

A web page or web application may include graphical user interface ('GUI') subcomponents such as interactive charts, graphs, maps, dials, menus, check boxes and dropdown lists. The web page requires many lines of markup code (e.g. SVG, MXML/FXG or XAML) and programming code (e.g. JavaScript, ActionScript or C#) for presenting each of the GUI subcomponents. This type of web pages are referred to as Rich Internet Applications (RIA) because code for web pages is in many ways similar to the desktop GUI applications developed in programming languages such as Visual Basic.

To present a GUI component in a web page, the web page must include the necessary application code for the GUI component. The application code corresponding to each GUI component includes markup code such as SVG elements and JavaScript code. SVG elements such as circle, ellipse, rect, line, text, polyline, polygon and path can be used in web page to draw two-dimensional or three-dimensional visual shapes such as charts, check boxes or maps. JavaScript code is implemented to manipulate and redraw SVG elements, and, thus, update GUI components reflecting a change in data for the GUI components or the state of the GUI components. In some implementations, JavaScript code is used to draw visual elements in lieu of SVG markup language instructions. So it is possible to present a visual component without using markup language.

Furthermore, it is necessary for subcomponents to communicate with the container component and with each other. Therefore, the container component must have additional communication code, which allows the subcomponents to exchange data with the container component and with each other.

Finally, information critical to business decisions constantly changes in real-time, and, therefore, updating web pages by rewriting presentation code of the web page by conventional methods is neither realistic nor economical. Also it may be desirable to customize a few components according to the preferences or profile of each of requesting users. Various attempts are made to speed up the process of application development and maintenance in this and other similar environments for same or similar reasons.

A method of reuse of image data is described in U.S. Pat. No. 6,539,420 B1, filed Mar. 25, 2003, titled "Distribution Mechanism for Reuse of Web Based Image Data", granted to Fields et al. This method describes a technology of reuse of image data in a distributed computer network at a web server in response to a request from a client browser for a web page. A template defining a composite image is retrieved and at least one image object identified by the template is retrieved from another location to the web server followed by a given image transform and the transformed image object being mapped into the composite image according to the template. The method is limited to web-based image data.

A method for creating graphical programs is described in U.S. Pat. No. 6,053,951, filed on Apr. 25, 2000, titled "Man/Machine Interface Graphical Code Generation Wizard for Automatically Creating MMI Graphical Programs", granted to McDonald et al. This application describes a computer-implemented system and method for automatically generating graphical code in a graphical programming system. The graphical code generation wizard selects a graphical code template stored in the computer memory in response to the control arranged by the user and configures the graphical code template with the parameter values selected by the user, and then creates an association, which is able to be unlocked by the user, between the control and the configured graphical code.

A method for automatic web page creation of an organizational directory for use in an Internet and Intranet environment is disclosed in U.S. Pat. No. 5,940,834, filed on Aug. 17, 1999, titled "Automatic Web Page Generator", and granted to Debbie Pinard and Richard Deadman. The web page directory is created from data stored in the directory application component of the web page generator and, after being placed on a web server, allows any individual who has network access to the web server offering the web page to view the directory information in a web page format. This method is not intended to create any web component.

A method for building templates is disclosed in U.S. Pat. No. 6,093,215, filed on Jul. 25, 2000, titled "Method and Apparatus for Building Templates in a Component System", and granted to Jeffrey J. Buxton and Eric S. Portner. A component customization and distribution system in an object oriented environment provides a template builder utility which enables selection of a base component, modification to the state of persistent data of the base component, storing of the modification to the persistent data of the base component into a template format, and user-password locking of the template. The template builder utility further enables the generation of user-defined instructions as part of the template and generation of a template distribution pack, for which the generation methods are also disclosed.

There is still a need for a system and method for developing components efficiently and a method for using pre-built components to build larger components or applications. Also, there is a need for a system and method for modularizing a larger portion of code created for each of the software applications into modules or components having higher degree of autonomy, where such modules or components also often require less effort to adapt to evolving user/business needs and require less effort for code reuse (if similar component or module is required in another application).

SUMMARY OF THE INVENTION

In one aspect, the present invention discloses a method, system and computer program product to create application code of an application component using code-generating programs: component code generator (CCG), reusable CCG for GUI components (GUI-CCG), and application component code generator (ACCG). When a code-generating program built for a component is run on the first platform (the server), it generates proper component code and sends the code to a second platform for rendering. The first platform and the second platform (the client) may reside on same computer hardware or connected through LAN, WAN or Internet.

A CCG of a component, upon being executed, generates the code of the component. The CCG is preferably implemented in Java class derived from an abstract base class AgileTemplate, which includes an abstract code-generating method (CGM). In the alternative, the CCG is implemented in its own class. A CCG is pre-built for any of the commonly useful basic components such as GUI controls, dials, trees, maps, and charts (e.g., A GUI CCG class for pie chart and a GUI CCG class for line chart). When a class object of a GUI CCG is instantiated and initialized on the first platform, and the CGM of the instantiated object is called, the CGM generates the component code. Therefore, by using a reusable GUI CCG, it is unnecessary to write the presentation code for a basic component line by line. Reusable GUI CCGs are pre-built and their objects are used in a container CCG for generating the presentation code of subcomponents.

An ACCG is also a special CCG except that the ACCG also contains code to implement application logic (also known as business logic). The ACCG may also include code for accessing data from data sources such as Relational Database Management System ("RDBMS"). The ACCG is preferably derived from an abstract base class AgileTemplate. Alternatively, the ACCG is implemented in its own class or in non-class. Like a CCG, when the CGM of an instantiated ACCG object is called, the ACCG generates the presentation code of the component. When the ACCG is implemented in class, it is used by a container CCG to build a subcomponent.

The code of application logic in an ACCG may implement plural variables and a method for retrieving application data from suitable data sources or remote data servers by using a protocol such as Service Oriented Architecture (SOA). The ACCG may include necessary code or method for retrieving application data from data sources for processing in real time. The method is called before the calling of the CGM of the ACCG. The method is called from within the CGM. After the application data is updated, the CGM of the ACCG then generates its component code using updated application data. If the ACCG uses reusable GUI CCG objects as its subcomponents, updated application data can be used directly to initialize reusable GUI CCG objects. The CGM of the ACCG then generates its component code using the GUI CCG objects. Therefore, the presentation code of the component always reflects the application data at the time of running the ACCG.

If an application contains plural GUI components, it is often desirable that the components collaborate or exchange data with each other. Each communication link is normally in the form that, upon occurrence of an event such as mouse-click or state-change in a first component, the first component calls a target service method of a second component. The application must contain what we call communication code that allows the two components to collaborate and exchange data.

Since both components in the application code are generated by respective CCGs on server, the CCGs must be programmed, in the development stage, with a mechanism for generating the necessary communication code. Therefore, a first CCG not only implements CGM for generating the code of its component but also implements one or more coupling-methods, each of which is called for inputting a name of a callback function to be invoked by its component upon an event. Second component not only implements CGM for generating the code of its component but also implements one or more coupling-methods, each which is called to get the name of a target service function implemented in the code of its component. Both of the coupling-methods run only on a server and are implemented to "integrate" two application components because they are implemented to generate inter-component communication code in a resultant application. The resultant communication code allows two components or subcomponents to collaborate with each other on the second platform.

When a container CCG uses two subcomponent CCGs to generate the application code, the CCG also implements (i) the code for importing or inputting CCGs as subcomponents, (ii) the code for instantiating or initializing CCG objects of the subcomponents, (iii) the code for calling the coupling-method of one CCG object for getting the name of the target service method, (iv) the code for calling the coupling-method of the other CCG object for setting the callback name, and (v) the code for calling the CGM of the CCG objects. When the container CCG is run, it calls the CGMs of the CCG objects to generate the code for each of the subcomponents, places the code in proper location in the resultant application, and creates necessary communication code.

Some special code referred to as code of integration logic in the container CCG is responsible for generating the communication code, which is used by the application component to establish communication between the component and subcomponents or between two subcomponents. The code of integration logic includes one or more of the following in any order (1) the code for calling the coupling-method of the CCG object of a subcomponent to get information such as the name of the target service method and an event trigger for the target service method, (2) the code for choosing a callback name and inputting the callback name to the subcomponent's CCG for generating part of communication code in the application code, (3) code for calling a coupling-method which gets information such as the name of a target service method implemented in an external application component and code for use in writing the communication code, and (4) code for calling a coupling-method of a CGG object for inputting information such as the name of the service method of an external application component into a CCG object for use in generating communication code. The communication code allows container component, subcomponents, and external components in the resultant application to exchange data and work collaboratively on the client.

If it is required to create code for a web page (a container component) that presents two GUI components (e.g. a line chart and pie chart), respective GUI CCG classes, a reusable GUI CCG for line chart and a reusable GUI CCG for pie chart, is used to instantiate and initialize a CCG object for each of the GUI components. Each of the CCG objects is used to generate application code to present each of the components.

For example, the method for presenting a pie chart by using a reusable GUI CCG can be developed in two phases. First, a reusable GUI CCG class is designed which can accept data as input at run time and uses the data to generate application code for presenting a pie chart. The reusable GUI CCG class includes (1) a method for generating component code including the code for presenting the chart image, and (2) one or more coupling-methods, which run on the server, for setting name of a callback method for the component to call upon an event or getting name of the service method of the component, which is generated by the reusable GUI CCG and sent to the client. Second, a CCG or JSP for a container component is designed, which includes (1) code for instantiating and initializing an object of the reusable GUI CCG, (2) code for calling the reusable GUI CCG's method for generating component code, and (3) code of integration logic, which calls the coupling-methods of the reusable GUI CCG for setting a name of callback method to be invoked by GUI component upon an event or getting name of a service method of the GUI component and uses the name for generating necessary communication code. Upon the running of the container CCG, the container CCG calls GUI CCG object to generate component code for a pie chart and generates communication code which allows the pie-chart component to collaborate or exchange data with the container component.

The CCGs are used in a container component (which would be another CCG) to generate application code. Each of the CCGs generates (1) application code including of markup elements (e.g., elements for HTML browser include table, img, input, span or label) for drawing various elements or parts of an image of a component and (2) application code implemented in a programming language supported on client platform such as JavaScript, which includes (a) code for manipulating elements in response to events such as mouse move, keyboard stroke or callbacks, and (b) a few lines of special application code (known as communication code or integration code) to allow inter-component communications between the component and other components.

A container CCG or application can also use alternative methods such as a publish-and-subscribe method (e.g. using a Service Registration Object (SRO) to publish or register available services and to subscribe or find required services) to facilitate communication between subcomponents generated by plural CCGs. When this method is used in a container CCG with two subcomponents, the CCGs for the subcomponents are designed to generate the subcomponents so that one subcomponent publishes its service in a shared global object or directory, and the other subcomponent looks up the service from all published services in the shared global object and accesses the service.

To properly integrate two or more subcomponents generated by the CCG objects, the container CCG object exchanges data with the CCG objects of the subcomponents in the process of calling the coupling-methods of CCG objects. The data exchange on the server may be realized by using simple get- and set-methods of the CCG objects with data passed in their parameters. Data can also be exchanged through the objects returned by some functions. For example, each of the get methods often returns an object that contains requested data. The mechanisms of data exchange between two components on the client include use of strings, XML strings, variable passed as parameters for the inter-component communication functions (e.g., callback and service methods), hidden variables, and common global variables, which are shared by more than one component/subcomponent. A container CCG, in the simplest form, contains only the code to import CCG objects and the code to integrate the subcomponents the CCG objects represent.

A container CCG can implement various methods for ensuring that CCG objects that are of right type for the container CCG. Preferably, the container CCG is designed to accept CCG objects of subcomponents by the set-method (i.e., constructors or the initialization method) in Java class. To integrate the subcomponents of input CCG, the container component may need to know the information about the service method implemented in the component that the input CCG generates and the parameters used in calling the service method. The information is known as "Integration data". The container CCG may implement coupling-methods, which are used by the container CCG to access, share, and validate integration data. In another embodiment of the present invention, the CCG of input subcomponent is derived from an abstract component class, which implements predetermined features and methods. The abstract component class is a subclass of an AgileTemplate class, but is a distinctive indication of specific interface properties. Thus, only subcomponent CCGs derived from certain abstract class are compatible with a container CCG.

Any container CCG may serve as an input component for a larger container CCG. An instantiated and fully initialized container CCG object is used to create the presentation code of a container component, or used to generate component code as a subcomponent inside another larger container CCG. Yet another further larger container CCG may use the container CCG of the larger component to build an application. This simple hierarchical component assembling process can be repeatedly used to build larger and larger application components or applications.

By using the method of the present invention, subcomponents generated by CCGs is integrated by a container CCG during execution. The container CCG uses the subcomponent CCGs' coupling-methods for the integration of subcomponents into the application code, and does not impose other limitations on the subcomponents and their code. Therefore, the CCGs intended for an application are created and tested independently, refined conveniently, or replaced quickly. A custom container CCG is built by assembling and integrating many CCGs. Reusable GUI container CCGs are created for popular applications such as On-line Analytical Processing (OLAP) analysis, Global Positioning System (GPS) Navigation, visual simulation or representation of dynamic systems, and shopping carts. ACCGs can be used just like all reusable container CCGs as long as their code of business logic is properly implemented in the ACCGs.

The method of software development in the present invention provides several advantages. Some advantages flow from the ability to preserve the independence of the reusable GUI CCGs or ACCGs and the ability to create computer programs by assembling and integrating the components.

In one aspect, the method of the present invention is used to make application development easier. An application can be divided into many components, which are developed and tested independently from each other. Components can be easily assembled to form the application. In another aspect, the method can be leveraged to substantially cut the development effort for container CCGs. To reduce coding effort, application developers can use pre-built reusable CCGs in class libraries such as GUI Controls, Menus, Meters, Dials, Charts, Trees, and Maps.

In yet another aspect, the method of the present invention can be used to shorten the development period for a new application. CCGs can be quickly integrated to build larger CCGs. This allows application developers to build CCGs independently, and use them to build CCGs for larger components. To build a larger CCG, the developers can use subcomponent CCGs for generating presentation code of the subcomponents and write code of integration logic for generating communication code. When a variety of CCGs are available for use as subcomponents, the time for building the new application using the available subcomponents is shorter.

In further another aspect, the classes for ACCGs of subcomponents can be easily refined or modified to meet constantly changing business needs.

In yet another aspect, a reusable GUI CCG can be designed to inspect the version and type of the requesting client platform and generates platform-specific code for proper presentation of the component. As a result, the applications can be easily ported to newer versions of the client platforms.

The method of software development in the present invention provides another advantage that flows from using a special type of components that are referred to as replaceable components. In one embodiment, each replaceable component encapsulates a self-contained component. Replaceable components offer higher degree of modularization. For example, a replaceable component of an application offers a higher degree of independence from the application in replacing the component by a new component, or redesigning and updating the code of the component and testing the component.

Two terms often used to partition useful and wasteful costs of a task are (i) essential complexity and (ii) accidental complexity. Where, essential complexity cannot be reduced without sacrificing the quality of desired result. That is, reducing essential complexity also reduces quality of desired result. Accidental complexity is wasteful cost often needs to be endured to get the desire result (e.g. by employing inefficient solution), but theoretically possible to reduce or even eliminate accidental cost (e.g. by inventing more efficient solution) without reducing the quality and quantity of desired result.

For example, consider an incandescent light bulb for illustrating the meanings of the terms: Assume an incandescent bulb converts less than 20% of the electric energy into light energy (intensity measured in luminous). According to the laws of physics, energy can neither be created nor destroyed, but only can be converted from one form (e.g., electric) to another form (e.g. light). Hence 20% of electric energy is the essential cost for producing desired light energy. But the bulb wastes remaining 80% electric energy by converting into heat energy. This 80% energy is accidental cost, so theoretically can be eliminated without sacrificing the desired result (i.e., quantity of light). Modern inventions such as LED bulbs are able to reduce accidental waste without sacrificing the desired result (i.e., luminous of light). For example, a LED bulb can generate nearly two times more light by consuming half the energy needed for incandescent bulb. So LED can substantially reduce accidental cost. Although LED bulb substantially reduces accidental cost, but it may not be possible to totally eliminate the accidental cost (e.g., some energy can be wasted as heat). Therefore, in some cases it is not possible to totally eliminate the accidental costs.

In computer programming process, accidental complexity is the complexity that arises in software application (i.e., computer program) or software development process (i.e., computer programming), which is non-essential to the problem to be solved. While essential complexity is inherent and unavoidable, employing inefficient processes to solve the problem causes accidental complexity.

It is desirable to identify the essential complexity and the accidental complexity in today's computer programs and their development processes. Then invent processes for either reducing or eliminating the accidental cost without sacrificing desire result. Total essential cost associated with each of the self-contained software components in an application including of 2 essential costs (or complexities): (1) Cost or complexity of construction and testing of the component and (2) Cost or complexity of assembling or coupling the component into the application, which further including (i) properly including the component, and (ii) creating necessary communication code for the component.

If a larger self-contained component (SCC) is not encapsulated in a replaceable module or if underlying tools/objects are not designed for allowing such encapsulation, it results in accidental costs when using the self-contained component in an application as a component. So, other aspect of the invention includes (i) methods for encapsulating each of the SCCs (Self-Contained Components) in a replaceable component class (RCC) and (ii) methods for using the RCC for including and creating communication code for the SCC in an application. Yet another aspect of the invention is to reduce accidental complexity by using tools to manage communication dependencies of each component and/or between various components in an application.

Those and other aspects of features of the present invention will become apparent to those skilled in the art after a reading of the following detailed description of the invention together with the drawings.

BRIEF DESCRIPTION OF THE DRAWINGS

Various embodiments are described herein with reference to the drawings, wherein:

FIGS. 6a and 6b shows a container full stock quote GUI component containing three subcomponents that are a stock-quote table, an intraday line chart and one-year line chart, according to one embodiment;

FIG. 13b illustrates a flowchart for creating a software application code including multiple RSCCs, and facilitating communication between RSCCs, according to one embodiment;

FIG. 13c illustrates a flowchart for creating a software application code including multiple large RSCCs, according to one embodiment;

Figure 1:
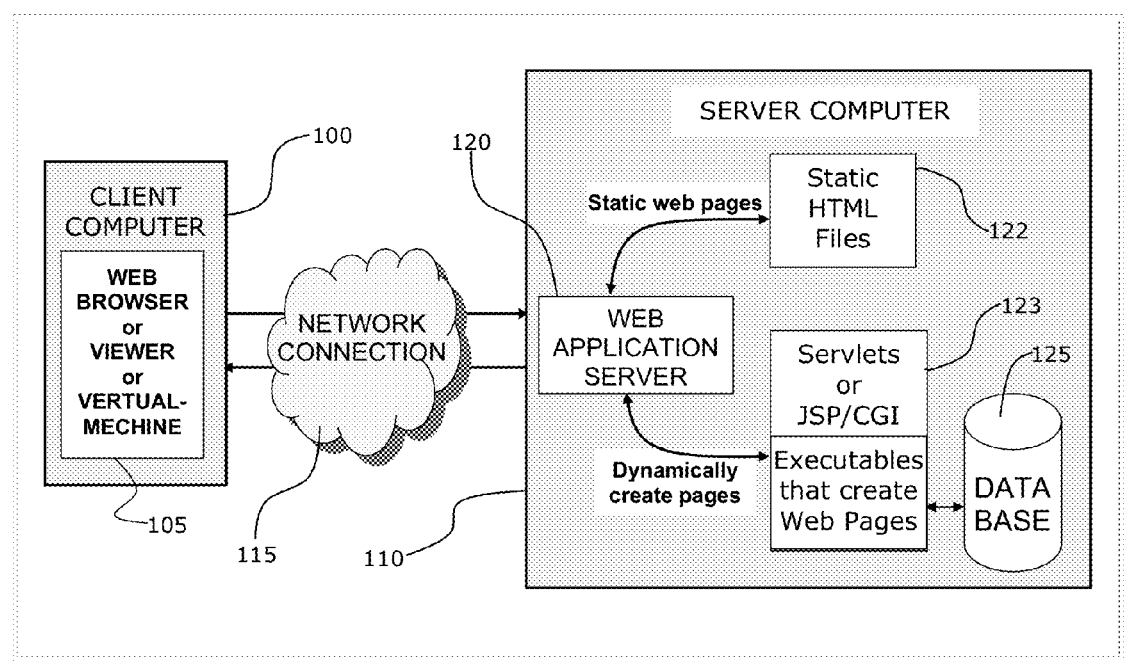
FIG. 1 shows the system for implementing the method of the software development according to the present invention.

The drawings described herein are for illustration purposes only and are not intended to limit the scope of the present disclosure in any way.

DETAILED DESCRIPTION OF THE INVENTION

Section-A

DEFINITIONS

Following definitions are applied in the construction of the disclosure and attendant claims.

An "application" is a program or set of cooperating programs that enable a user of a computer system to accomplish some task or set of tasks. It includes applications run on a platform such as computer, browser, activeX viewer or virtual machine (e.g., Java Virtual Machine). It means the entire document and referenced files are sent to the platform, where the application is executed.

"Application component" ("also referred as component") is an instance that contains all the business intelligence to support a specific function or feature of the application. Many applications use graphical components to simulate or model real system and interactions of real objects. An example of application component is a temperature-reading meter, which contains the code to present current temperature, handling user events, and supporting service methods, which might be used by external code or other application components in order to read and/or update the temperature. A component may have subcomponents, e.g., a copier may have a sorter and a feeder attached to it. Because component and subcomponent are relative concepts, a component becomes a subcomponent when it is used by another component. Therefore, component may mean subcomponent when its relative relationship changes in a context. A container component is a target component to be built.

"eXtensible Markup Language" (XML) is a specification for designing formats for text data that allows for text objects to be organized into hierarchies (i.e., XML documents). XML allows web developers to create customized tags that offer flexibility in organizing and presenting information.

A "browser" means any HTML-rendering application. It means part of computer operating system if it is integrated with the operating system (OS). A "viewer" means a platform that runs applications written in appropriate language such as scalable vector graphics, XAML or Flash. Viewer can be part of the browser if it is integrated with the browser. It can be part of computer OS if it is integrated with the OS.

A "network connection" means any kind of IP network or equivalents, including Internet, Intranet, private network, LAN, WAN, and wireless network and any combinations thereof that allow two connected computers or computing devices (e.g., cellular phones or palm-tops) to exchange data according to an IP protocol or equivalent. It also includes the loopback of a computer when a server and a client reside in the same computer.

"Presentation code" is a block or several lines of code to render a component in a web browser or a viewer (or equivalent) at the client computer. This code can contain any combination of the programming languages and technologies. The presentation code may also include external files such as GIF images and JavaScript files included by reference. Furthermore, presentation code includes the application code, which is used to interface with other computer devices or to represent the state of machine.

"Component Code Generator" (CCG) is a computer program built for a component in any suitable language. It contains the code-generating method (CGM). Upon execution, the CGM of the CCG generates presentation code to present the component on a suitable platform. The CCG can also implement special coupling-methods for the component of CCG, where these coupling-methods are used to create code for inter-component communication.

"Component Code Generators for GUI components" (GUI CCG) is a CCG, which contains code that, upon execution, generates platform-specific presentation code to render a GUI component. Normally, a reusable GUI CCG class is implemented for generating a correspondent GUI component. For example, a GUI CCG class is for generating a pie chart while another GUI CCG class is designed to generate a bar chart.

"Application Component Code Generator" (ACCG) is a CCG that contains the code for implementing application logic. An ACCG is a special CCG.

"Container Components Code Generator" (Container CCG) is a CCG, which may use one or more CCGs for generating code of subcomponents and incorporates the subcomponents to build the code of the container component. The container CCG contains several lines of special code.

When a container CCG is run to generate an application component, the special code is responsible for generating code statements known as communication code, which allows subcomponents and component to communicate with each other in the resultant application. A container CCG is a special CCG.

"Communication code" is a few lines of application code to allow for collaboration or data exchange between two modules including objects or components. Usually one of the modules in the application initiates the communication upon an event such as mouse clicks, keyboard or touch screen events, arrival of data, function call from another module, timer trigger, and change of state or data. The responsive actions include change of state, display or data, send back response or initiate a communication with another module. The lists of events and responsive actions are not exhaustive. While the communication may pass data from one module to another module, passing data is not required. Communication code includes, but not limited to, all sample code provided in this disclosure. Communication code includes any code in an application by which an event in one module causes a response from a second module.

One special type of communication code for a self-contained component (SCC) is: upon an event such as refresh or at a pre-set time interval, the SCC gets latest data for updating or redrawing its component presentation by calling an external program (e.g. a CGI, JSP or Servlet) running on a remote server containing the data. Where the external program accesses latest data from local data sources and sends the data to the self-contained component. If required data can be directly accessed from local data sources (e.g. in case of non-web applications), the self-contained component can include of code for directly accessing latest data from data sources, for example, directly implementing JDBC instructions for getting data from local RDBMS.

"Integration logic" is few lines of code in the CCG of a container component or CCGs for the subcomponents of the container component, which generates application code called "communication code", which allows for data exchange or collaboration between the subcomponents or between the container component and one or more subcomponents in the client application. A server application such as JSP that uses CCGs for generating subcomponents is a special type container CCG.

"Component coupling-methods" or "Coupling-methods" include any method implemented in a CCG that runs at server for creating necessary communication code for the component generated by the CCG, where the communication code allows for inter-component communication on the client. Examples of coupling-methods include (1) a service method implemented in a CCG for getting directly or indirectly integration data such as a name of a service method implemented inside the component code generated by the CCG and (2) a service method implemented in a CCG for setting directly or indirectly integration data such as the name of an external function to register a callback with the component generated by the CCG.

"Integration data" are the necessary information a container CCG needs when its object interacts with a CCG object for a subcomponent. In a shopping cart and shopping item example, when a user selects an item on the computer screen, the shopping item (e.g., the subcomponent) in the application causes the shopping cart (the container component) to update the invoice/purchase statement. When a user selects a shopping item, the subcomponent, shopping item, calls the service method of the subcomponent of the invoice/statement and passes data about the shopping item such as price, model and UPS-code through the parameters of the service method. The interaction at the client is achieved by the communication code. The information about the name of the service method and the parameters of the service method are examples of integration data. The container CCG needs integration data in creating the communication code.

"Self-contained component (SCC)" in this disclosure is defined as follows: A component, module or object is said to be "self-containing" if it requires a little or no construction code and data to assemble into an application and ready to perform its functions which include providing user interface features, providing services or collaborating with other parts of the application. A component is said to be self-contained even though it requires external services for performing its functions or provide service to other components. Any component in an application is an SCC, if it can be operated independently requiring little or no implementation of construction code, except implementation of communication code for providing services required by the SCC for performing its intended operations.

"Replaceable Component Class (RCC)" or "Replaceable Component" is a class-implementation that encapsulates substantial portion of implementation or construction code of a self-contained component (SCC) and can be used to assemble the SCC into an application as a unit or disassemble the SCC as a unit. Also the replaceable component class (RCC) must accommodate the following: It needs little or no additional construction code for assembling the SCC into an application and also implements loosely coupled or simpler coupling/communication interfaces for coupling the SCC, if the SCC needs to collaborate or communicate with other components in the application. The SCCs in an application collaborate or communicate with each other by depending on or requesting each other's services.

"Replaceable Self-Contained Component (RSCC)" is a self-contained component (SCC), where the SCC is included into an application by using an object instance of a replaceable component class (RCC). If substantial position of code required for incorporating an SCC is encapsulated in a class definition called RCC, where an object instance of the RCC can be used to assemble an SCC, then the SCC is called as RSCC. For example, if most of the construction code of an SCC is not encapsulated in an RCC but implemented in the code of its container component for including the SCC, then the SCC is not RSCC.

Section-B

Object-Oriented Programming

Object-Oriented Programming (OOP) languages, such as Java, support a concept called classes. A class is a module of code that generally contains (1) a set of data variables to store data and references to other objects, (2) a set of methods or functions to operate on the data, (3) methods for providing access to the services defined in classes, (4) methods for setting and changing the objects' data (popularly known as set methods), and (5) methods for reading objects' data (popularly known as get methods).

Object-oriented programming techniques involve the definition, creation, use and destruction of "objects". These objects are entities including data elements or attributes, and methods or functions, which manipulate the data elements. Objects can be created, used and deleted as if they were a single item. The attributes and methods enable objects to model virtually any real-world entity in terms of its characteristics, which can be represented by the data elements, and its behavior, which can be represented by its data manipulation functions. Objects are defined by "classes", which act as templates that instruct the compiler how to construct the actual objects. A class may, for example, specify the number and type of data variables and the way of manipulating the data. When an object-oriented program is compiled, the class code is compiled into the program, but no objects exist. An object is created by the program at runtime by calling a special function, constructor, which uses the corresponding class definition and additional information, such as arguments provided during object creation, to construct the object. Object creation is also referred to as object instantiation. When an object is created at runtime, memory is allotted and data structures are created. The objects may be used by using their data and invoking their functions and are destroyed by calling a special function called destructor.

Class may support a rich set of methods to initialize the data variables and also to read the variables. Also, it supports methods, which can be used to request (or access) the services of the object, which is an instance of the class. For example, a sample drawing-class for a pie chart, which draws a pie chart, may contain variables: an array of floats, an array of strings, and a title string. The class may support methods to initialize these variables and a service method that draws the pie chart using the data. Users can instantiate a pie chart object and initialize the data using the supported methods; and then use the service method to draw the pie chart. Also, the class may support other methods such as service methods to register callbacks. If any external component interested in the user selection/clicks on the chart, they could use appropriate service method to register a callback to be notified on the event.

The major benefits of object-oriented programming techniques arise out of three basic principles; encapsulation, polymorphism and inheritance. More specifically, objects can be designed to hide, or encapsulate, all, or a portion of, the internal data structure and the internal functions. A program developer can define objects in which all or some of the attributes and all or some of the related functions are considered "private" or for use only by the object itself. Other data or functions can be declared "public" or available for use by other objects. Access to private variables inside an object by other objects can be controlled by defining its public functions for accessing the object's private data. The public functions form a controlled and consistent interface between the private data and the "outside" world. Any attempt to write program code that directly accesses the private variables causes the compiler to generate an error during program compilation, which error stops the compilation process and prevents the program from being run.

Inheritance allows software developers to easily reuse pre-existing program source code and to avoid creating software from scratch. It allows a software developer to declare classes and their instantiated objects as related to each other. When a class is designated as a subclass of the base class, the subclass "inherits" and has access to all of the public functions of its base class just as if the functions were declared in the subclass. Alternatively, a subclass can override some or all of its inherited functions or modify some or all of its inherited functions merely by defining a new function with the same form. Overriding or modification of a function in the subclass does not alter the function in the base class. The creation of a new class by selectively modifying the functions of another class allows the software developers to easily customize existing code to meet their particular needs.

Moreover, many components are essentially Java objects that conform to an object model such as Microsoft's Component Object Model. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most of the object-oriented languages, including the C++ programming language, do not specify true object modules, but merely specify syntax and semantics of a basic object implementation without specifying the rules that unify object systems.

One of the important features of the present invention is the use of an abstract code-generating method for generating browser-compatible component code. A super class supports, among others, the code-generating method. The subclasses derived from the super class inherit the behaviors and characters of the method.

Section-C

The System for Application Development

The system (FIG. 1) for web application development in accordance with the present invention includes a client computer 100 running an operating system (not shown) and a web browser 105, a server computer 110, and a network connection 115 between the client computer 100 and the server computer 110 so that the client computer 100 and the server computer 110 can exchange data according to an Internet communication protocol such as Hypertext Transfer Protocol (HTTP) or File Transfer Protocol (FTP). The server computer 110 hosts a web application server 120, which runs Servlet or JSP and/or has a Common Getaway Interface (CGI). The server computer 110 may optionally run a database server 125 or similar data base application. The web browser 105 uses a URL (the virtual address of the server) to locate the web application server 120 and to request a web page. If the URL points to a static web page, the server computer 110 returns the page in appropriate code. If the URL points to an executable such as CGI or JSP/ASP program, the request will cause the server computer 110 to run the executable, which creates a web page dynamically.

The client computer 100 includes a central processing unit (CPU), a random access memory (RAM) for temporary storage of information, and a read only memory (ROM) for permanent storage of information. A bus, which is controlled by a bus controller, interconnects the components of the computer system. Secondary storage may be provided by diskette, CD ROM, hard drive, flash memory cards (by serial or USB or other connections), and tape drive. The diskette drive, CD ROM, and hard disk are connected to the bus by respective controllers; and the RAM is controlled by a memory controller. An interrupt controller is used for receiving and processing various interruption signals from any of the system components.

The client computer 100 also includes a communication adapter that allows the system to be interconnected to a local area network (LAN) or a wide area network (WAN) schematically illustrated by the bus and network connection.

Operation of both the client computer 100 and the server computer 110 is generally controlled and coordinated by operating system software, such as the Microsoft Windows 95, 98, 2000, ME, XP and NT from Microsoft Corp., Redmond, Wash., Sun OS/2, and Apple OS 10 from Apple Computer Systems, Inc. Cupertino, Calif., and Linux from RedHat Inc, Durham, N.C. The operating system controls allocation of system resources and performs tasks of processing scheduling, memory management, networking, and input and output services. The operating system resident in system memory and running on CPU coordinates the operation of the other elements of the computer. The present invention can be implemented with any of the commercially available operating systems including OS/2, UNIX, Windows 95, 98, 2000, ME, XP, Vista, NT, and DOS.

A platform such as viewer, virtual machine, browser, and any HTML-rendering application on the client computer 100 is necessary for use of the present invention. Commercial browsers include Internet Explorer from Microsoft Corporation and Netscape from Netscape Communication Corporation. Other browsers such as America Online browser are also available. Because graphic presentation code produced by the method disclosed in the present invention is displayed under an SVG viewer, it is therefore necessary to load an SVG viewer as a plug-in component of the browser. While all well-known browsers are not part of any of the commercially available operating systems, they can be merged into operating systems. For example, SVG viewer is analogous to Windows-OS to run enterprise applications; and SVG/JavaScript is analogous to programming languages such as Visual Basic or Java. Next generation Microsoft-OS Vista and IE-browser support Silverlight plug-in and XAML. The XAML is Microsoft's version of XML based graphics technology similar to SVG and the name of the viewer is Silverlight. Silverlight is an underline graphical platform which is much more powerful than SVG viewer. Therefore, the present invention is useful not only in web application development but also in general software application development. Also, Adobe has announced a new platform called Apollo, which runs MXML/ActionScript, where MXML is an XML-based graphics declaration language, and ActionScript is a programming language conforms to ECMAScript Specifications.

The server computer 110, as is well known in the art, is a computer that is connected to the client computer 100 through Intranet, local network, WAN or wireless in accordance to an Internet Protocol (IP). The server computer 110 generally has similar components of the client computer 100 even though some of the components such as floppy disk, CD ROM drive and display may be dispensed with. The server computer 110 is capable of sending web pages to the client computer 100 in HTML format. HTML is a markup system used to create web pages that are portable from platform to platform. To send a web page, the two computers use the Internet HTTP, which specifies how information is exchanged between the client and the server. HTTP is an application that is designed to conform to International Standard ISO 8879—Standard Generalized Markup Language. HTML and HTTP standards are maintained by an Industry Consortium; the World Wide Web Consortium (W3C) jointly hosted by the Massachusetts Institute of Technology Laboratory for Computer Science (MIT/LCS) in the United States, the Institut National de Recherche en Informatique (INRIA) in Europe, and the Keio University Shonan Fujisawa Campus in Asia.

In one of the preferred embodiments, the server computer 110 supports the Common Gateway Interface (CGI) for running CGI programs. CGI is a publicly available method, which is used by web servers and web clients to mediate interaction between them.

In practicing this invention, it is often desirable to use the network connection 115 which may include Internet and the WWW infrastructure in whole or in part. The WWW is a collection of servers on an IP (Internet Protocol) network, such as the Internet, an Intranet, or an Extranet. The web servers on WWW utilize the HTTP for changing information. However, the invention may be practiced in private networks rendered by serial cable connection, leased phone line, and wireless networks without using the WWW.

The system described above is just one example of a suitable software development environment and is not intended to suggest any limitation as to the scope of use or functionality of the invention. Neither should the client computer 100 and the server computer 110 be interpreted as having any dependency or requirement relating to any one or combination of components used in the present invention. The invention may be practiced on cell phones and palm devices that run browser-like application such as SVG viewer or Adobe's flash players. Since the platform supports Application Peripherals Interface (API), the invention can be used to control other hardware devices.

In software development environment, the server computer 110 and the client computer 100 may reside in the same computer unit. This is especially straightforward in system running operating system such as Windows NT, Windows XP, Unix and Linux. In such a system, a web server application can be launched for hosting web sites. At the same time, a web client can also be launched so that the client can access the web server through loopback. In this situation, the ordinary network connection is unnecessary. This system is ideal for software development using the technique of the present invention.

Moreover, if the web browser 105 is merged into the operating system, the system might be reduced to one single standalone computer even though the details in operating such a system depend on how the system is implemented. Therefore, the system for application development is intended to cover both a single computer with a browser and a single computer without independent browser. In this situation, the client computer 100 should be construed as a logical computer. In the system where a browser is merged into the operating system, browser shall mean the part of the component of the operating system that performs browser's functions.

Section-D

Presentation Platform and Component Code

Component code is a block or several lines of code to render a component in a web browser or a viewer at the client computer. This code is generated by a CCG at the server and is sent to the client computer in the SVG language, and it must be compatible with the requesting browser. Some sample components are shown in FIGS. 2a, 2b, and 3a-3d.

Figure 2A:
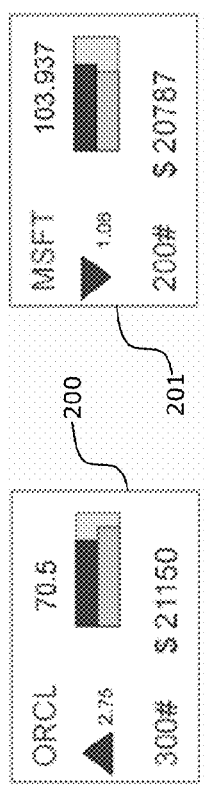
FIG. 2a shows the presentation code to show a stock quote for the ticker ORCL and MSFT respectively, according to one embodiment.

FIG. 2a shows two images 200 and 201 showing stock information for ORCL and MSFT respectively. The code block 202 draws the image 200 under an SVG browser while the code block 203 draws the image 201.

Figure 2B:
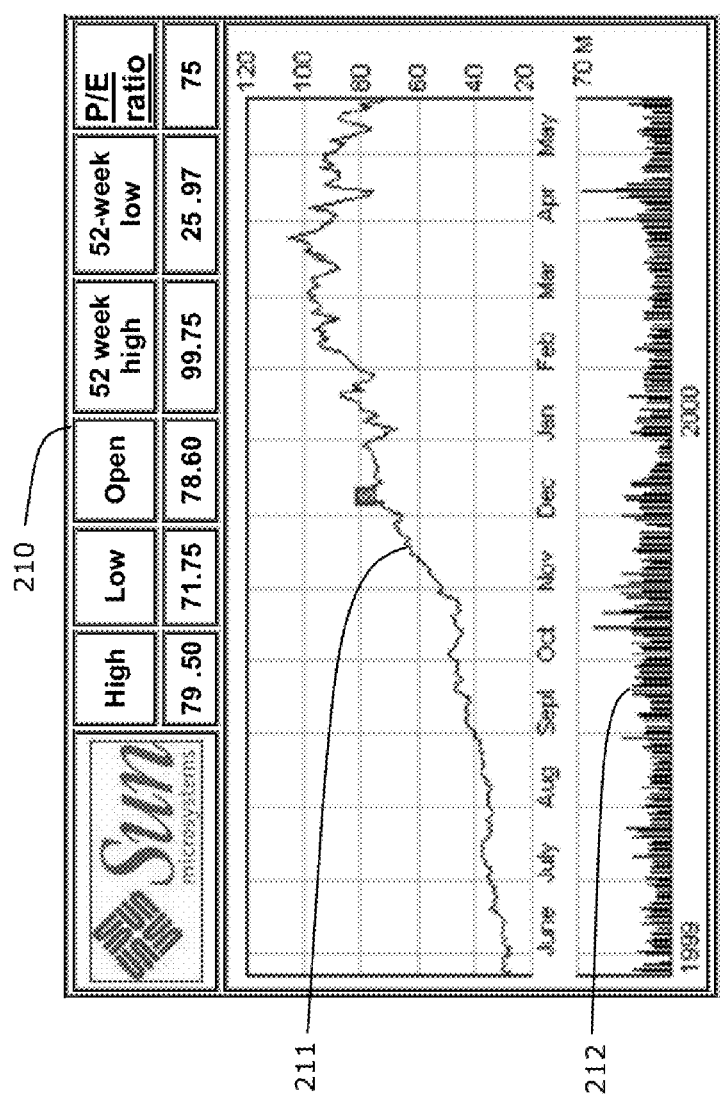
FIG. 2b shows the presentation code created by an ACCG to display a stock chart, according to one embodiment.

FIG. 2b is an image for a stock quote component. This component has three subcomponents. A stock quote table 210, a line-chart 211 showing stock movements for a year, and a bar chart 212 showing volumes (i.e., numbers of shares) traded.

Figure 3A:
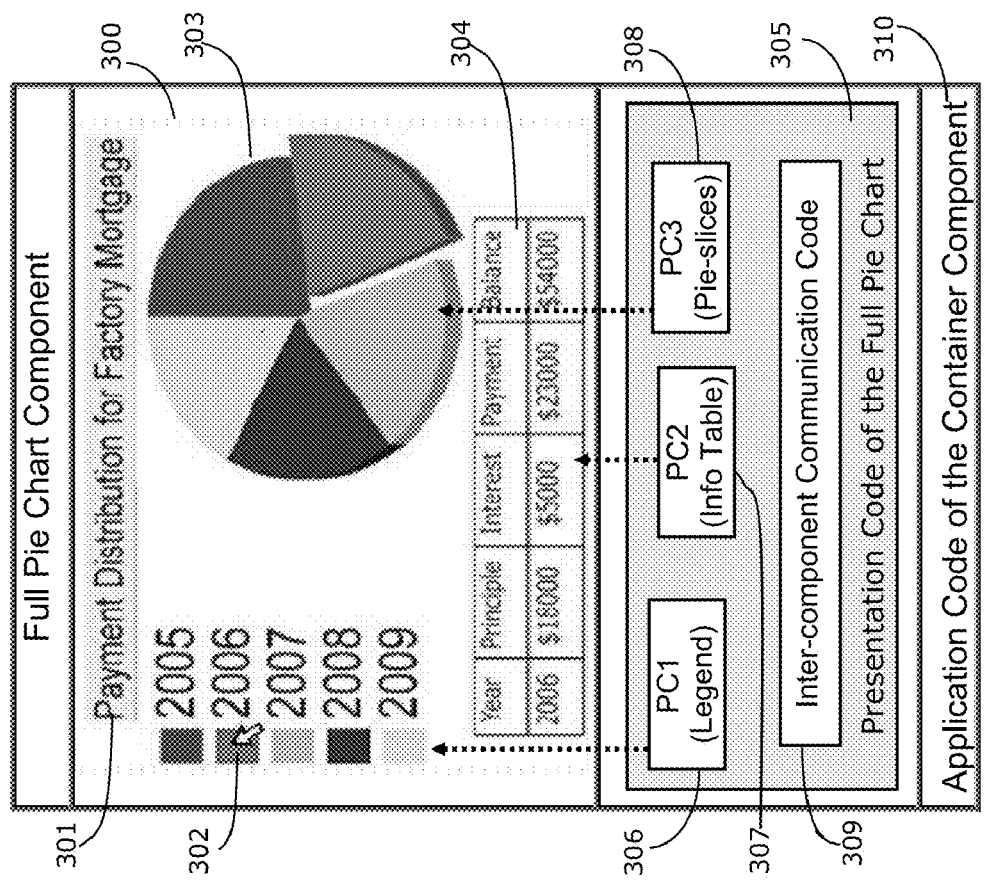
FIG. 3a shows a full pie chart component with three sub-components: legend, Info-table and pie slices; and code structure is shown below the component, according to one embodiment.

FIG. 3a shows a full pie chart 300 and general code structure of the code 305 for the full pie chart. The full pie chart 300 includes three main subcomponents: (i) Legend 302, (ii) Info table 304, and (iii) the pie slices 303. The code block 305 includes three code blocks, the PC1 306, the PC2 307 and the PC3 308, which are respectively responsible for the legend 302, Info table 304, and the pie slices 303. Upon the mouse being moved over an item (e.g., 2006) on Legend 302, a respective slice for the year will be shifted outwardly, and respective information for 2006 will be shown in the Infotable 304. To accomplish this, the subcomponents need to communicate with each other. Hence, the full pie chart's code block 305 includes inter-component communication code 309. The code block 305 for the full pie chart also includes additional code to accomplish other tasks such as displaying title 301.

Figure 3B:
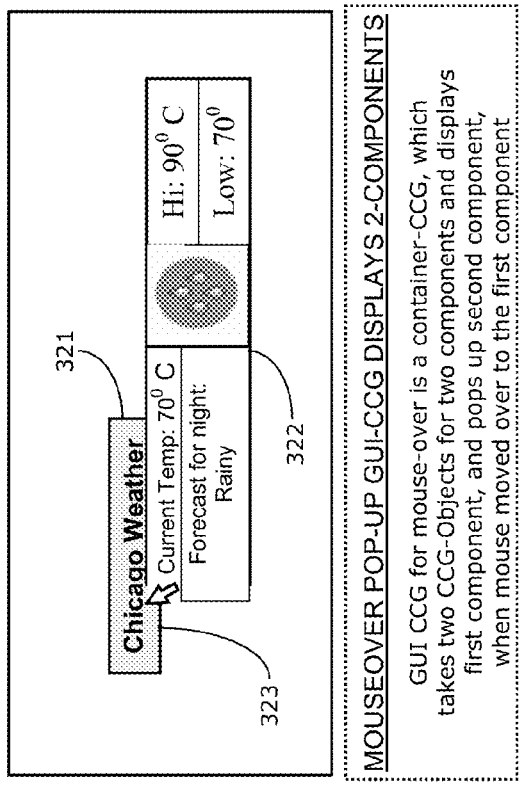
FIG. 3b shows a two-component mouse-over pop-up component generated by a CCG, according to one embodiment.

FIG. 3*b* shows an example GUI component created by an instance of a container reusable GUI CCG class for a pop-up component. The pop-up component includes two subcomponents. It displays the first subcomponent 321. If the mouse 323 is moved over the first subcomponent 321, it displays the second subcomponent 322.

The presentation code of the component on a web page may contain any combination of the languages that are understood and used by the requesting browser or viewer. The languages include HTML, XHTML, DHTML, JavaScript, CSS, SVG, DOM, XML/XSL, X3D, Xforms, MathML, ChemML, SMIL, VRML, and VML. Presentation code may contain data in XML format, variables, program code in any of the supported languages and programming technologies.

Although different languages can coexist in the same document, logically they may be independent. In an SVG document, JavaScript code and SVG code coexist with clear markings to identify their respective code sections. Each JavaScript code section is marked by tag <script type="text/ecmascript"> and tag </script>, while the SVG code is marked by <svg> and </svg>. A section of code in a particular programming language can be executed by the engine that is specific for the language. For example, SVG viewer may contain a JavaScript engine to execute JavaScript code included in an SVG document. However, other implementations may employ alternative methods. For example, Microsoft's XAML files are compiled into executable files and Adobe's MXML files are translated into Flash files before they are sent to the client platform.

It is permissible to include the component class definitions and other JavaScript code such as JavaScript methods of a component in an external file. An external file is included by using statements like <script xlink:href="GUIcomp_class_version1_1.js"/> and <script xlink:href="RadiobuttonList_v1_0.js" language="text/ecmascript"/>. Component code includes code included in the SVG file and also all image files and external files incorporated by reference. Therefore, SVG document means SVG code page and all external files incorporated by reference. Likewise, HTML document or page also includes all image files and external files incorporated by reference.

Code sections in JavaScript may be included at any location in the SVG document because all variables and function names in JavaScript are global. JavaScript code may be placed in a separate file, which is referenced in an SVG document, as shown above. However, implementations on different platforms (e.g., viewers or browsers) may require different approaches to achieving the same result.

Elements in SVG can be grouped using tags such as "g" and "svg". The X and Y coordinates of a component on the screen are determined by the values of enclosing SVG group element in transform='translate (X Y)'. If the component contains subcomponents, the subcomponents are placed in sub-SVG groups. The X and Y coordinates of these sub-SVG groups are with respect to the top-left corner of the enclosing SVG group.

Different sections of code in different languages on a web page may collaborate and communicate with each other. Generally, a programming language such as JavaScript is used to support interactivity, which makes the component intelligent and context-sensitive. Components on a web page may exchange notifications (signals events such as user clicks or state change) and call each other's service methods.

SVG graphics elements can be associated with JavaScript functions as user action listeners, which are called when specified action occurs on the SVG elements. The following sample code shows how an onclick listener is set on an SVG graphic element:

<g id="name_id" onclick="my_alert('hot spot')"> <text>HotSpot</text></g>

Upon clicking on the text element "hot spot", the SVG element calls onclick listener function my_alert( ). Conversely, JavaScript code is used to access SVG elements by using their id names and manipulate their properties or attributes by changing their values. For example, JavaScript functions can use "name_id" to locate the SVG element and change its attributes. Since the IDs of the SVG elements are global, any JavaScript function in the SVG document can use the IDs to access the graphical elements and change their attributes.

The following SVG code represents a square and a Text "USA" next to it:

```
10. <g id='grp1' transform='translate(5 5)'
20. onmouseover='change_color("red")'
30. onmouseout='change_color("white")'>
40. <text x='20' y='20' id='txt1'> USA</text>
50. <rect x='5' y='10' width='10' height='10' id='rect1'
60. stroke-width='1' stroke='black' fill='white'/>
70. </g> <!—End of SVG group whose id is 'grp1'--!>
```

Where, the <rect> statement represents a rectangle image of the size given by "width" and "height", and places the image at the location given by 'x' and 'y' attributes. Any JavaScript function in the SVG document can access the elements using their IDs: 'txt1' and 'rect1'. The coordinates are with respect to top left corner of its container group.

JavaScript code can be included in the SVG code of the component code. The location of the group is determined by the statement transform='translate (X Y)'. A JavaScript function (e.g., MoveGroup(grp1, New_X, New_Y)) is implemented that updates the values of X and Y to move the group, which is called at any time to move the group to a new location.

Event listeners are placed for SVG elements. The above group element has two event listeners, one for onmouseover at line 20, which is for the act of moving the mouse over the graphic element, and one for onmouseout at line 30, which is for the act of moving the mouse away from the graphic element. In this example, both of the events call the same JavaScript function with different parameters. An act of moving the mouse over will cause the graphic element to show a red color while an act of moving the mouse away will cause the graphic element to show a white color.

The following shows a sample implementation of the function, which changes the color of Rect and Text elements to 'red' when the mouse is moved over their elements, and restores their original colors when the mouse is moved off the elements.

```
<script type='text/ecmascript'>
10. <![CDATA[
20. function change_color(col) {
30.   var svgobj=SVG_Document.getElementById('rect1');
40. (svgobj.getStyle( )).setProperty ('fill', col);
50.   var svgobj=SVG_Document.getElementById('txt1');
60. if (col=='red')
70. (svgobj.getStyle( )).setProperty('fill', 'red');
```

```
80. else
90. (svgobj.getStyle( )).setProperty('fill','black');
100. }
110. ]]>
120. </script>
```

This function uses global variable, "SVG_document" at line 30, which is initialized as the root document, to find the SVG elements. This function uses the IDs to access and manipulate the color attributes. The example shows how SVG elements and JavaScript work together. This feature of using programming code and graphical elements to present components in a cooperative way is used to create code to present interactive or animating application component.

Section-E

Structure and Features of Presentation Code of Components

It is preferable to encapsulate JavaScript functions and data variable necessary for the basic component in a class definition. The part of the presentation code JavaScript class implementation can increase performance efficiency although it is not required to implement them as classes. Class implementation offers two features. It is helpful to the maintenance of good code structure and class definitions are used to encapsulate data objects and service methods. Configuration information, state information, and other context information of a basic component can be placed in the variables of an instantiated object of class. The class methods determine the behavior and functionality of the component. If multiple instances of a particular class component are presented multiple times in the SVG document, the web page needs the class definition code only in the first instance, and can reuse the same class definition for instantiating an object in all other instances. By way of example, when a web page displays multiple pie charts, the page needs to include the class definition code of a pie chart only once. An object can be instantiated and initialized with specific data for each of the additional instances of the charts.

One of the objectives of designing JavaScript class for the basic component is to encapsulate the component's functions such as data access, system modeling, system performance analysis, presentation of application data, interactivity, animation, data processing, data updates, event triggers, component services and handlers. While JavaScript is not a perfect object-oriented language, it is in many aspects similar to general purpose programming languages such as Java and supports sufficient features to emulate an object-oriented language. It can be used in way of emulating class concept, which allows for defining a class that can encapsulate data variables, methods of initializing data variables, and service methods, which allow other components to access the services of the component.

The presentation code of a component is used as a basic building part (e.g., subcomponent) of a larger component. Programs are developed to "capture" and copy the presentation code of the pre-built component into a larger container component as a building subcomponent.

The presentation code of a subcomponent may contain a service method, which can be called by a method in another subcomponent to invoke the service. Likewise, the presentation code of a subcomponent may contain a method, which needs to call a service method of another subcomponent.

Figure 10A:
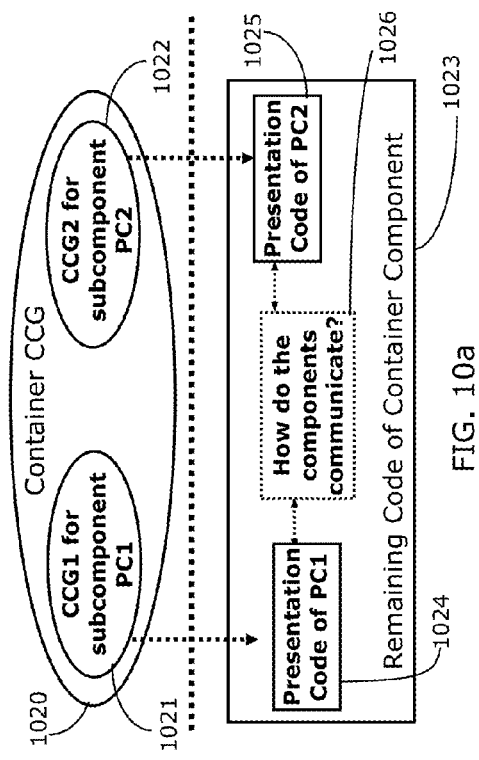
FIG. 10a shows two subcomponents generated by two CCGs without inter-component communication code, according to one embodiment.
Figure 10B:
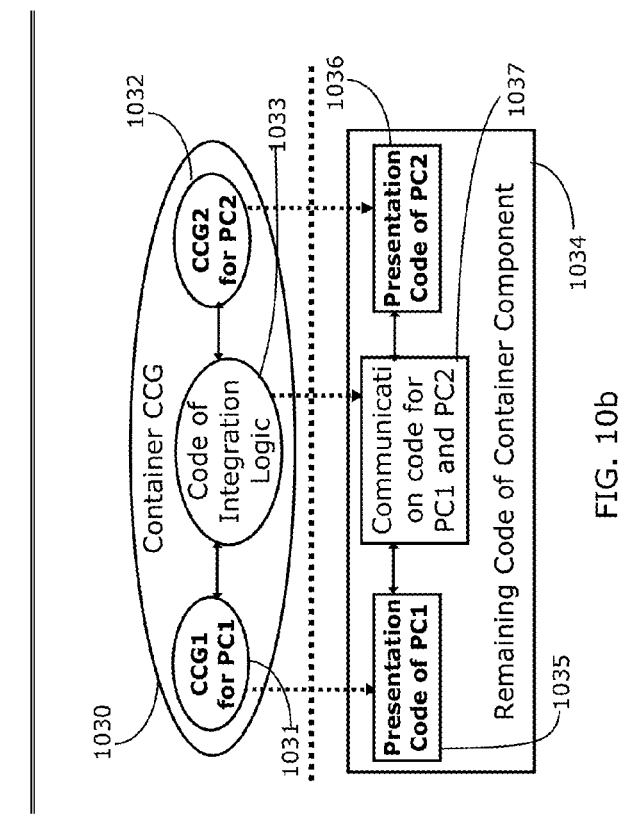
FIG. 10b shows two subcomponents generated by two CCGs with inter-component communication code, according to one embodiment.
Figure 10C:
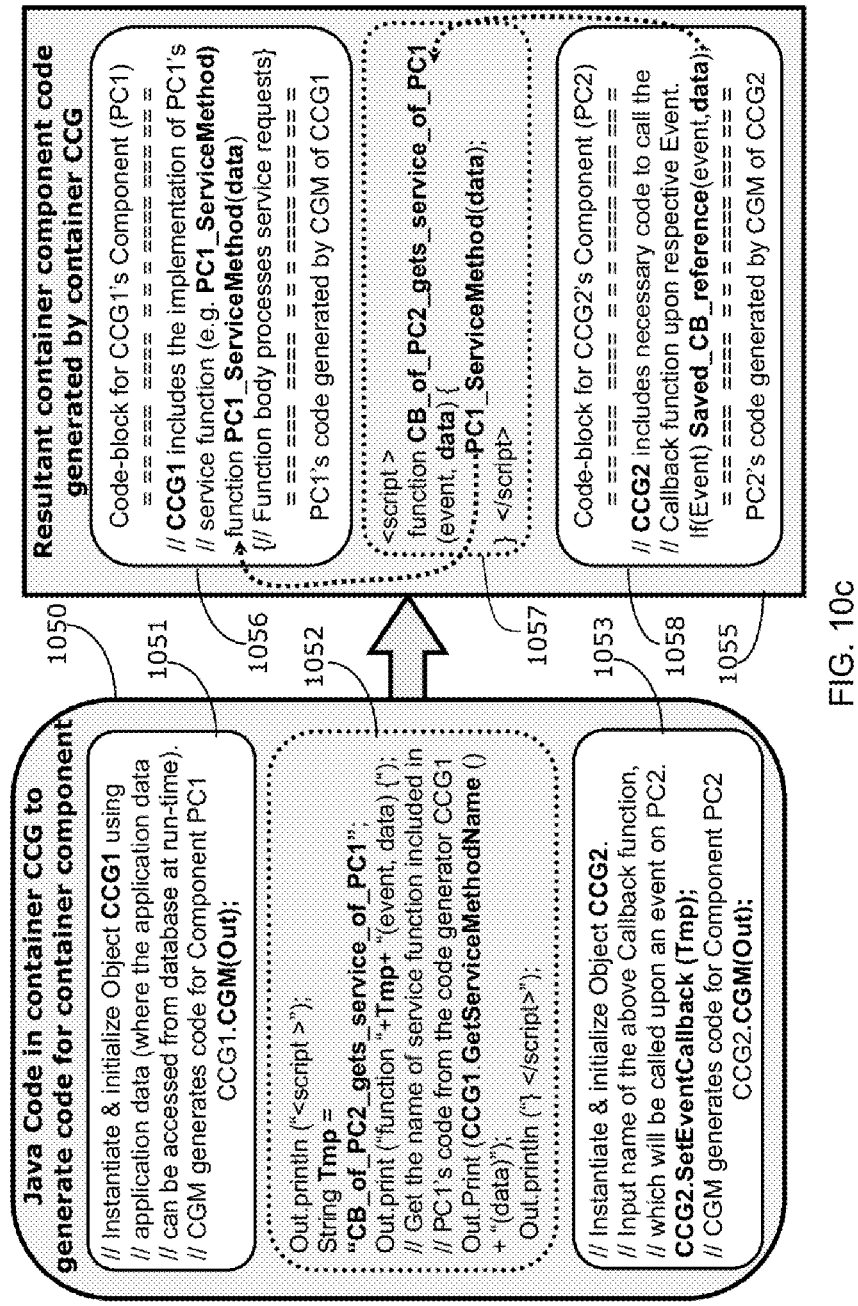
FIG. 10c shows server code in a container CCG for generating communication code for two subcomponents, according to one embodiment.

Therefore, some programming statements are designed to get the name of the service method of a subcomponent and use the name to "write" (e.g., generate) the cross-calling method in the JavaScript language, allowing the subcomponents to communicate with each other (FIGS. 10a, 10b and 10c).

Moreover, a program is developed to write additional application code to establish the communication between the container component and the subcomponents.

Since JavaScript functions and variables are global in scope, one character string cannot be used by two variables or service method names on the same web page.

The presentation code is designed, by coding its CCG, to allow the component's graphic image to be used as a subcomponent and can be placed anywhere on the screen of the client computer. The coordinates of graphic elements of the presentation code are designed so that the presentation code can be placed deeply inside a nested component hierarchy. Relative coordinates system is used for graphic elements. If necessary, relative coordinates are converted to the absolute coordinates by traversing up the DOM/XML Tree and calculating the absolute coordinates. Since a component's presentation code is placed deeply in a component hierarchy, care is taken to avoid bugs in treating the coordinate system.

Section-F

Representative Presentation Code or Component code

1. Stock Quote for Company

The presentation code as viewed under an SVG viewer for displaying a stock quote for the company with ticker ORCL is shown in FIG. 2a.

2. Rotate-Banner

The complete component code of Rotate-banner is shown in Appendix A. It has a list of four subcomponents for showing stock information in SVG images for the companies with tickers ORCL, MSFT, INTC, and SUNW, respectively. Upon being loaded, Rotate-banner displays only the first component for ORCL. It displays the next component in the list when a user clicks on the currently displayed banner. When the user clicks on the last banner, it displays the first banner, for ORCL again. The source code in the figure contains four sections: Section One contains global variables and code to initialize them, and Sections Two to Four contain the presentation code of the Rotate_banner component.

Upon initial loading, only the banner for ORCL is set visible. Upon clicking on the initially displayed banner, the object's listener function display_banner is called, which hides the currently displayed banner and displays the next banner, MSFT (Note that index is used from 0 to 3). Upon clicking on the banner again, display_banner( ) is called again, which hides the displayed banner and displays the next banner, which is the banner for INTC. Clicking on this banner will cause it to show the banner for SUNW. At this point, one more click causes display_banner( ) to display the first banner, the banner for ORCL.

In Section One, the code defines a shared global variable "onload_init_list", which is an array that is accessed by any component's code to add its initialization function, which is called when the svg-document loaded. The function svg_doc_onload_init (evt) contains the code to loop through the array and calls all these functions. This function is registered in order to be called upon the loading of the SVG document by statement: onload="svg_doc_onload_init(evt)" in the first line of the svg-code. The first section also defines a shared global variable "SVG_Document", which is used to access elements in the SVG-document. The function "init_svg_doc (e)" initializes the global variable "SVG_Document", when the SVG document is loaded. This section of code, which is not part of the component code, defines common global variables, objects and methods. The SVG source contains the SVG document body tags, which encloses the code of the component. The SVG document body is defined by the statement: <svg width='500' height='200' onload='svg_doc_onload_init(evt)'> and </svg>.

Sections Two to Four contain the code to present Rotate_banner component. Section Two contains the definition of the rotate_banner class. This class supports two service methods. The first method is add_banner (banner_id), which is used to add subcomponents during the initialization of the rotate_banner object instance. The second method, display_banner (new_banner), is called to hide the subcomponent currently displayed and display a new subcomponent, whose index is stored in the parameter variable new banner. This method locates the group element containing the subcomponent using the "ID" of the group, and manipulates its attributes to hide and display. Section Three contains the code to instantiate a Rotate_banner object instance and the code to initialize it. Upon initialization, four ids are added using the service method of the Rotate_banner object.

In this example, the JavaScript code sections are placed in the main SVG file. Alternatively JavaScript code can be placed in external files, and included by reference:
<script xlink:href='Lib/Rotate_banner_CLASS.js' language='text/ecmascript'/> or <script xlink:href='TMP/Rotate_banner_UNQ_IDX.js' language='text/ecmascript'/>

Section Four contains SVG-instructions for presenting the component and its subcomponents. The SVG-instructions define each of four subcomponents as a group and assign a name to each of the group ids (banner_id1_UNQ_IDX, banner_id2_UNQ_IDX, banner_id3_UNQ_IDX, and banner_id4_UNQ_IDX). These ids are used in Section Three to add the group-elements containing the subcomponents. Each group also contains presentation code of the corresponding subcomponent. The presentation code contains the definitions of graphic images or banners, respectively for ORCL, MSFT, INTC, and SUNW. By setting the values for the style's visibility attribute in each of the enclosing group elements, only one banner (e.g., the banner for ORCL) is set visible while the rest of three banners are not visible. Also, each group sets "onclick" event listener to call the object's service method display_banner( ) to display the next subcomponent in the list, using the statement: onclick="rotate_obj_UNQ_IDX.display_baner(index)". This service method is called when user clicks on the banner subcomponent.

Although the service method (i.e., rotate_obj_UNQ_IDX.display_baner(index)) of the object of Rotate_banner is used within the code of the component, it is global in scope and may be called from anywhere in the SVG document or by any other component in the SVG document (for example to show a new banner).

3. Show_Layer

The code generator for show-layer takes an array of components. It generates the presentation code of the Show_layer component that can display or hide each subcomponent independently. Appendix B shows the actual presentation code of the Show_layer component. It has a list of four subcomponents for showing stock information for the companies with ticker ORCL, MSFT, INTC, and SUNW. Upon being loaded, show-layer displays only the first component ORCL.

The figure also contains four hot squares, which are used to demonstrate the way that external code uses the service methods of presentation code to communicate with and control the application component. If a user clicks on any of the square-button on the right, it uses the service method for the presentation code and swaps the state of the component between showing the component and hiding the component.

The source code in the figure contains five sections. The first section contains global variables and code to initialize them. The Sections Two to Four contain the presentation code of the Show_layer component.

In Section One, the code defines a global variable "onload_init_list", which is an array that is accessed by any presentation code to add its initialization function, which is called when the svg-document is loaded. The function svg_doc_onload_init (evt) contains the code to loop through the array and calls all these functions. This function is called upon the loading of the SVG document by statement: onload="svg_doc_onload_init(evt)" in the first line of the svg-code. The first section also defines a shared global variable "SVG_Document", which is used to access elements in the SVG-document. The function "init_svg_doc(e)" initializes the shared global variable "SVG_Document", when the svg-document is loaded.

Sections Two to Four contain the presentation code of the show_layer. Section Two contains the definition of the show_layer class. This class supports four methods. The first method is show_layer(lid, stat), which is used to set the state for the subcomponent, whose index is 'lid'. The parameter 'stat' may contain 'visible' or 'hidden' correspondent to a SHOW or HIDE state respectively. The second method, switch_state(lid), is called to switch the state (between show and hide) for the subcomponent, whose index given in the parameter 'lid'. The third method is add_callback(cb_name), which is used to register a callback function, whose reference is passed in the parameter "cb_name". This callback function is called when the state of any subcomponent changes. The fourth method is layer_init(e), which is called to initialize the show_layer object.

The component code may include integration data such as the names of service methods and/or variables about the subcomponent in a comment section. The SVG viewer or browser skips all commented lines. The function of the integration data will be discussed in the Section of Container Component Code Generator (container CCG).

Section Three contains the code to instantiate a show_layer object and the code to initialize it. In the second section, an array of ids are declared and a show_layer object is instantiated, whose constructor takes two arguments: the above ID array and the index of the first subcomponent to be displayed. The component initialization code adds the initialization method of the object to the global onload-init list "onload_init_list", which causes the method "layer_init(e)" to be called upon the loading of the SVG-document to initialize the show_layer object.

Section Four contains SVG-instructions to present the component and its subcomponents. The SVG instructions define a group element for each of four subcomponents and assign a name to each of the ids of the group elements (layer_id1_IDX_N, layer_id2_IDX_N, layer_id3_IDX_N, and layer_id4_IDX_N). The constructor of the object, in the Section Three, uses these id names to add the IDs of the group elements to an array and pass the array to the object. Each of the group-elements contains the presentation code of the corresponding subcomponent. The presentation code provides the definitions of graphic images or layers for ORCL, MSFT, INTC, and SUNW. Although the component in this example is a simple graphic image in each layer, it can be a complex GUI component that contains subcomponents and JavaScript code.

Section Five shows how to use external code to use a service method implemented in the code of the Show layer component. The external code defines a function switch_the_state(num), which calls the service method layer_obj_IDX_N.switch_state(num) to switch the state of a layer passed in the parameter 'num'. This section also contains SVG code to display four group elements, each of which contains SVG code to draw a square and title on screen. Further, each group element sets "onclick" event listener to call the function switch_the_state(index), where index is set to switch the state of appropriate layers based on the title for the square. This section also contains a function my_test_callback(num, cb_obj, stat), which prints the layer number and the state of the layer, to which the values are passed in the parameters. This function is registered as a callback for the object for the component code by using the following service method:

layer_obj_IDX_N.add_callback(my_test_callback)

This service method can be called from anywhere in the SVG document to set a new callback for the component. The callback function "my_test_callbacK" is called whenever the state of any component is changed. For example, clicking on the square of the first component, ORCL, will cause the service method, switch_the_state(num), to change the state between shown and hidden states. Upon the change of state, my_test_callback(num, cb_obj, stat) is immediately "notified" to display an alert message. The same is true for components MSFT, INTC, and SUNW.

4. Service Registration

Figure 8A:
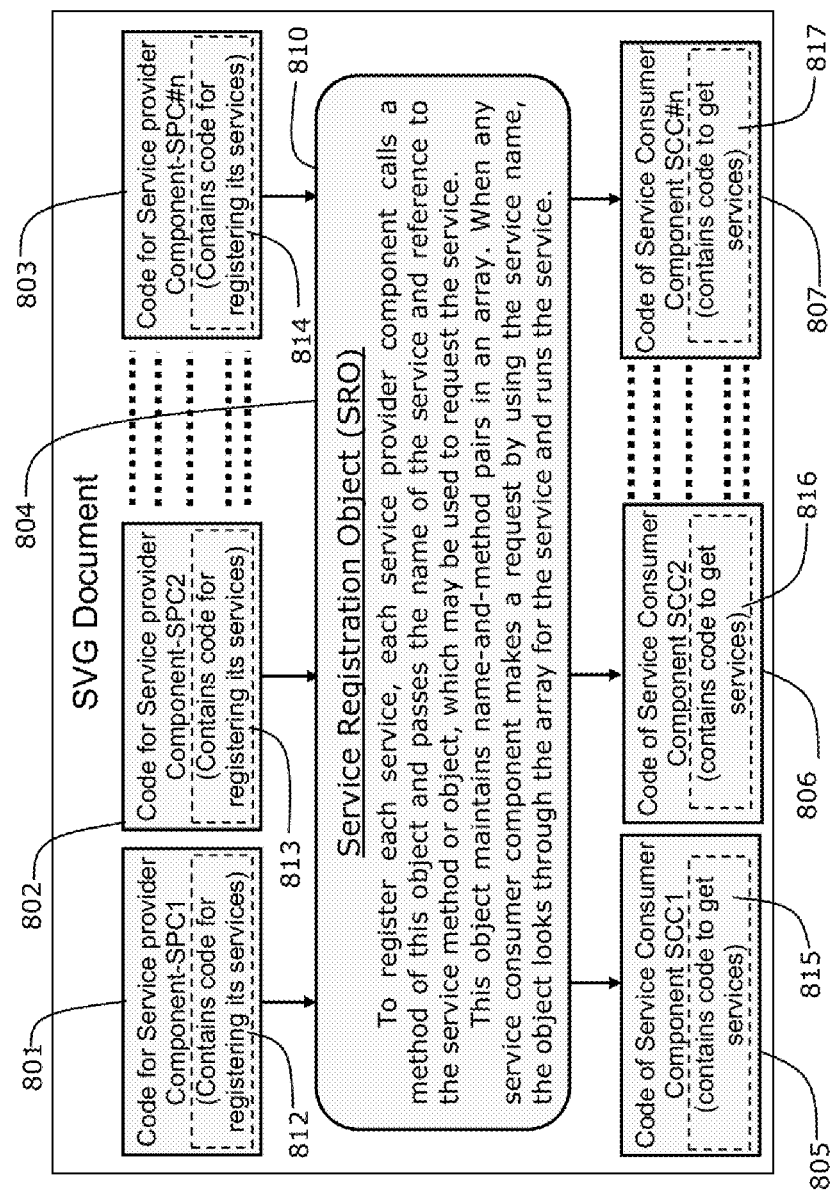
FIG. 8a shows a sample depiction of components in an application for registering service names and service with a global service registration object or directory in an application; and service-consuming components lookup for the services from the registration object and accesses the services, according to one embodiment.
Figure 8B:
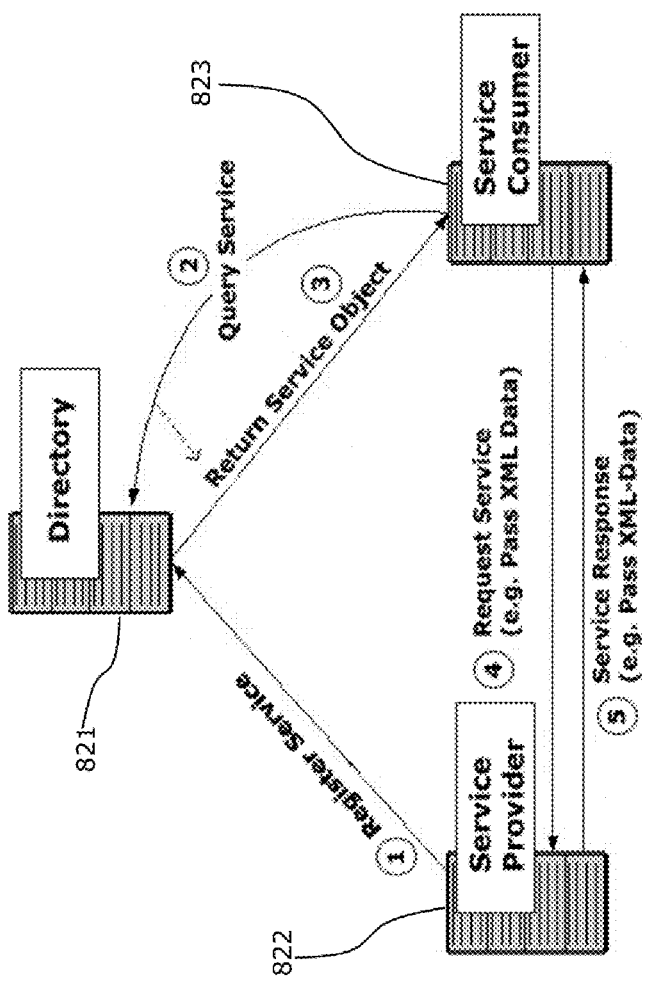
FIG. 8b shows steps for registering a service with the directory object and for looking up a service from the directory object and access the service, according to one embodiment.

By designing the component-code-generating program, the code of one component may use predefined shared global objects to establish communication with other component in an application as shown in Appendix C1, where Appendix C2 contains class definition for service registration object (as illustrated in FIGS. 8a and 8b). The application may define certain global objects, which is accessed by the presentation code of any other component. Their names of variables and services are defined as global in advance so that they can be accessed from anywhere in the application code. The code in Appendix C1 shows a method of using a predefined global object to establish communication between two or more subcomponents. The method is a publish-and-subscribe method. This code listing also contains a few representative functions to demonstrate this. If the code is loaded into an SVG viewer, it displays a series of popup messages.

The source code listing in Appendix C1 contains four sections. Sections One and Two contain code to include class definition JavaScript filr for the registration object and the code for instantiating a global registration object "service_register_obj". Section Three contains a service method to be used by the application code of each of the components to register its service methods with "service_register_obj". Section Four contains a method for the application code of other components to access the services by calling the methods of the registration object "service_register_obj".

Section One contains the class definition code of the Service Registration object. This class supports three methods. The first method is add_service(name, func), which is used to register a service (e.g., target service) function or object, where the service's name is given in the parameter 'name'. The parameter 'func' contains the reference to the target service method or object to be called. The second method, find_service (ser_str) is called to find the target service method or object, whose service name is given in the parameter 'ser_str'. The third method, get_service (ser_str, par1, par2, par3) is called to run the target service method, whose service name is given in the parameter 'ser_str'.

Section Two contains the code to instantiate a service_register_class object. The name of the instantiated object may be predefined for the application at the beginning of the application design and published its functions and their interfaces. The global object "service_register_obj" can be referred from anywhere in the SVG document. Any component that offers a service can be designed to include application code (e.g., service_register_obj.add_service(name, func)) to publish its service by registering the service function and giving a unique name for lookup. The chief designer or architect of the application can determine lookup name during early design and share with developers of other components of the application.

If any other component requires a published service, it can include application code (e.g., service_register_obj.find_service(lookup_name)) for getting the reference to the service function from the global service registration object by using the pre-determined lookup name of the service.

Section Three contains code that defines three service functions. The section also contains code that uses three unique names to register each of the functions with the global "service_register_obj". The first function is test_service1 (par1, par2, par3), which accepts an XML string in the first parameter, and displays two popup message windows. This example also shows a method for using an XML data variable as a function parameter to pass data between two components. Second and third functions just display a popup message each. Section Four contains an XML string and code that defines a test function services_use_demo(e). The code in the test function uses the names or the services to look up the services functions and shows how to request the services.

This publish-and-subscribe method may be used to exchange data between any two components in the application. One component contains code for registering one or more services as shown in the section three. Other components are designed to access the services as shown in the section four if the names of the services are known at the time of development for the other components.

Example 1

Pie Chart

The presentation image of a full pie chart component is shown in FIG. 3a. The full pie chart component contains subcomponents such as legend 302, Info-table 304 and pie slices 303 (for presenting all the slices of the pie chart). Three presentation code sections may respectively present the subcomponents, which are embedded in the presentation code of the container pie chart component. The presentation code of the pie chart contains communication code allowing the subcomponents to collaborate and communicate with each other. When the mouse moves over any of the legend items, the component on the screen highlights the corresponding slice in the pie, and displays its relevant information in the info-table 304.

The presentation code of the component includes the presentation code of the subcomponents such as legend 302, info-table 304 and pie-slices 303. It may also contain additional code for performing miscellaneous tasks such as placing the subcomponents within the component. A separate chuck of SVG code, defined by tags <g> and </g>, is dedicated to each of the subcomponents. The location, as defined by coordinates, of each of the subcomponents in the component is determined by group's attribute transform= "translate(X Y)", where X and Y are coordinates of the group with respect to the top left corner of the container group.

While the presentation code shown in the above examples is associated with graphic images, it is not so limited. Application code, including presentation code, may be used to control hardware devices through interface such as ActiveX supported on the platform. Therefore, presentation code includes any type of code that is proper for the platform. Also, the application code may contain code for communicating with a server to get latest data to update component by using Asynchronous JavaScript and XML (Ajax)

Section-G

Component Code Generator (CCG)

A component code generator (CCG) is built with code design, which upon initialization and execution (e.g., calling its CGM), generates the presentation code of component. The code listing in Appendix E shows an example of CCG for component rotate_banner.

1. Basic Code Structures and Properties

A CCG contains the code necessary for generating component code for presenting the component in graphic image. Since a component is ordinarily presented on a computer screen to reflect some properties observed in the real world, the CCG of the component requires some application data. However, it is not required to contain any code of application logic for retrieving business data, analyzing system performance, and modeling systems. For example, a reusable CCG class to present GUI components (e.g., a pie chart or line chart) contains methods for inputting necessary data. Each GUI CCG object instance uses the input data to generate presentation code for the GUI component.

The basic CCGs implemented in the present invention are derived from a base abstract class. One of the possible implementations is AgileTemplate.java (Appendix D1) even though the class name is arbitrary. AgileTemplate.java has a variable UNQ_ID, which is initialized at the time of object instantiation by using any utility tool to assign a unique ID (a number or string) to each of the CCG object instances derived from the base class. An ID assigned to one component must not be used by any of other components in the SVG document. This utility tool remembers all of the assigned IDs and provides a new ID for each new assignment request. In this simple example, AgileTemplate.java uses utility class UniqStrId given in Appendix D3, which returns a unique id whenever called. A UNQ_ID is appended to each of the names of variables and SVG element IDs in order to avoid conflicts in the service names and variable names in the SVG document. Each CCG also implements the abstract method CGM defined in the base class. Optionally, the CCGs can be implemented in their own classes even though this implementation might require specific attention from application developers who use the CCGs. AjileTemplate.java also uses an instance of AC_Info class (Appendix D2) and an instance of AppConfigInfo class (Appendix D4) for miscellaneous data such as data about application, context, user or client.

A CCG, which implements its own presentation logic, includes variables for storing data, one or more constructors, and methods for initializing the data for variables. The CCG implements simple methods for inputting data and, optionally, specifying presentation style such as drawing colors, font sizes, and other customization information. The CCG also takes the parameters of the requesting browser as inputs. It uses all the data to create presentation code in SVG and JavaScript language.

The CCG supports code-generating method (CGM), which is a service method of its instantiated object. When this method is called, it generates a chunk of SVG or equivalent code, referred to as presentation code, which is compatible with the requesting platform. CGM is an abstract method in the super class, AgileTemplate, and is supported in all CCGs used in this invention. Since CGM is defined in the super class, each derived subclass inherits the CGM from the supper class and overrides it by the CGM of the subclass. By way of example, the CGM in a pie chart subclass generates presentation code to show a pie chart while the CGM in a line chart subclass generates the presentation code to display a line chart.

The CCG can also implement coupling-methods, which are used for setting or getting integration data of the component created by the CCG. This integration data is used to create inter-component communications code between the component and other components (or application code). Examples for the coupling-methods are setCallBackName( ) and getBannerUpdateMethodName( ) in appendix E.

A container CCG may contain class variables to store all the information necessary to initialize the CCGs of the sub-components. The container CCG has constructors and methods for initializing its object variables, validates the data in the variables, and uses them to initialize each of the CCG objects of subcomponents. It initializes the variables for each of the CCG objects before it calls the CGM of each CCG object.

A container CCG may get other CCGs by any importing method provided in the programming language. The CCGs that are used as subcomponents by another container CCG is referred to as subcomponent CCGs. Subcomponent CCGs can be directly imported into a container CCG using a suitable method. When the container CCG and the subcomponents CCGs are coded in Java, instantiated objects of subcomponent CCGs can be input into the container CCG object by using its methods such as set-methods, constructors or initialization methods. A JSP application can select one or more subcomponent CCGs for inputting into container CCGs such as Rotate-banner or Show-layer to generate container component code as part of the application code. In this case, the subcomponent CCGs are selectable by the JSP and inputted into container CCG. The objects of subcomponent CCGs are instantiated outside the code of the container CCG (but inside the JSP file), and are imported into the container CCG object. The container CCG then calls the CGM of each of the imported subcomponent CCG objects to generate the presentation code of the subcomponents.

To present a component such as a pie chart or a map on the platform using an instantiated CCG class object, it is necessary to provide the minimum amount of data for initializing the object. If the CCG is coded in Java, data initiation can be done using set methods and constructor methods of the CCG class. Additional methods are used in the CCG for customizing the component. The object of the CCG may accept a wide range of data concerning presentation style, user-interface feel and look, user's profile, business matter, requesting browser, and even information about other CCGs, whose objects can be used to build subcomponents.

Example 2

Pseudo Code for Using CGM of the CCG

The basic steps for generating presentation code are shown by following pseudo code:
10. GUI_CCG_PieChart Pie1=new GUI_CCG_PieChart (page_info, "Portfolio at the End of 2nd Quarter");
20. Double val[ ]={10000, 12000, 14000, 16000, 18000};
30. String names [ ]={"Sun", "Microsoft", "IBM", "Intel", "Oracle"};
40. Pie1.setData(5, val, names);
50. Pie1.CGM(out);

First, a Java class, GUI_CCG_PieChart, is defined. In line 10, a class object is instantiated with a title "Portfolio at the End of 2nd Quarter". The object saves this title in the string variable and uses it in generating presentation code. In line 20, an array of doubles is assigned with five performance numbers, one for each of five companies. In line 30, five name strings are assigned with respective company names. The value assigned to a double in the "val" array corresponds to the company name in the "names" array with the same index. In line 40, Pie1.setData is called to set data for the object Pie1 in run time so that the object is initialized with the values in the "val" array and the "name" array. In line 50, the CGM of the object Pie1 is called to generate the presentation code in the SVG format. By using this CCG to generate the presentation code of the pie, it is unnecessary to write hundreds of lines of presentation code for all image elements in the pie chart line by line. A Java developer, who uses reusable GUI CCG classes as building parts, needs little knowledge of the SVG language. To port an application in the CCG form to a newer-version SVG platform, the only thing required is to redesign the presentation code in the GUI CCG class without the need for modifying the JSP code that uses the reusable GUI CCG classes.

When output stream 'OUT' is used in Java to create presentation code for a component, anything to be generated by the "OUT" statement is appended to the document currently under creation. If this component is used as a subcomponent of a larger component, the code of this component is embedded at a proper location in the SVG code of the larger component.

Figure 3C:
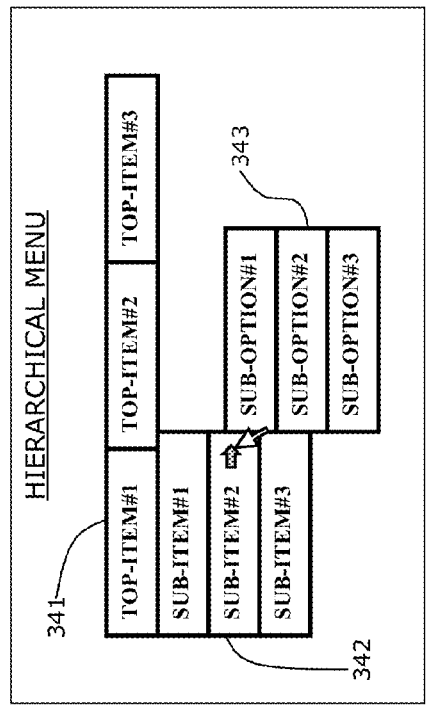
FIG. 3c shows a hierarchical menu component, according to one embodiment.
Figure 3D:
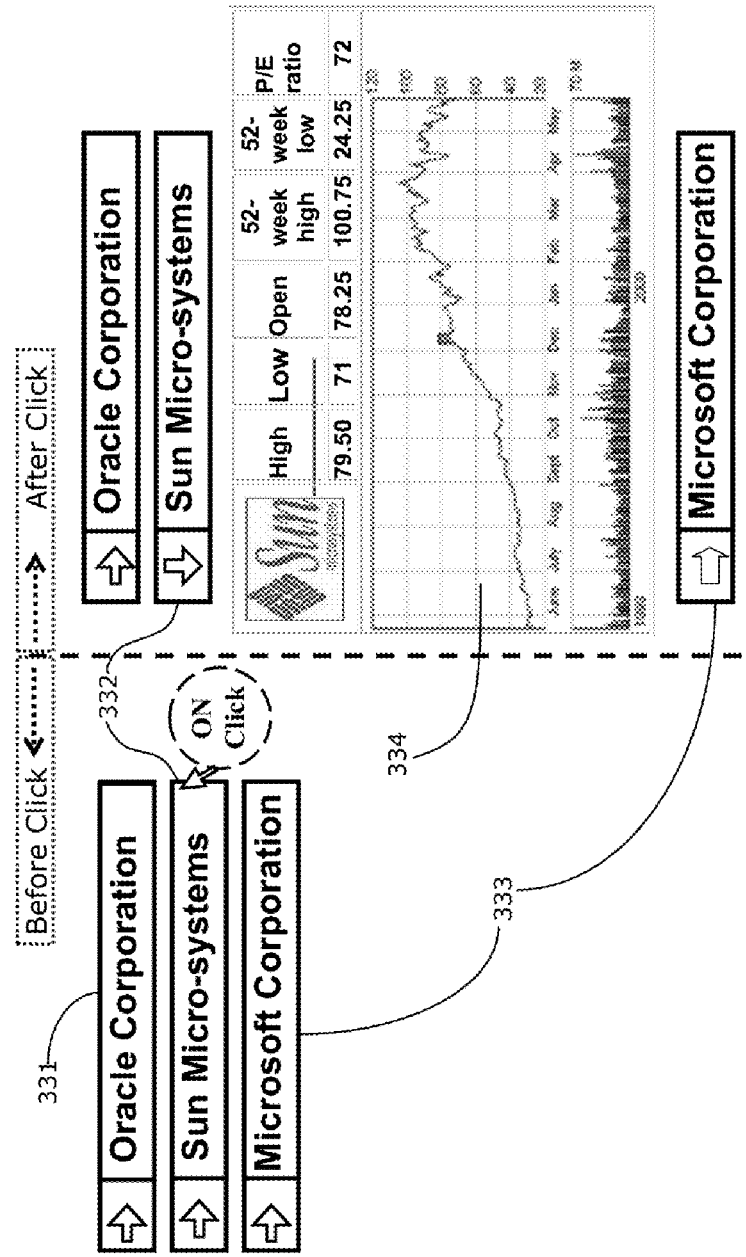
FIG. 3d shows a component using an expandable menu for showing a stock chart for a selected tickle on the expendable menu, according to one embodiment.

Generally, one GUI CCG class is needed for each type of components: one for the pie chart component (FIG. 3a), one for the bar chart component, one for the hierarchical menu component (FIG. 3c), and one for the expandable menu component (as shown in FIG. 3d)

The objective of designing GUI CCG class is that the CGM of each of the GUI CCG objects is able to generate intended presentation code dynamically using run-time updated data. Furthermore, the object instance of each of GUI CCGs should be highly configurable so that each of the GUI CCGs is reusable in a large number of possible applications. Plural GUI CCGs objects are instantiated in an application, each of the objects for a component instance. For example, a GUI CCG class for pie chart is used to instantiate multiple CCG objects and initialize each CCG object with respective data to present a pie chart.

Section-H

Business Logic in Component-Code Generator

A CCG may contain code of business logic. When a CCG contains code of business logic in the container component or in the CCGs of the subcomponents, it is referred to as Application Component Code Generator (ACCG). An ACCG is designed to perform or support specific application functions or designed to encapsulate many functionalities such as application and presentation logics to independently create an application component.

1. Basic Properties of ACCG

Figure 4A:
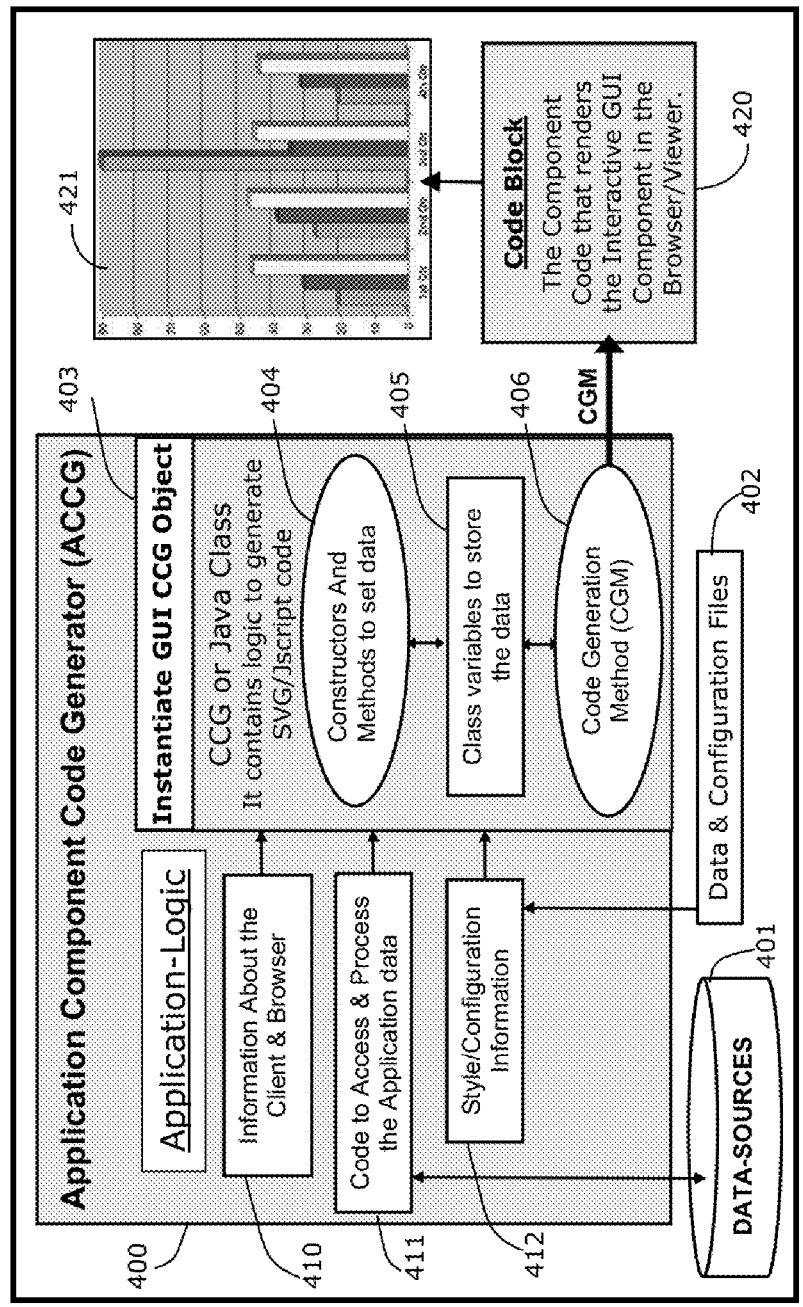
FIGS. 4a and 4b shows using reusable GUI CCG classes and data structure of an ACCG or JSP, according to one embodiment.
Figure 4B:
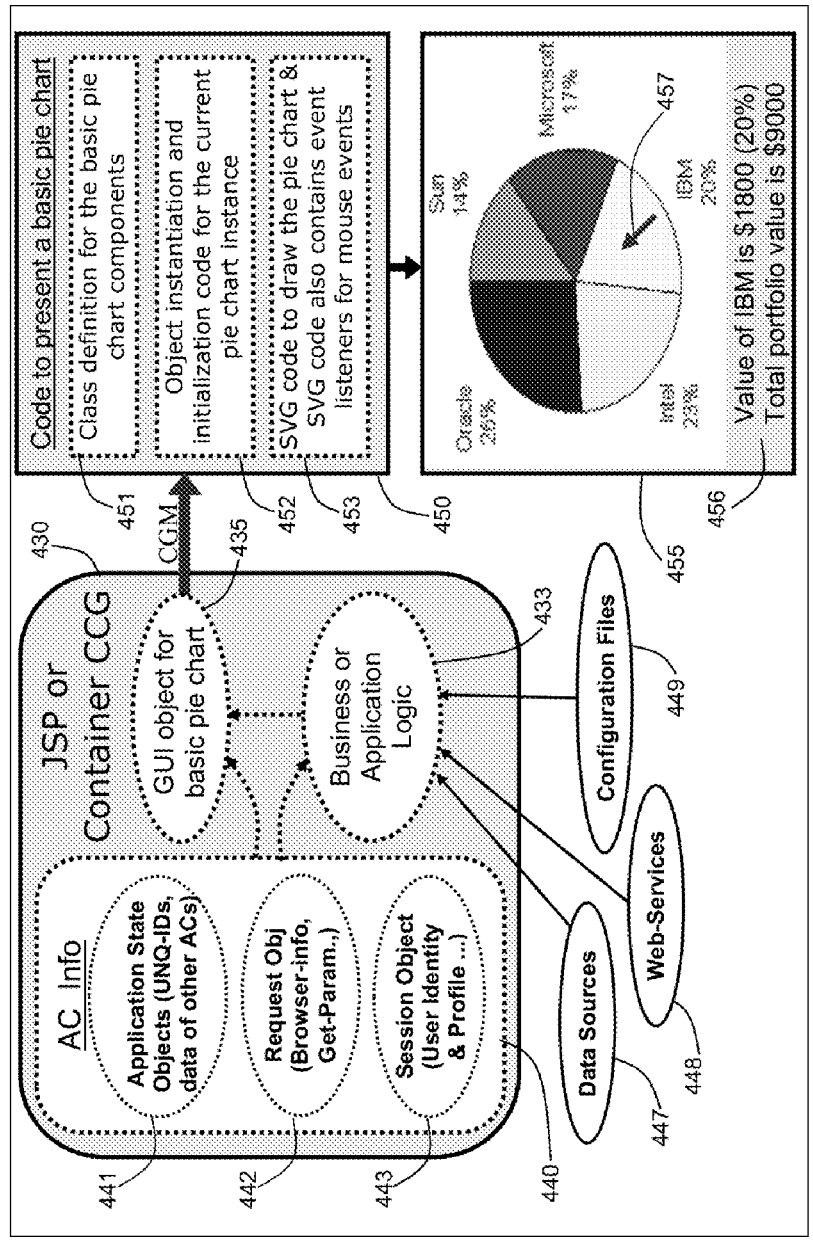

An ACCG is a special type of Java class and contains all the characteristics of CCG (FIG. 4a or 4b). It also supports the CGM so that its instantiated class objects are freely interchangeable with other CCG objects (e.g., to use for subcomponents). Therefore, an ACCG that is derived from the super class AgileTemplate also supports the same CGM used in the CCG. Both ACCG and CCG objects may be used as building blocks or subcomponents in the same way to generate the presentation code of subcomponents.

In an ACCG, the code of presentation logic and application logic are encapsulated in the object class (FIGS. 4, 5).

FIG. 4a shows a simple application component code generator ('ACCG') 400 and a GUI component 421 created by the ACCG 400. The ACCG 400 uses a reusable GUI CCG 403 for bar chart. The server application or business logic in the ACCG 400 includes code to access application data 411 from data sources 401 and configuration files 402. The server application code uses the data and information from an object 410 that has data about client and browser to initialize the GUI CCG 403. The GUI CCG 403 includes methods 404 to input data and variables 405 to store data. The GUI CCG 403 also includes a CGM (Code Generation Method) 406 to generate the code block 420 to render the GUI component 421 on the client. If the code block 420 is properly included on a web page and viewed in an appropriate browser, it displays the GUI component 421.

FIG. 4b depicts an internal structure of a JSP (or container CCG) 430 that uses a reusable GUI CCG 435 of a basic pie chart for generating application code 450 for presenting a basic pie chart 455. In a preferred embodiment JSP 430 uses AC_Info object 440, which includes of many objects such as application state objects 441, objects containing information about requesting browser 442 and session or context object 443 containing information about requesting user, his profile/preferences, DB-connections and application context. Appendix-D2 has implementation of the AC_Info 440. A preferred embodiment creates an instance of AC_Info object 440 for each page request and passes the AC_Info object 440 to each and every CCG. The JSP 430 implements application logic 433 for accessing data from various sources (e.g. 447 and 448) and configuration files 449 and processes the data for getting necessary information for properly initializing and configuring reusable GUI CCG object 435. The JSP 430 calls CGM of GUI CCG object 435 for generation application code 450, where the application presents pie chart 455 when included in a webpage. Pie chart 455 displays two-line information 456 up on mouse 457 move on any of the slices of pie chart.

The application code 450 created by GUI CCG object 435 contains three main sections (i) a code section 451 which includes definitions of JavaScript classes including functions and variables for implementation of various features necessary to draw or present and properly operate an interactive GUI Component, where features include handling events (e.g., mouse over) or update display upon change of data, (ii) a code section 452 which includes instantiating and initializing objects and variables for the GUI component and (iii) a code section 453 which includes markup language code (e.g. SVG, Flex/FXG or XAML) for drawing the image of the component using various graphics elements and setting event listeners on certain graphics elements. The code section of class and function definitions 451 need to be included only once in an application or webpage, if the JSP 430 uses multiple instances of a reusable GUI CCG 435 class (e.g. pie charts) for presenting multiple GUI components (e.g. multiple pie charts).

The code section 453 including markup language is optional, since it is possible to implement JavaScript functions for drawing the image of GUI component in section 451. In that case during the initialization of the webpage, these JavaScript functions are called to draw the image of GUI component. It is also possible to implement JavaScript functions in section 451 for getting data from the server and use the data to redraw or update the GUI component. Implementing such JavaScript functions for getting data from a server and drawing the image of the GUI component is preferable, if the requirement is to redraw GUI component (e.g. 455) periodically (i.e. at a given time interval) or up on an event such as notification of change of data. Appendix-P2 and P3 contains sample application code of Airplane. Appendix-A, K1 and K2 contains sample application code of RotateBanner and RadioButtons respectively.

Figure 4C:
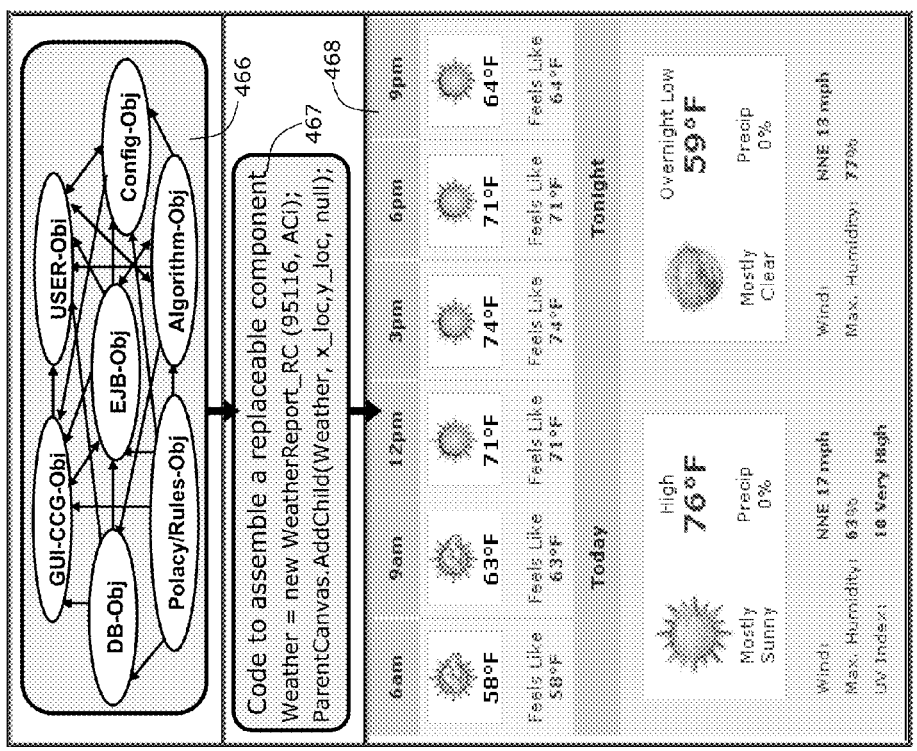
FIG. 4c shows internal construction code and tightly coupled dependencies between various objects in an ACCG class, according to one embodiment.
Figure 4D:
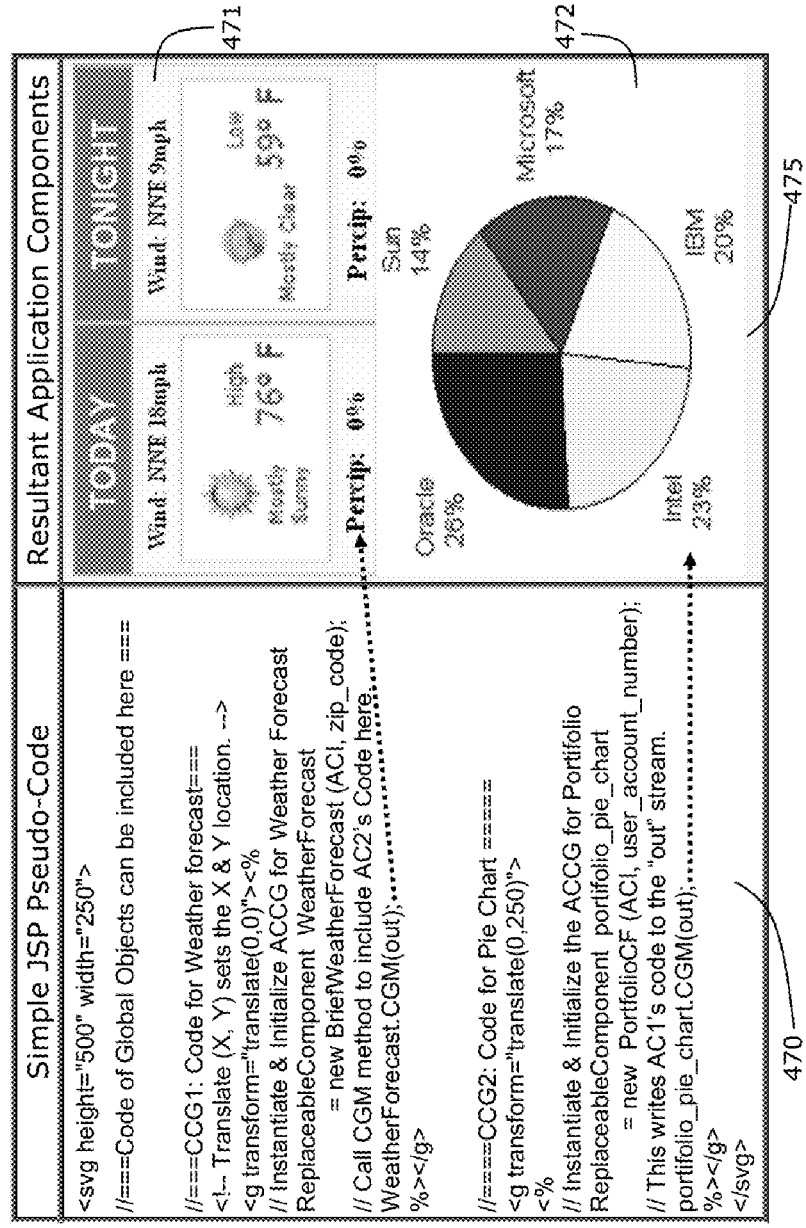
FIG. 4d shows using two ACCGs for building two subcomponents in an application or container component, according to one embodiment.

FIG. 4c shows a sample replaceable component class 466 that uses many objects and implements application logic for constructing a GUI component for presenting weather report for a given zip code. The implementation of class for the replaceable component is not that much different than implementing a CGI (e.g. JSP or servlet) for presenting weather report for a given zip code. Both the class and CGI must implement component construction code including of code for accessing data from data sources, application logic for processing the data and presentation logic for presenting the component. The main difference is that the class definition encapsulates construction code of a GUI component. This allows any application to incorporate the component (e.g. 468) by including an object instance (e.g. 467). FIG. 4d shows sample code 470 required to include two components 471 and 472 in an application 475 by including two object instances of two simple replaceable component classes.

Figure 5A:
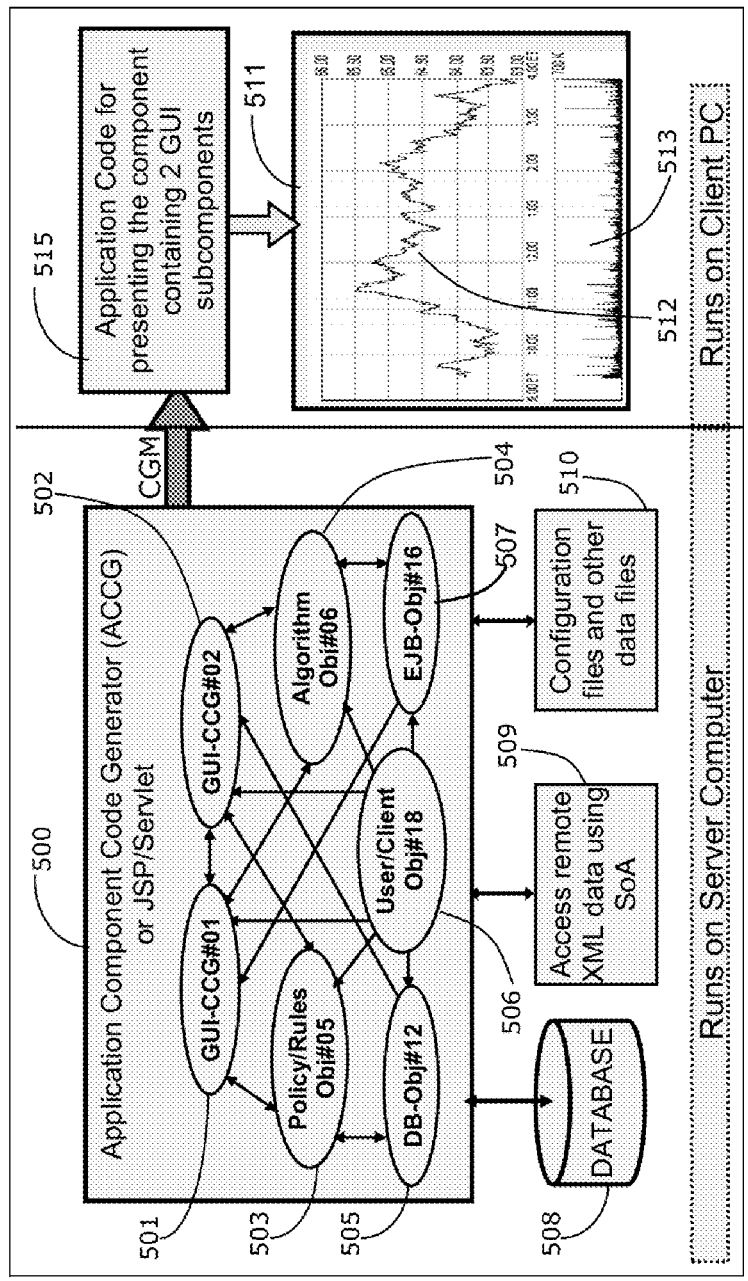
FIGS. 5a and 5b shows a block diagram for encapsulating the code of business logic and the code of presentation logic (e.g., GUI CCG) in an ACCG, according to one embodiment.
Figure 5B:
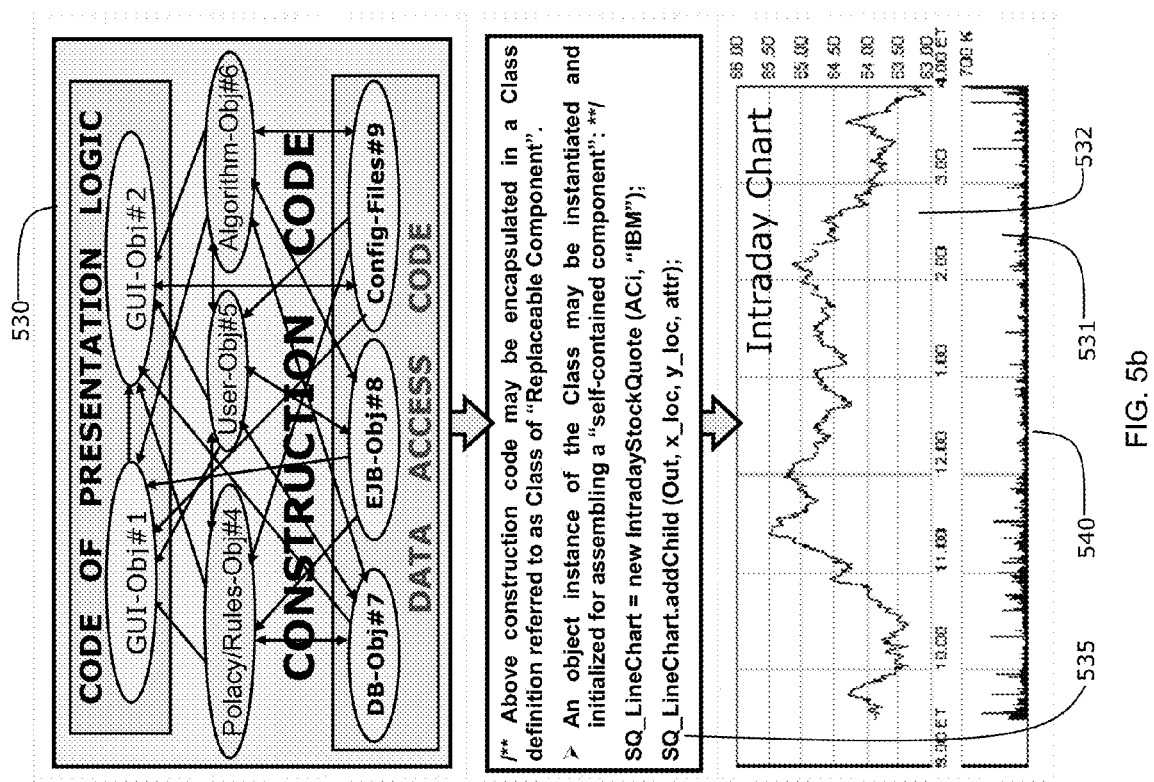

FIG. 5a shows an ACCG 500 and a GUI component 511 created by the ACCG 500. The ACCG 500 is run on a first platform, which is usually a server, and its resultant component code 515 is sent to a second platform, which is normally a client, for presenting GUI component 511. The code of presentation logic of the ACCG 500 uses two GUI objects 501 and 502, which creates the subcomponents 512 and 513 of the GUI component 511. In addition, the ACCG 500 also uses other objects such as database object 505, user/client object 506, EJB object 507, policy/rules object 503, and algorithm object 504. The ACCG 500 also contains code for accessing external data sources such as configuration-files 501, remote XML data 509, and database server 508. The ACCG 500 also includes code for processing all the data and initializing the GUI objects 501 and 502 in creating GUI component 511. The ACCG 500 also contains code for accessing external data sources such as configuration-files 501, remote XML data 509, and database server 508. Similarly, FIG. 5b shows another ACCG class for IntradayStockQuote that encapsulates construction code 530 for building a self-contained component 540 having subcomponents 531 and 532, where an ACCG object 535 instance generates code for presenting intraday stock quotes for a given ticker.

The database object 505 may contain application data from database sources; the user/client object 506 may contain style and configuration data, user's profile, preference information, client IP address and browser information; EJB object 507 may contain business data, the policy/rules object 503 may contain rules related to access security; and the algorithm object 504 may contain computation methods for processing application data. They are all placed in variables and methods independent of the portion of code for presenting the component. Once any of the class objects 501-507 is instantiated, the values of the variables, which are used in presenting the component, are set in run time.

The code of application logic of the ACCG 500 is designed to access internal and external data such as configuration-files 501, remote XML data 509, and database server 508, initialize the variables, and get information about the platform such as the version and type of the requesting browser. Also, the methods used in application logic are called to process application data for customization before they are used to generate the presentation code. By calling its CGM, the ACCG 500 object generates platform-compatible presentation code of the component in real time.

Figure 7A:
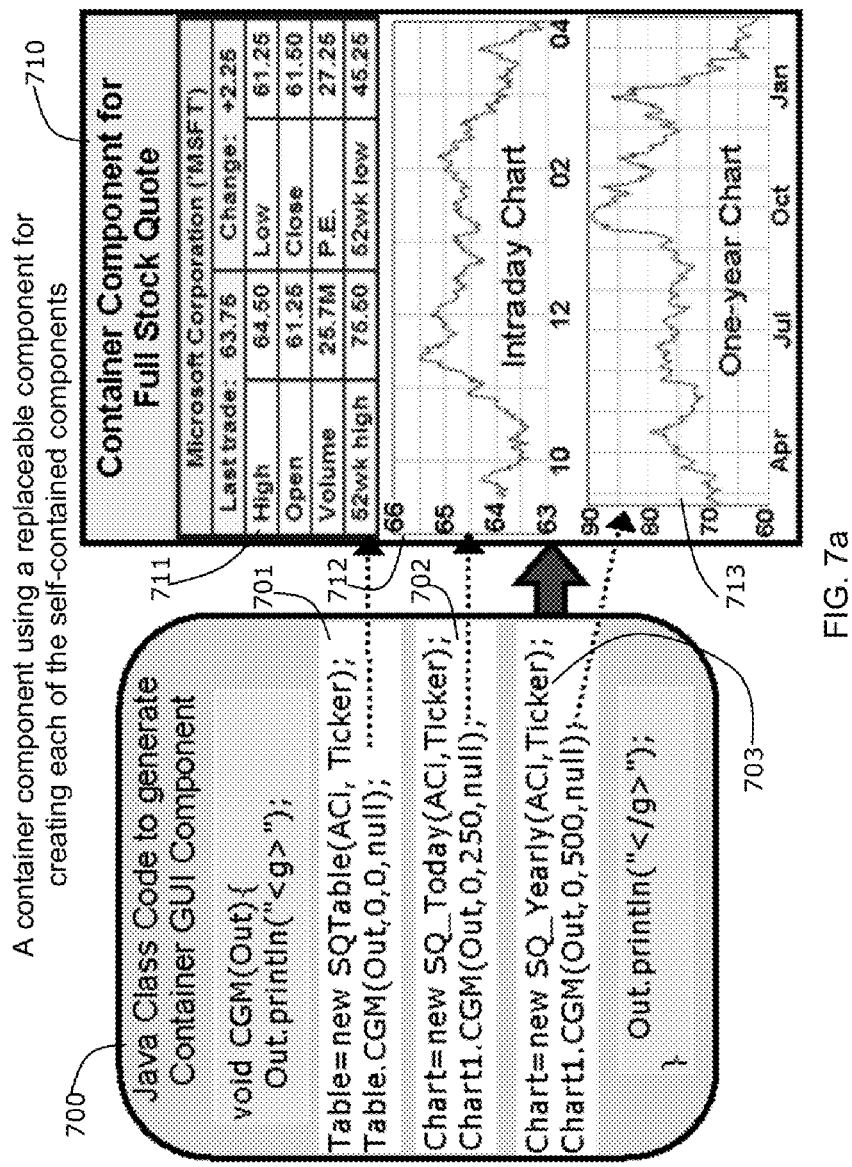
FIG. 7a shows the process of building a container component containing three subcomponents, where each subcomponent is created by using an ACCG, according to one embodiment.

Instead of implementing its own presentation-logic code, an ACCG can use the objects of the GUI CCGs such as pie chart, trees and table to generate presentation code for the subcomponents. In this case, the ACCG 500 contains code for instantiating and initializing subcomponent CCG objects and code for calling the CGM of the objects to generate the presentation code of the subcomponents. Hence, the ACCG 500 is also a container CCG. FIG. 3d shows a component created by an ACCG using expandable menu and stock quote components. FIG. 7a shows how an ACCG uses three other ACCGs for respective three subcomponents to build a container component.

It is desirable that the ACCG class is capable of being easily redesigned to meet changing business needs or to be easily replaceable. So it is desirable that the ACCG class requires minimal initialization by fully encapsulating both application logic code and presentation logic code. While it is not required to implement an ACCG in an object class, use of class definition in the ACCG to encapsulate both the code of presentation logic and the code of business logic makes the ACCG replaceable.

Because an ACCG is a special member of the CCGs, it has the basic functions of CCGs. Therefore, an ACCG class object of a component is used as subcomponent by a container ACCG to generate the presentation code of the subcomponent. By repeating this process, application developers can build larger and larger components.

An ACCG not only generates subcomponents for the presentation code of the container component using subcomponent CCGs but also generates the rest of the presentation code such as placing/organizing the subcomponents generated (e.g., by enclosing CGMs of subcomponent CCGs between tags <g> and </g>) and fills in any gaps (as illustrated in FIG. 4d).

In some cases, the subcomponents in a container component may need to communicate or exchange data with each other. FIG. 10a shows a container CCG 1020 for generating application code for container component 1023. The container CCG 1020 includes server code for instantiating and initializing two CCGs 1021 and 1022. The container component also includes code for calling each of the CGM of each CCG 1021 and 1022 to generate application code for subcomponents 1024 and 1025 respectively. In this case the subcomponents 1024 and 1025 cannot communicate or exchange data with each other. In comparison, FIG. 10b shows how communication code is generated for two subcomponents. The container CCG 1030 in FIG. 10b includes server code for instantiating and initializing two CCGs 1031 and 1032. The container component also includes code to call each of the CGM of the CCG 1031 and 1032 to generate application code for subcomponents 1035 and 1036, respectively. In addition, the container CCG 1030 includes server "code of integration logic" 1033, which calls coupling-methods of CCGs 1031 and 1032 to set or get integration data for generating necessary application code 1037 allowing for the communication between the subcomponents 1035, 1036 and the container component 1034.

Inter-component communication code is useful in many cases. In the pie chart (FIG. 3a), for instance, the Info-table component displays a few pieces of information when the mouse is moved over certain hot spots. Also, it is desirable to highlight the relevant parts of the chart when the mouse is moved on to the top of an item in the legend.

Example 3

Pseudo Code of Stock Quote Component

The following is an example of an ACCG that generates presentation code to present the stock information (FIG. 2b). The ACCG in this example is a Java-class component that takes a company ticker symbol as input and generates presentation code to present the stock information as shown in the figure.

The ACCG of the stock component implements a method or a constructor for setting a ticker symbol. The application developer may implement application logic in the class definition. The CGM uses the ticker symbol to access other data sources for the real-time stock information of the company associated with the ticker, and then generates the presentation code. To generate the component's presentation code, it may use GUI CCG classes of table and charts to present its subcomponents.

A stock object is instantiated with the ticker symbol of the company as below:

StockInfoPCF SiACCG1=new StockInfoPCF("SUNW");

An application developer may instantiate stock objects for tickers ORCL and MSFT, respectively.

StockInfoPCF SiPCF2=new StockInfoPCF("ORCL");
StockInfoPCF SiPCF3=new StockInfoPCF("MSFT");

These ACCG objects are passed to another ACCG or CCG as building blocks. The ACCG objects, upon being called by the container CCG, generate the presentation code to present the stock information, respectively, for those companies.

Figure 6C:
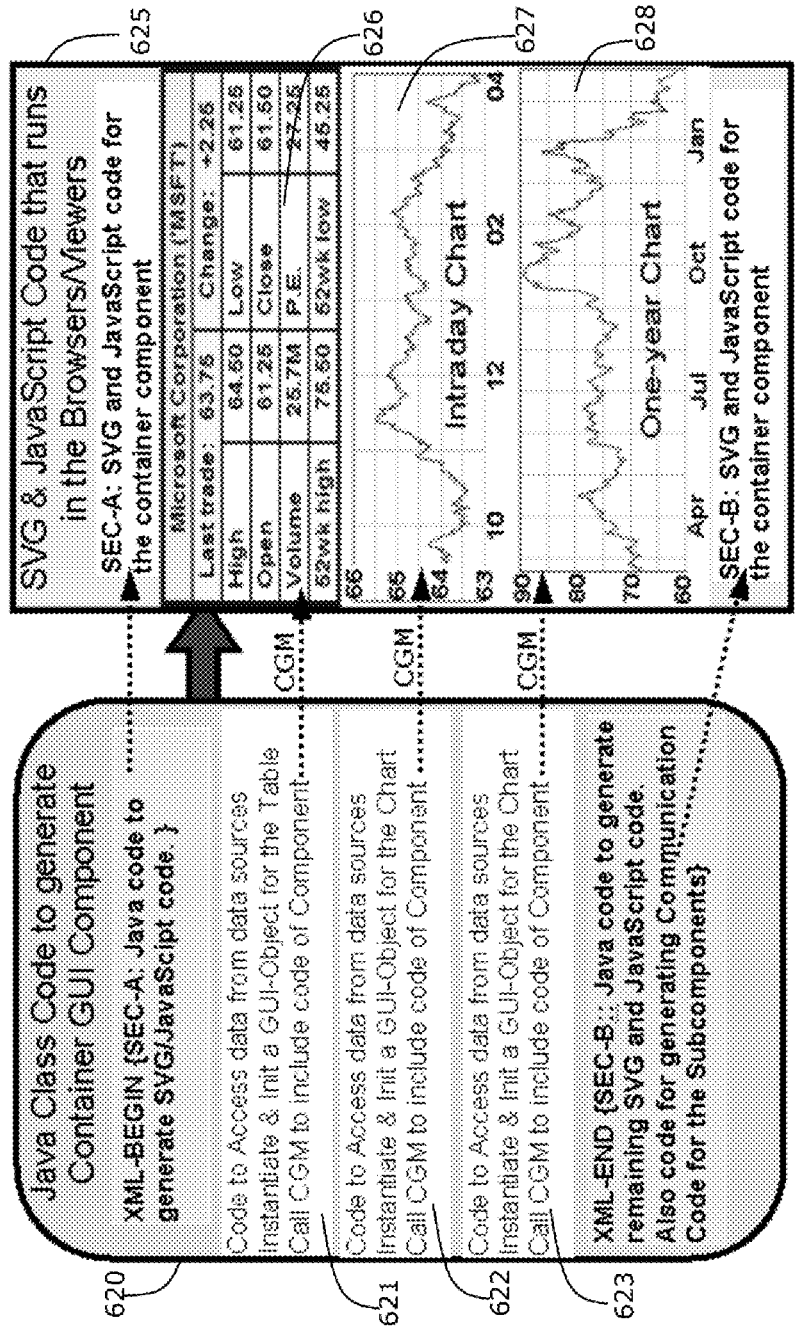
FIG. 6c shows a process of building a container application containing three subcomponents, according to one embodiment.
Figure 7B:
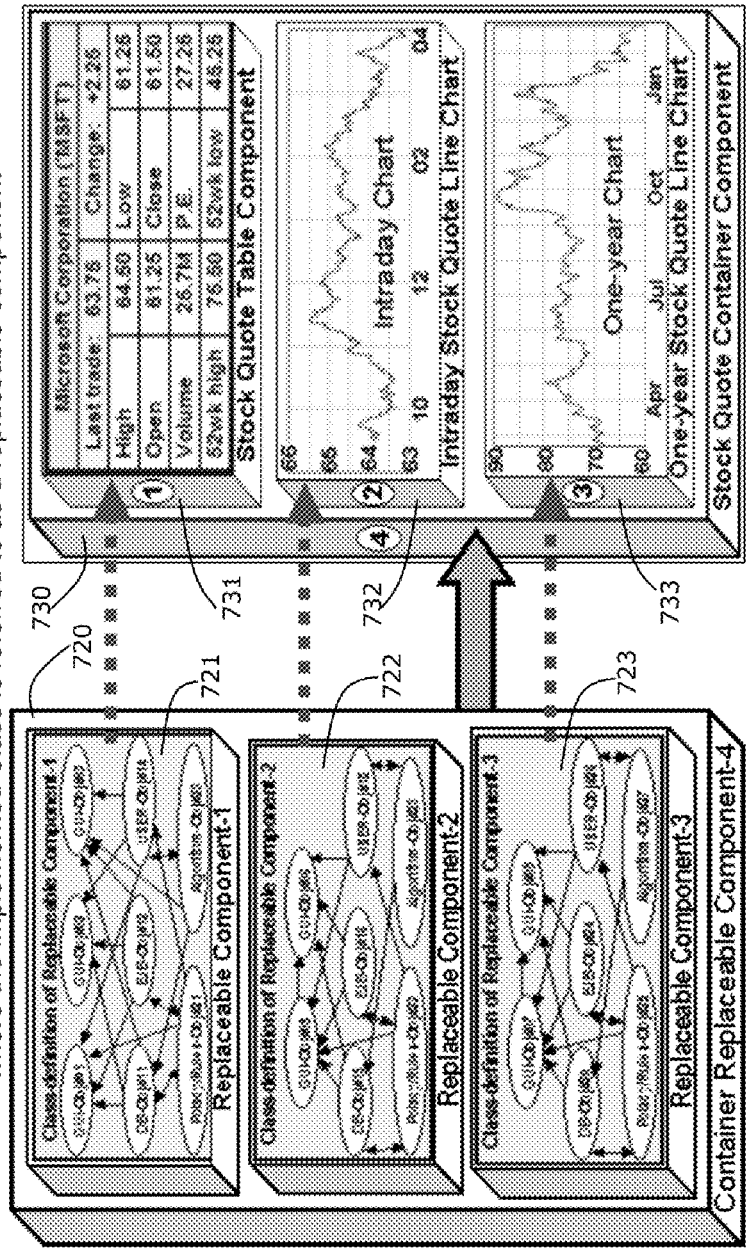
FIG. 7b shows construction code of each of the ACCGs for each of the subcomponents in FIG. 7a, according to one embodiment.

FIG. 7a shows code for a container component code generator ('Container CCG') 700 that uses ACCGs for generating a code block, which presents the container component 710 when it is included in a web application and viewed on appropriate browser. The container CCG 700 uses the code section 701 to get the application code for presenting the subcomponent 711. It then uses the code section 702 to get the application code for presenting subcomponent 712. Likewise, it uses the code section 703 to get the application code for presenting the subcomponent 713. FIG. 6c shows alternative method without using ACCGs for generating each of the same three subcomponents 626, 627, and 628, where container CCG 620 implements whole construction code 621, 622, and 623 for each of the subcomponents 626, 627, and 628. For example, server code block 622 implements construction code for presenting subcomponent 627. FIG. 7b shows a pictorial view of construction code (721, 722, and 723) in a container CCG 720 for each of the subcomponents (731, 732, and 733) in a container component 730. For example, ACCG 722 encapsulates construction code for subcomponent 732.

Appendix D1 contains a sample implementation of CGM (Out, X_LOC, Y_LOC, Attributes), which places the subcomponent at given coordinates (X_LOC,Y_LOC) with respect to its container canvas such as SVG group. This CGM includes an SVG group (i.e., <g transform='translate(X Y)' and </g>) at the coordinates and calls the main CGM for including the code of the subcomponent in the group.

Many ACCG classes are built, respectively, for one-year, six-month and three-month stock information. They take the ticker symbols and build the charts for one-year, six-month and three-month charts for the companies using customer preference data. The container ACCG can dynamically use if-then-else statements to instantiate ACCG objects in building the presentation code respectively for one-year, six-month, and three-month periods.

10. AgileTempate Subchart=null;
20. If (user_prefers==yearly_chart)
30. Subchart=StockYearlyChart(aci,"ORCL");
40. Else
50. If (user_prefers==half yearly)
60. Subchart=new StockHalfYearlyChart(aci,"ORCL");
70. Else
80. Subchart=new StockQuarterlyChart(aci,"ORCL");
90. Subchart.CGM(Out);

The above pseudo code shows a method of dynamically selecting subcomponents and building custom container component. The ACCGs of those sub-charts may contain methods for accessing the data about user preferences and the parameters of the requesting device. The instantiated objects of the subcomponent ACCGs may use the data and the parameters to customize the style of the charts. For example, to change the business logic or fonts of the charts, the ACCG classes for the subcomponents are redesigned. The container ACCG in FIG. 7a may dynamically select their subcomponents and assemble the presentation code generated by the subcomponents.

Figure 14A:
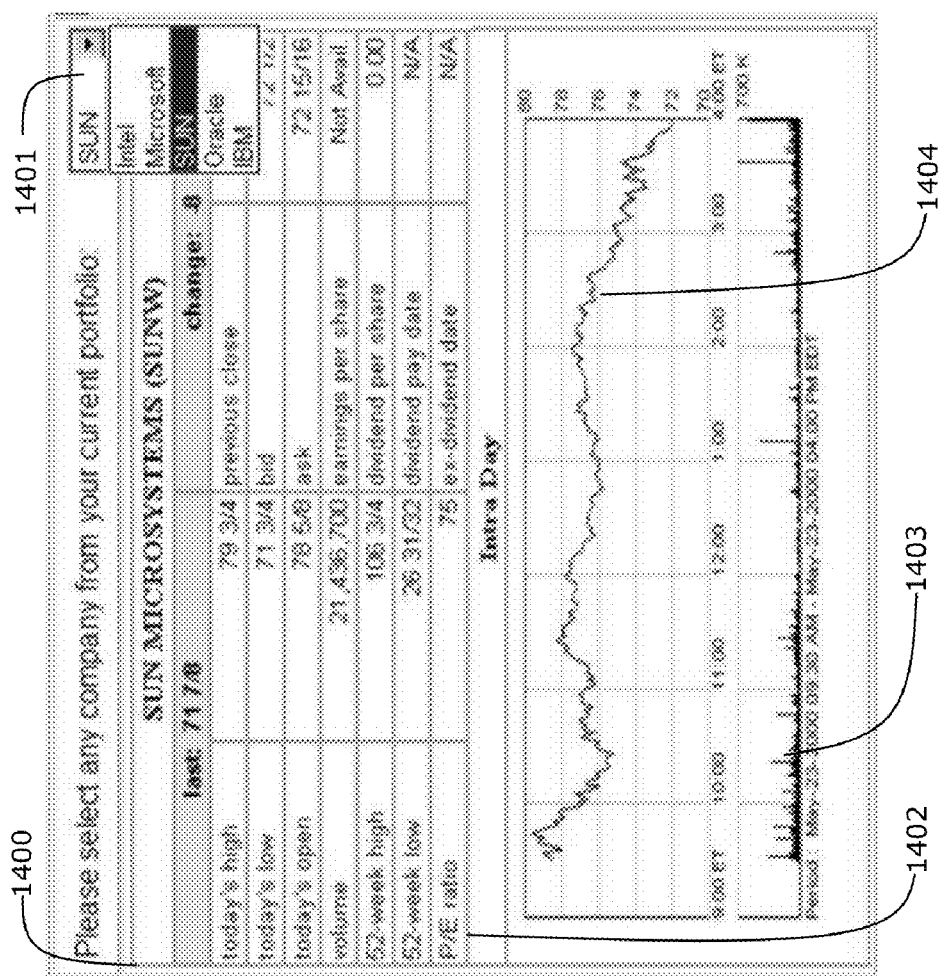
FIG. 14a shows presentation component for presenting stock chart created by a container CCG using Rotate-banner and Dropdown Selection Menu, according to one embodiment.

It is often desirable to create presentation code of many subcomponents (e.g., stock quotes in FIG. 2b) using real-time data. The presentation code may also contain other types of subcomponents, and each of the subcomponents in turn is custom-built on the basis of user's profile and preferences. The container ACCG (FIG. 14a) supports a method for inputting an array of strings holding the names of companies (shown in Drop-down list) and an array of CCG objects (displaying the stock quotes).

2. Black Box Assembling Method

Black box assembling refers to assembling of subcomponents for building a container component without knowing the types or classes of subcomponents. If the container CCG does not need to create communication code for the subcomponents, it could blindly assemble the presentation code of subcomponents.

A container CCG is designed to use the CGM of the CCG objects of suitable subcomponents built for line charts, trees and tables to generate presentation code.

(a) The Basic Features and Functions of Container CCGs

Container CCGs are designed to perform the following functions:

(i) instantiating and initializing the CCG objects of subcomponents or providing methods for inputting the CCG objects of the subcomponents, (ii) calling the CGMs of the objects to generate the presentation code of the subcomponents at the right location in the resultant presentation code of the container component, and (iii) generating miscellaneous code necessary for the container component.

As shown in Appendices A and B, the presentation code of the container component basically includes SVG code, JavaScript code and the presentation code of subcomponents. It can contain code in any of other programming languages proper on the rendering platform.

A container CCG is designed so that when the instantiated object of the container is run (e.g., at server), the CGM of the object is able to generate the container component's functional presentation code (runs on the client), which includes SVG code, JavaScript, and the presentation code of included subcomponents. All necessary code to be generated is coded in the container CGM. If the container CCG is coded in Java language to generate JavaScript and SVG code, the CGM of the container CCG simply uses the OUT statement using quoted strings to print the JavaScript and SVG code. The location of the lines of JavaScript code or SVG code on the SVG document depends upon the calling sequence. If the CCG is coded in other languages such as C (which can be used to implement OOP, indirectly) and C++, the developer simply uses PRINTF or COUT statements in the container CGM. Regardless of the language used in coding the container CCG, the developer must plan in advance to design the application code statements necessary to display the component on computer screen properly. The developer can use a series of string-printing statements in the container CGM for generating wanted application code statements. When the container CCG is run, it generates the intended application code statements. This simple technique can be used to generate SVG code, JavaScript code, and other miscellaneous code necessary for the container component.

Since the container CCG generates the presentation code of subcomponents by calling the CGMs of the subcomponent CCG objects, the developer has no need to write the presentation code of subcomponents in the container CGM line by line. What the developer needs to consider is where to place the presentation code of each of the subcomponents by using proper coordinate values for each subcomponent on the display screen relative to the container component. Usually coordinates of each subcomponent are with respect the top left corner of container component. Different coordinate systems are used in different cases, depending upon the programming languages and technologies.

When application code of a container component is written in SVG, the location of a subcomponent's presentation code in the container component code file is independent of the location of the subcomponent image on the display screen and its shape. The subcomponent image location is defined by the X and Y values in transform='translate (X Y)' with respect to the coordinates of the enclosing element/component location. Therefore, presentation code blocks for plural subcomponents may be placed in the presentation code of the container component in any order. To define the location of a subcomponent image on the display screen, the container CCG can use the following statements to place presentation code for the subcomponent:

10. out.println("<g transform='translate(X Y)'>");
    20. SubCCG.CGM(out); //writes presentation code.
    30. out.println("</g>");

One exception to the above rule is when the SVG images of two subcomponents overlap on the display screen (e.g., one is on top of the other), the presentation code of the top subcomponent must be placed after the presentation code of the bottom subcomponent in the application code.

In comparison, if the presentation code of subcomponents is written in HTML, the locations of the subcomponent images are determined by the order the subcomponents appear. If a subcomponent is in a table cell, the call to CGM of the subcomponent is made between two tags that define the cell:

10. out.println("<TABLE WIDTH=100%>");
    20. out.println("<TR>"); out.println("<TD>");
    30. SubCCG.CGM(out);.
    40. out.println("</TD>"); out.println("</TR>");
    50. out.println("</TABLE>");

In this example, Lines 10, 20, 30, and 40 define a table and a table cell. In Line 3, a call is made to run the CGM for the subcomponent SubCCG. The application code of the component from the CGM is filled into the cell of the table.

If an SVG document is included in an HTML document, the SVG document must be placed in a separate file which may be included in the HTML page using the EMBED tag.

Many XML-based graphics technologies may not allow for inclusion of documents from other XML-based graphics technologies. Therefore, it is necessary to consult technical manuals of respective graphic technologies to determine whether two particular technologies can be used in combination.

The AgileTemplate abstract class may also contain commonly useful methods and properties such as (X, Y) coordinates for presenting the component and the method of defining the size of the bounding box by width and height. If those methods and properties are supported in the abstract class, they may also be accessed from CCG objects.

After a first container CCG is properly built for a component, an object of the container CCG can be used to build a second larger container CCG by using this black-box assembling technique. In building this second container component, the developer may use the same approach the developer used in coding the first container CCG, subject to the same limitation discussed below. The CGM of the first container CCG is able to generate complete presentation code for its component during execution. The presentation code of the second container CCG includes the presentation code of the first container component, which is now a subcomponent in the second large container component. The presentation code of the first container component naturally includes SVG code, JavaScript code, and the presentation code of the subcomponents of the first container component.

(b) The Limitation on the Use of Black-Box Assembling Method

Block box assembling technique is useful only in the case where the subcomponents in application code do not need to communicate with each other and the container CCG does not need to know the names of service methods and the names of variables used by the subcomponents. In this case, the object of any subcomponent CCG is passed to the container CCG as a building block as long as the subcomponent is appropriate for the container component from the business point of view. The container CCG uses only the properties and methods supported in the base class AgileTemplate. Since all the CCGs are derived from AgileTemplate class, which supports CGM, any container CCG may properly call the CGM of the CCG objects to generate presentation code.

3. Container CCGs that Use the Black-Box Assembling Method

The following CCGs are used to build component using the black-box assembling technique:

(a) Rotate-banner container CCG (its source code in Appendix E and a sample component code in Appendix A). This container CCG takes a list of CCG objects for subcomponents by input and displays one subcomponent at a time and displays next subcomponent in the list when a user clicks on its hotspot.

(b) TAB CCG. It takes a list of CCG objects and a list of names of the objects, displays the first component and all the names at the top of the display area, and, upon being clicked on a new name, displays its component and highlights the name;

(c) Zoom-and-pan CCG. It takes any CCG object and displays its component in a zooming and panning area, and also provides controls to zoom and pan the component.

(d) Drawing-area CCG. It takes a list of CCG objects and each of their coordinates, and draws their components at proper locations (its source code is in Appendix R1 and sample test code in Appendix R2).

(e) Scroll-bars CCG that takes a large CCG object and displays its component in an area with scroll bars. It is useful for displaying a larger image in a smaller area.

4. Container CCGs that can Use Subcomponent CCG Objects

The following container CCGs may use any subcomponent by using the black-box assembling technique:

(a). The tool-tip. The CCG for the tool tip may take any CCG object instead of just a string. It displays the component generated by the CCG object when mouse moves onto any hotspot. This component could be just a string or a large component, which in turn contains many subcomponents of its own. Since any CCG object may be used to build a popup component, it is flexible to build and customize the tool-tip. Likewise, the footer or title of a chart is presented by using CCG objects. In that case, the method that configures this part can accept a CCG object or a string to present the component for the footer or title.

(b). Legend CCG. It can take a list of CCG objects and each legend item is created using a CCG object.

(c). Common menu CCG. The CCG for creating a common menu such as hierarchical menus, pull-down menus or popup menus can use any CCG objects in any of the cells of the menus.

(d). A Landmark CCG. It may take two CCG objects. It displays a component, which is created by a first CCG object. When a user clicks on a hotspot of the first component on screen, it pops up a component, which is created by a second CCG object. This CCG is used to present landmarks as hotspots and a popup window for showing detailed information about a selected landmark on top of an image such as a city map image (i.e., City map is used as a background image).

3. Application of ACCGs.

ACCGs were designed in this invention to create the following kinds of components.

(a). Custom Weather Chart

An application developer may create a custom weather ACCG, which takes a city name denoted by a zip code and generates presentation code to show the weather conditions for the selected zip code. The ACCG class may have a method or constructor to set the value for the zip code. For example:

AgileTemplate Weather=new Weather_ACCG (20203);

The ACCG class may also have a method, which implements the application logic for retrieving the data on the weather conditions for any selected zip code. When a class object is instantiated using entered zip code, the method for retrieving the data on the weather conditions is called before the data is used by CGM in generating the presentation code. When a user inputs a zip code, the ACCG object then retrieves the data on the weather conditions for the selected zip code. After the necessary data is obtained, the CGM of the ACCG object generates the presentation code to display image showing the weather conditions. This ACCG object is used as a building block in another ACCG or CCG to build a further larger application component.

Likewise, an application developer may create a custom stock movement charts ACCG, which takes a ticker-symbol of a company and generates presentation code to show a stock movement chart for the company. The ACCG class may have a method or constructor to set the value for the ticker symbol. For example:

AgileTemplate StockCharts=new StockCharts ACCG ("IBM");

The ACCG class may also have a method, which implements the application logic for retrieving the data for the stock charts for any given ticker symbol. The CGM of ACCG could use the data and GUI CCG classes for stock charts to generate code to present the stock-chart component.

(b). Mouse-Over Menu

The mouse-over popup is shown in FIG. 3b. This popup menu uses two components. It presents a first component showing "Chicago Weather" 321. When the mouse 323 is moved over this component 321, it opens a popup window 322, which shows a second component. The popup window 322, which is another layer, will be closed when the mouse is moved away from both of the components. Each component passed to the mouse-over popup object may be just a string variable or a CCG object. If it is a CCG object, the popup object uses the CGM of the CCG object to generate the presentation code to present the component in a popup layer or window.

(c). Expandable Menu

FIG. 3d shows an example GUI component created by an instance of a container reusable GUI CCG class for expandable menu. The GUI component shows three menus components 331, 332 and 333. Upon clicking on the menu component 332, it moves the menu 333 downwardly to make a space for displaying the subcomponent 334. Upon clicking on the menu component 332 again, it hides the subcomponent 334 and moves the menu 333 back to its original location.

Expandable component may have one or more pairs of parent and child components. If the child is already displayed, clicking on the parent will cause it removed. Both the child and the parent components are just string variables or any CCG object. If it is a CCG object, it uses its CGM to generate the presentation code. The CCG uses all subcomponents' presentation code as building blocks to build its presentation code. It is an example of HTML/DHMTL component.

(d). Hierarchical Menu

FIG. 3c shows an example GUI component created by an instance of a container reusable GUI CCG class for hierarchical menu. The GUI component displays top-items 341 of the hierarchical menu. If the mouse is moved over one of the top-items, the GUI component displays the sub-items 342 for the top-item. If the mouse further moved over one of the sub-items, the GUI component displays sub-options 343. When the mouse is moved away from the GUI component, it closes sub-items 342 and sub-options 343.

A hierarchical menu may have many top menu items. Each top menu item may have many submenu items. The menu presentation code contains logic to present the associated sub-menu. These submenu items may have sub-options and so on. This kind of hierarchy may go to many levels. To present a hierarchical menu, a user may instantiate the CCG class for the hierarchical menu. The top menu items and sub-menu items are specified and passed using set methods of the hierarchical menu GUI CCG class. It is an example of HTML/DHTML component.

6. Avoiding Conflicts in Variables and Method Names in Application Code

A large SVG document created by using a container CCG for a component may contain the presentation code of many subcomponents. The presentation code of each of the subcomponents may further contain the presentation code of subcomponents. The presentation code of component and/or subcomponents may contain several JavaScript methods and variables. Furthermore, some SVG (or HTML) elements have IDs, which are used to access and manipulate their attributes such as values, colors, visible or hidden states, and location and sizes. Many of the methods and variables are global in scope. Hence, any variable may be accessed from anywhere in the web document or application.

If two subcomponents contain the same variable or method names in their presentation code, the presentation code has name conflicts, which may cause a variety of performance problems. To avoid name conflicts, each CCG may use a common utility object for generating a unique seed ID and affixes it to the names of methods and variables in the component code generated by the CCG. Therefore, all global variables and service methods in the presentation code have unique names.

Since the variables or objects in the SVG document are global, all the presentation code can have access to the variables and use the services of the objects. The following shows a technique to track onload Init-Handlers for the presentation code of plural subcomponents.

Web browsers or SVG viewers support the 'onload' event trigger, which calls a method, when it finishes loading the document, as follows:
<svg xmlns="http://www.w3.org/svg" onload="onload_init_method(evt)">

Unfortunately, only one method may be called for an SVG document. When the presentation code of several subcomponents is dynamically created in run time, the presentation code of each of the plural subcomponents needs to be notified on the 'onload' event so that it is initialized. To overcome the limitation, a globally reserved name onload_init_list is used.
var onload_init_list=new Array( );

For any component that is to be notified on the 'onload' event, a notification function is to be added to the array by using the following statement.
onload_init_list [onload_init_list.length]=AC1_UNQ_ID.init_pb_onload;

The statement can be placed in any location of the SVG document. Each component in the SVG document, which needs to be notified on the onload event, may have this statement in its presentation code. This array grows whenever a new function is added as this statement is encountered while the SVG document is being loaded. When the loading of document is finished, the global method onload_init_method (evt) is executed. It executes all the notification methods by looping through the list:

10. function onload_init_method (evt) {
20. for (var i=0; i<onload_init_listlength; i++)
30. (onload_init_list[i])(evt);
40. }

Section-I

Integration Logic in Components Code Generators

A container CCG may contain special code, which is referred to as server code of integration logic, for generating several lines of application code. The application code is used on a client to establish communication between the container and any subcomponent or between any two subcomponents (FIG. 10b and FIG. 10c).

The CGMs of the CCG subcomponents in a container CCG generate the presentation code of the subcomponents. The code of integration logic implemented in the container CCG is responsible for generating communication code necessary for inter-component communication and includes the communication code in the code of the component.

1. The Purpose of the Communication Code Generated by Integration Logic.

In a model where a container CCG uses CCGs for subcomponents A and B to build component C, the container component C has its own method CM, subcomponent A has a method AM, and subcomponent B has a method BM, the server code of integration logic is designed during development so that it is able to generate the communication code to support the following basic model actions ("model actions") in run time on the client:

(a) User's action (e.g., a mouse click) on the container component C leads to the running of the method AM of a subcomponent A;

(b) User's action on the subcomponent A leads to the running of the method CM of the container component C;

(c) User's action on the subcomponent A leads to the running of the method BM of the subcomponent B;

(d) Data exchange between the container component C and the subcomponent A for example through global shared variable; and (e) Data exchange between the subcomponent A and the subcomponent B for example by calling the function BM and passing data through the parameters of BM, and getting response data from the object returned by the BM.

A user's action on a component for those relevant model actions means anything, which directly or indirectly affects the component. It includes user's clicking on a hotspot associated with a listener function, state change in the component, a timer event, and data arrival, which affects the component.

The code of integration logic is not required to generate all code necessary for performing all those listed basic actions. However, whenever integration logic is implemented to generate communication code to support a given model action, it needs to produce all code necessary to support the action. If it is necessary to pass application data in performing a given action, the code of integration logic is required to produce the portion of communication code, which allows the application data to pass from one component to another.

FIG. 10c shows sample code structure of server code of a container CCG 1050 and code structure of application code of the container component 1055 generated by the container CCG 1050. The server code includes code to instantiate and initialize CCG1 object 1051, and also calls CCG1's CGM to generate the application code 1056 for a subcomponent PC1. The server code includes code to instantiate and initialize CCG2 object 1053, which generates the application code 1058 for a subcomponent PC2. The server code includes code 1052 to generate application code for a Callback_func function 1057 in the application code of the container component 1055.

The server code section 1052 includes a call to a coupling-method of CCG1 (i.e., CCG1.GetServiceMethodName ( )) for getting the name of a service function implemented in the application code 1056 of PC1. The server code section 1053 includes a call to a coupling-method (i.e., CCG2.5etEventCallback ("Callback_func")) requesting CCG2 to set a callback in the application code 1058 of PC2. Calling the coupling-method for setting a callback causes the CCG2 1053 to include necessary communication code in the application code 1058 of PC2, in order for PC2 to call the callback function 1057 upon a specific event. The callback (i.e., "Callback_func") 1057 calls the service function implemented in the component code of PC1.

2. The Functions of the Code of Integration Logic

The code of integration logic means the code to be run on the server for generating communication code that is required to support any or all of the model actions on the client computer (e.g., FIGS. 14a, 14b, and FIGS. 11a-b). When the code of integration logic is executed on a server, it performs the functions of (1) getting the name of the service method implemented in the component code (run on the client) generated by the CCG object (run at server) of the first subcomponent, (2) picking or getting a unique callback name (i.e., to avoid possible name conflicts) for a callback function and generating necessary declaration statement of the callback function (3) using the name of the service method of the first subcomponent for generating the body for the callback function in a language proper on the rendering platform and properly passing the parameter to invoke the service method (3) setting the callback name to the CCG object (run at server) of a second subcomponent to be called on a specific event on the subcomponent, (4) setting the callback causes the second CCG to generate code statements in the application code of second subcomponent to register the callback function in the component code, and (5) creating necessary variables and/or XML strings (e.g., for passing as parameters to the callback or to get response) used by the container and subcomponents to exchange data. Upon the specific event on the second subcomponent (runs on the client) results in calling the callback function (runs on the client) which in turn calls the service method of the first subcomponent (runs on the client). Therefore occurrence of respective event on the second subcomponent will cause the first subcomponent to run the service method through the callback function. Obviously, the code of integration logic is designed to create plural communication paths or collaboration modes by using multiple callback functions associated with multiple event handlers.

Communication code generated by code of integration logic to facilitate collaboration or communication between components normally contains (1) necessary declaration statements of one or more callback functions, (2) the bodies of the callback functions for calling service methods of certain components, (3) necessary code for registration of the callback functions with certain other components for invoking the callback functions by the code in the components upon the occurrence of appropriate events, and (4) new variables such as common variables, XML strings, or hidden variables used by the container component or subcomponents in exchanging data which is necessary to support the basic actions.

Communication code may include any and all of those code elements necessary to support any one of the basic model actions. However, it is not required that communication code contains all the above four types of code statements. For example, the need for using new variables and parameters depends on the nature of the subcomponent, the details implementation of the container CCG, and the model actions used in the container CCG.

3. Accessing the Coupling-Methods of CCG for Creating Inter-Component Communication (a) Getting the Service Methods of Subcomponents by Using the Coupling-Methods of CCGs.

Each CCG class for building subcomponents can implement several coupling-methods for getting the names of service methods implemented in the code of the subcomponent of a CCG object. The container CCG calls appropriate coupling-method of CCG object to get the name of a specific service method of the subcomponent. Methods used in the preferred embodiments of the present invention for getting the name of a service method include: (a) calling appropriate coupling-method of the CCG object for getting the name of a target service method that is implemented in the code of the subcomponent, (b) alternative coupling-methods are implemented for indirectly getting the service method implemented in a subcomponent from its CCG object. For example, a coupling-method can take a name of a JavaScript variable as a parameter and initialize the variable with the reference to the service method, as illustrated below:

10. <script>
   20. var sm_ref_pointer_UID=func { };
   30. function Callback_UID (param, data) {
   40. sm_ref pointer_UID (data);
   50.}</script>

60. <% CCGx.getServiceMethodRef("sm_ref_pointer_UID");
   70. CCGx.CGM (Out); %>

Line 20 defines an empty function pointer variable. Lines 30 to 40 implements a callback function, which calls the empty function (declared in line 20). Line 60 calls a coupling-method of CCGx by passing the name of empty function pointer. Line 70 calls CGM of CCGx, which generates an additional line of code in the application code of the subcomponent that initializes the function pointer to a specific service method (e.g., sm_ref_pointer_UID=AC_UID.service_method).

Alternatively, the container CCG may get the names of service methods of a subcomponent indirectly. The CCG object may provide (or return) an XML string which contains the names of service methods, a name of a variable in the container component code where the reference to a service method is stored, an object which is able to return the names of service methods, or an address of an object which is able to return the names of the service methods of the subcomponent. The container CCG gets directly or indirectly the names of the service methods used in the presentation code of the subcomponent. If the container CCG is developed in other OOP language, the implementation for getting the names of service methods must be proper in the language.

This kind of methods is referred to as "coupling-methods of CCG for getting service methods (of its component)" because the ultimate goal of these coupling-methods are directly or indirectly getting the service methods implemented in the code of components of the CCG Objects.

(b). Importing Abstract Class Type CCGs by Container CCG for Including and Coupling Subcomponents If a container CCG needs to integrate two subcomponents created by imported two CCG objects, each of the CCG objects should belong to appropriate class that includes certain properties or has certain behavior (e.g., class interfaces for getting or setting integration data). For example, an abstract class may define these necessary properties such as define coupling-methods as abstract methods to be implemented by the derived CCG classes. Using the interfaces of the abstract class the code of the integration logic in the container CCG can properly call the coupling-methods of the CCG objects for the subcomponents to get necessary integration data. Since each coupling-method for returning the name of a service method is defined in the abstract class, all the derived class objects of the subcomponents must have an implementation of the method for returning the name of appropriate service method.

(c). Setting the Names of Callback Functions by Using the Coupling-Methods of CCG Each CCG class for building subcomponents can implement several coupling-methods for setting names of callback methods to be called upon specific events in the subcomponent of a CCG object (that is an instance of the CCG class). The container CCG calls appropriate coupling-method of CCG object for inputting the name of a callback. This inputting of each callback function name causes the CCG of the subcomponent to generate part of the communication code for invoking callback function upon respective events in the subcomponent. The callback function is implemented in the code of container component generated by container CCG or in the subcomponent generated by another CCG.

10. <script>
   20. function Clallback_UID (param, data) {
   30. other_AC_service_method (data);
   40. } </script>
   50. <% CCGx. setCallBackName("Callback_UID");
   60. CCGx.CGM(Out); %>

Lines 20 to 40 generate code for the callback function "Clallback_UID". Line 50 inputs the callback name using appropriate coupling-method of CCGx before the calling of the CGM of the CCGx in line 60. The call to the coupling-method at 50 causes the CGM to include necessary communication code, which allows the subcomponent to invoke the callback upon the occurrence of an appropriate event on the client.

Alternatively, one of the coupling-methods of the CCG object of a subcomponent is designed to choose the name for a callback function and returns the callback name to the container CCG. The container CCG's integration logic code uses the callback name in generating the implementation code of the callback function in the container component's code. Below is the sample code of integration logic of the container CCG:

10. <script>
20. function <% Out.print (CCGx.getCallBackName ( )); %>(param, data) {
30. other_AC_service_method (data);
40. }</script>
50. <% CCGx.CGM(Out); %>

The code in lines 10 to 40 generates the application code of a callback function. Line 20 calls coupling-method of CCGx object for getting the name of the callback. This call causes the CCGx not only to pick a unique name (i.e., to avoid possible name conflict) for the callback but also register the callback for the subcomponent of CCGx.

Alternatively, the code of integration logic of a container CCG can get the service method of a subcomponent of CCG by calling an appropriate coupling-method of a CCG object. Then, the container CCG can use the service method name to generate the code for registering a callback in the code of the container component, as shown below:

10. <script>
20. function Callcabk_UID (param, data) {
30. other_AC_service_method (data);
40. }</script>
50. <% CCGx.CGM(Out);
60. var AC_serv_UID=CCGx.getServFuncToRegisterCallback( )
70. out.println ("<script>"+AC_serv_UID+"(Callback_UID); </script>" %>

Lines 10 to 40 generate the code of a callback function. Line 50 calls the CGM of CCGx to include the code in the subcomponent. Line 60 gets the name of the appropriate service method of the subcomponent for registering the callback. Line 70 generates a line of communication code, which calls the service method of the subcomponent for registering the callback. Although the subcomponent of the CCGx triggers the callback, the CCGx does not generate part of the communication code, which registers the callback. In this method, the integration logic of the container CCG generates necessary communication code for registering the callback.

The CCG object may get the name directly or indirectly. The integration logic may provide an XML string, which contains necessary information such as the name of callback and/or event trigger, an object, which is able to return the names.

(d). Use of Registration Class

The SVG document may have global variables and objects. It is possible to define a service registration class (e.g., 'service_register_class') and instantiate a shared global object with a reserved name such as 'service_register_obj'. Now, any component's code can access this global object using this reserved name (one version of service registration class is disclosed in Appendix C1 and C2). Service methods or objects of multiple components or subcomponents are registered according to the general steps shown in FIGS. 8a, 8b.

FIG. 8a shows the code structure of a web application where plural components 801-803 and 805-807 are coupled through a global service registration object 804. Each of the service-providing components 801, 802 and 803 includes the code for registering each of its services by entering the name of the service and a reference to the service method (e.g., name-and-method pair) into an array in the registration object 804. Each of the service-consuming components 805, 806, and 807 includes the code for looking up each of the registered services from the service registration object 804 and the code for invoking the service. After a service of a service providing component is registered with the service registration object 804, any service-consuming component can use the service by calling the registration object using the service name.

FIG. 8b is a block diagram for the publishing-and-subscribing method to couple any two components in an application. The service-providing component 822 registers or publishes a service name and a reference to the service object or the function with the service registration object or a directory component 821. The service-consuming component 823 queries the directory component 821 for the service using the service name. The directory component 821 returns a reference to the service object. The service-consuming 823 uses the reference to the service object to request the service of service-providing component 822, which processes the service request and sends a response. In this case, the service request may carry data in an XML string and the response may also include data in an XML string.

The 'service_register_class' is implemented so that it supports methods to register services with a service-name ID. In this case, services are accessed by methods using the service-name ID. Using this technique, any component can register its service with a unique name ID. If any other component needs that service, the component can look up the service using the name ID.

This name of the service registration object can be agreed upon at the beginning of the designing of the application and reserved so that the component code of plural subcomponents are implemented to register their services. At the beginning of the SVG document, the service registration object is instantiated.

var services_register_obj=new service_register_class( );

The CCG object can generate component code to register the component's service with the 'service_register_object' with a service name ID.

The following statement is used to add a service:

services_register_obj.add_service("ShoppingCart", shopping_cart_service);

"ShoppingCart" is a name ID and shopping_cart_service is a reference to a shopping cart service function. Any CCG object that creates the presentation code of the component that uses this service knows the service-name ID, and can invoke the service by using the following statement:

services_register_obj.get_service("ShoppingCart", xml_data, callback_name);

By looking through the directory (e.g., for name ID "ShoppingCart"), the registration object finds the reference to the service: shopping_cart_service and calls the function by passing the xml_data and callback_name as parameters to the function The service-providing component uses data in the xml_data to process the request (i.e., add the item to the cart). The shopping cart component saves the reference to the function "callback_name" and notifies the service requester (i.e., the subcomponent for shopping item) by calling the function if the shopping item is deleted from shopping cart later.

Developers of both service-providing components and service-consuming components may agree on the names of the services (e.g., "ShoppingCart") in advance.

To accomplish more complex and multi-faceted inter-component communication, the presentation code, which provides services, can register an object containing plural methods and variables. In response to a request, the lookup service returns an object, which contains service methods (or callback functions) and variables. The requesting component then gets the service methods or callback functions, the values in the variables, and invokes appropriate actions of the services of the servicing component.

In the code of integration logic, the container CCG may use the service method names along with XML string variable names (based on predefined XML schema) as parameters to the callback functions. The XML-data strings might be saved in the application code of subcomponents and used by JavaScript functions, which supports the communication between the presentation code of the subcomponents and the presentation code of the container component.

There are many more methods, which are used to get the names of service methods of a subcomponent. For example, the CGM of a CCG of a subcomponent is designed so that it embeds necessary integration data such as the names of service methods of the subcomponent in the code of the subcomponent. The integration data are marked up by two reserved special tags (or in any way that can mark out the integration data). The container CCG contains the code for calling the CGM of the subcomponent and the code for storing the presentation code of the subcomponent in a string variable. The container CCG also contains a utility method for searching the presentation code for the reserved tags to locate and get the names of the service methods. After getting the names of the service methods from the presentation code, the container CCG then places the presentation code of the subcomponent in proper location of the container component code and starts writing communication code using the names (or integration data) extracted from the application code of the subcomponent.

(e) Communication with External Components.

After a container CCG generates functional presentation code of the container component. All service methods of its subcomponents and the container component may be accessed by external components or any other code on the web page.

4. Container CCGs and Integration Logic Examples

The container CCG disclosed in the preferred embodiment (FIGS. 9a, 9b) is implemented in a Java class, which is extended from the base class AgileTemplate. The container CCG contains code of one or more methods of inputting/importing or instantiating/initializing the CCG objects of subcomponents, and code of integration logic. It optionally contains the code of business logic.

A container CCG containing code of business logic is also an ACCG even though it gets the presentation code of subcomponents by calling subcomponent CCG objects. Conversely, an ACCG, which contains code of integration logic, is also a container CCG whether the ACCG gets the subcomponent CCG objects by instantiation or importation.

Example 4

Pseudo Code of a Simple Container CCG

This example shows the pseudo code of a simple container CCG in JSP or Servlet using components as building blocks. The container CCG instantiates and initializes CCGs of two subcomponents C1 and C2, uses their CGMs to generate the presentation code to present PC1 and PC2, and places the presentation code at appropriate location in its component code. The CGM of the larger ACCG may include the following pseudo code:

10. Including container component code such as format and placement;
// Code for generating presentation code of PC1
20. Instantiating CCG object C1;
30. Using the container CCG object's input data to initialize the C1;
40. Generate_Presentation_Code PC1: Call C1.CGM (out);
50. Including container component code such as format and placement;
// Code for generating presentation code of PC2
60. Instantiating a CCG object C2;
70. Using the container object's input data to initialize the C2;
80. Including container component code including code for placement;
90. Generate_Presentation_Code PC2: Call C2.CGM (out);
100. Including container component code including code for placement;
// Code of integration logic for "integrating" subcomponents PC1 and PC2
110. String SM2=C2. getServiceMethodName ( );
120. out.println ("function CB_of C1_to_control_C2 (EvtDat) {");
130. out.println (SM2+"("+EvtDat+");");
140. out.println ("}");
// Code for PC1 service-method from C1 to register a Callback,
150. String Reg_SM1=C1.getCB_AddMethodName ( );
160. out.println (Reg_SM1+"(CB_of C1_to_control_C2);");
170. Include the remaining container component code;

The pseudo code shows how the subcomponent PC1 may communicate with the subcomponent PC2. The CCG starts with the code for including container component code for format and placement. The CGM then instantiates and initializes a CCG object C1 in lines 20, 30. It then calls the CGM of the object C1 in line 40 (when this statement is run, it generates the presentation code of the PC1). Lines 60 to 100 are similar to the lines 40 to 50 except that they are for the CCG object C2 to generate the presentation code of the PC2. Code at 110-160 is the code of integration logic. It first gets the name of a service method for the PC2 in line 110. Code in lines 120-140 writes a callback function that allows the PC1 to call the service method of the PC2. Line 120 writes the name of the callback function together with a start bracket. Line 130 writes a main statement (which is also a calling statement) for calling the service method of the PC2 where the service method name SM2 will be replaced by the actual name. Additional parameters such as integration data and event are included in the main statement. Since the callback name is created by the code of integration logic in run time, it cannot be in the presentation code of the PC1. In order to allow the PC1 to call the callback function to run the service method of the PC2, the PC1 must have a code statement for invoking the callback, which is often associated with an event action or state change. To implement this function, the callback function must be registered with the invoking component, PC1. Code in line 150-160 writes a statement for registering the callback with the PC1. It first gets the service function name from the object C1 in line 150 and writes the name with necessary parameters such as callback name in paired brackets in line 160. The CGM ends after generating remaining container component code in line 170.

Thus, the application code allows the PC1 to call or communicate with the PC2. The callback is triggered by an event (e.g., a user action such as mouse click) on the PC1 or a change in the state in the PC1.

Example 5

Pseudo Code for Simple Integration Logic

Another version of the code of integration logic, which integrates subcomponents PC1 and PC2, is shown in the following pseudo code. It is assumed that in this example that the PC1 initiates communication based on an event such as a user's action or state change and calls the service method of the PC2.

10. String Second_comp_service_method=C2.getServiceMethodName( );
20. Out.printIn("function first_comp_callback_UNQ_ID (par1, par2) {");
30. Out.printIn(""+Second_comp_service_method+"(par2);");
40. Out.printIn("}");
50. String First_comp_service_method=C1.getCB_AddMethodName( );
60. Out.printIn(" "+First_comp_service_method+"(first_comp_callback_UNQ_ID);");

The statement 10 in the Integration logic gets the name of service method of the PC2 and saves the name in variable "Second_comp_service_method". The statement 20 picks up a unique name by attaching a unique ID to first_comp_callback (e.g., first_comp_callback_UNQ_ID) for a callback function to ensure that the callback name is unique. Statements 20-40 print the body of the callback function. Finally, the code of integration logic in line 50 gets a service method of the PC1 for registering the callback by calling the CCG's component service method, C1.getCB_AddMethodName( ). This method returns the service function implemented in the application code of the PC1. In line 60, the integration logic generates the application code for registering the callback.

Example 6

Pseudo Code of Integration Logic

Another version of the code of integration logic, which should be placed before the code to call the CGMs of the C1 and the C2 in the CGM of the container CCG, is shown as follows:

10. String First_comp_callback_name=C1.getCallbackMethodName( )
20. Out.printIn("var service_method_UNQ_ID=function( ){ };");
30 C2.setServiceMethodReference ("service_method_UNQ_ID");
40. Out.printIn("function"+First_comp_callback_name+"(par1, par2) {");
50. Out.printIn("service_method_UNQ_ID(par2);");
60. Out.printIn("}");

By running the statement 10, the code of integration logic in the container CCG calls a coupling-method of the C1, which picks up a callback name, and stores the name in the variable "First_comp_callback_name". The code of integration logic picks up a unique name (service_method_UNQ_ID) for the variable to store a reference to the service function of the PC2, and generates a code statement for instantiating the variable that points to a null function in line 20. Then, the statement in line 30 uses the service method setServiceMethodReference to cause a C2 object to assign a target service method of the PC2 to the function pointer variable. Line 40-60 writes a callback function body using the callback name stored in First_comp_callback_name. As discussed in the CCG class for "RotateBanner.java" for its method setServiceMethodReference, the statement in line 50 writes a statement for calling "service method UNQ ID" which contains the reference to the target service method of the PC2. Since the function pointer variable, service_method_UNQ_ID, in the callback body of the PC1 is assigned with a reference to the PC2's target service method upon the generation of the PC2, a call to the PC1's callback can invoke the PC2's target service method.

In this case, the Cis method of getting the callback name must be called before the calling of the CGM so that the CGM can use the callback name in generating the callback function and place it in the presentation code of the PC1. Thus, a triggering event occurring in the PC1 can invoke the callback, which in turn runs the associated service on the client.

Similarly, the callback name returned by getCallbackMethodName( ) is used by the code of integration logic in the container CCG to write the communication code used for the interaction between the container code and the PC1.

Each CCG may contain the code of plural service methods, which are used to get information from the CCG objects or pass the information to other CCG objects by using the set method. To integrate one subcomponent with other subcomponents or the container component, the code of integration logic may use one or more available coupling-methods of the CCG objects of the subcomponent.

General steps for the code of integration logic to create communication code between any two subcomponents are: (i) calling a coupling-method of the CCG of a first subcomponent for getting directly or indirectly a certain service method implemented in the code of the first subcomponent (ii) picking up a unique name for a callback function directly or indirectly and generating the callback function to call the service method of the first subcomponent by passing proper parameters, and (iii) calling a coupling-method of the CCG of a second subcomponent for properly registering directly or indirectly the callback function with the second subcomponent where the callback function is invoked upon occurrence of certain event on the second subcomponent on a client.

Example 7

RotateBanner.Java and ShowLayer.Java.

RotateBanner.Java (Appendix E) is a CCG class for the RotateBanner component. The application code generated by RotateBanner.java and ShowLayer.Java have been disclosed in Appendices A and B respectively. The class defines the variables for storing input subcomponents, preference data, and configuration information. The CCG has constructors, set methods for initializing the variables, and the CGM for generating the presentation code. It uses the data, objects and subcomponents in the class variables to generate its presentation code.

Appendix A shows simple tested SVG component code, when loaded into an SVG viewer, it presents a RotateBanner component. The CGM for RotateBanner.java class first prints the "class definition" section of the container component using private function generate_class_def(out, doc_info). The "class definition" section may not be included in the code, if the class definition is already included in the web document by another earlier object instance of this class. The count of the input subcomponents and the list of the CCG objects for the subcomponents are stored in the class variables. Then, the CGM uses the information on the countOK and list of objects to generate for code to instantiate and initialize a JavaScript object for RotateBanner class (Section Three in the SVG document in Appendix A). Then, the CGM generates code to present the component, and each of its subcomponents (Section Four in the SVG document). By running the CGM of each of the input CCGs for the subcomponents, the CCG generates the code for each subcomponent.

The CCG code appends UNQ_ID to all names of global variables and functions to make the names unique and exclusive in the SVG document.

The CCG class supports coupling-methods (1) methods for getting names of service method of the component generated by the CCG object, and (2) methods for setting information about external components (or code) such as callbacks to be invoked by the generated component. This Java class supports coupling-method getBannerUpdateMethodName( ) which returns the name of the service method of the presentation code. Since the names of presentation code's objects and service methods are already defined in the class definition and Java class object instantiation, the CCG only need to append the UNQ_ID to the JavaScript object name and returns the name (e.g., the name with appended UNQ_ID), which is used to generate code for accessing the service of the component. Since all the objects are global in the SVG document, the service method of this JavaScript object can be called from anywhere in the SVG document.

The CCG class supports the coupling-method setServiceMethodReference(pointer_var_name), which saves the variable name passed in the parameter in the class variable "Service_func". This pointer variable for getting a reference to component's service function must be defined in the code for the container component. If the Java string Service_func is not null, the CGM generates additional lines of code in the component's code to store the reference in this variable.

The CCG may use alternative methods to accomplish the same task such as registration of a callback for a component. The code of integration logic in a container CCG may use getCB_AddMethodName( ) of the CCG to get the name of the service method of the subcomponent of the CCG. It then generates application code where the name is used in setting the callback for the subcomponent. For example, 10. String SM=CCG1.getCB_AddMethodName( )
20. Out.println (SM+"(Callback_func);");

Alternatively, the container CCG may use the Java object method setCallBackName(String cb_name) (e.g., CCG1.setCallBackName("Callback_func")), Either of the methods may be used to set a callback for the component of the CCG1. However, the name of the callback must be set to CCG1 before the calling of CCG1.CGM to generate part of the communication code for registering a callback. This allows the CGM of CCG1 to generate subcomponent code to call the callback. On the other hand, the service method of a subcomponent for registering a callback is called only after the calling of the CCG1.CGM, which generates the subcomponent code includes of the service method. Because usually a function can be called only after the function is defined.

Like RotateBanner, the CCG class for the ShowLayer component (Appendix G) also contains class variables and set-methods for initializing the variables. It also implements the CGM. This Java class also supports a coupling-method getShowLayerName( ) which returns the name of the service method of the presentation code of the component. Since the names of the object and service methods are already known, it only need to append the UNQ_ID to the object name and returns the name (e.g., the name together with appended UNQ_ID), which can be used to access the service of the presentation code. It also supports methods getSwitchStateName( ) and getCB_AddMethodName( ) which also return the names of the service methods of the component presentation code.

The CCG may use alternative methods such as registration of a callback for a component to accomplish the same task: (1) The container CCG may use getCB_AddMethodName( ) to get the name of the service method of the component and use this name to generate application code to register a callback. This method must be executed after calling the CGM of the CCG.

Alternatively, (2a) the Java class also supports a method setCallBackName(String cb_name), which, upon being called, can initialize the java variable "callback" with the string value given in "cb_name", or (2b) the container CCG may use Java object method getCallBackName ( ) which picks a unique name for callback, assigns the name to class variable 'callback', and returns the name of the callback function. Both functions save callback function name in java class variable "callback". Both 2a and 2b initialize CCG Object's java variable "callback", where the later method also picks a unique name and returns the name for the container CCG to generate code for the callback function. This second method must be executed before calling CGM of CCG so that the java variable "callback" is initialized. If the java variable is not initialized the CGM do not generate application code to invoke the callback.

A valid value in the 'callback' variable causes the CGM to generate additional JavaScript communication code using the name saved in the variable "callback".

5. Basic Characteristics of Container CCGs

The container CCG may also contain the code of application logic for accessing data sources to get application data and process the application data. The container CCG may use the application data to build the container component or to initialize/configure the CCGs for the subcomponents. A CGI program (e.g., JSP files or Servlets) that generates web page is also a special type of container CCG if the program uses one or more CCG objects to generate their components and integrates the components.

A Container CCG could get the CCGs of the subcomponents in two different ways:

(a) Container CCG Integrating the Subcomponents, the CCG Objects of which are Instantiated Locally In this case, the container CCG uses appropriate CCG class to instantiate each CCG object to build each subcomponent. That is, the CCG object should build right type of subcomponent for the container component in the business point of view. The container CCG obtains necessary application data in the following ways: (i) The class for the container CCG may have methods for inputting necessary application data, and (ii) The container CCG may also contain application logic to access application data from data sources (e.g., database) and to process the data. The container CCG uses the application data to initialize the CCG Object, before calling the CGM of the CCG object to build a subcomponent.

Example 8

Pie Chart

The presentation code of a full pie chart component is shown in the FIG. 3a and some pseudo code will follow.

The presentation code of full pie chart includes the presentation code of the subcomponents such as legend 302, info-table 304, and bare pie chart (that only displays all the pie slices 303). It also contains communication code and other miscellaneous code to define the location of the subcomponents and to display title. When the mouse moves over any of the legend items 302, the presentation code calls the pie chart subcomponent to highlight the slice corresponding to the item. Whenever the subcomponent of pie chart highlights a slice, it calls the service method of info-table 304, and passes relevant information such as percentage in the method's parameters in order to display the information. This interactive functionality, which is a reflection of underlying inter-component communication, is rendered by the communication code. A version of the pseudo code of the container CCG that create the pie chart is as follows:

```
10.   <g transform="translate(X-Loc Y-Loc)">
20.   <script> <![CDATA[
30.     --- JavaScript for the container component can be included here.
40.   ]]> </script>
50.   <g transform='translate(5 35)'>
60.     <% LegendGUI LC = new LegendGUI (aci,legend_array, n);
70.       - - - Include code to initialize & configure Object - LC ...
80.       - -Call CGM to include component: LC.CGM (out);%>
90.   </g>
100.  <g transform='translate(90 30)'>
110.    <% BarePieChart BPC = new BarePieChart (aci,data_array, n);
120.      - - - Include code to initialize & configure BPC-Object ...
130.      - - Call CGM to include component: BPC.CGM ( out); %>
140.  </g>
150.  <g transform='translate(25 320)'>
160.    <% TooltipTable TT = new TooltipTable(aci);
170.      - - - Include code to initialize & configure TT-Object ...
180.      - - Call CGM to include component: TT.CGM (out); %>
190.  </g>
200.  <g transform='translate(5 5)'>
210.    < %
220.      - - - If Title is a String then, do the following:
230.        out.println ("<text style='fill:red;font-size:16pt'>" + Title + </text>");
240.      - - - Else, If a CCG Object then call: Title.CGM(out); %>
250.  </g>
260.  <script> <![CDATA[
270.    - - - Include necessary JavaScript methods here.
280.    <% - - - Write Code for integration logic
290.    - - - Integration Logic calls coupling-methods of
300.    - CCGs LC, BPC and TT to write communication code %>
310.  ]]> </script>
320.  </g>
```

Code between lines 60 and 80 instantiates and initializes a Legend GUI CCG object and calls its CGM to include a legend component. This code is included between statements at lines 50 and 90, which define the encapsulating canvas for the Legend component. The attribute transform='translate(5 35)' defines the location of the Legend component with respect of the container group or canvas that starts at line 10 and ends at line 320. The attribute "transform='translate(X-Loc Y-Loc)" at line 10 determines the location of the container component with in another larger container canvas.

The code between lines 110 and 130 instantiates and initializes a CCG object for a bare pie chart and calls the CCG's CGM to include all the slices of the bare pie chart component. This component is enclosed in a separate canvas by the statements at 100 and 140. Likewise code between lines 150 and 190 assembles a ToolTip component. The code between lines 270 and 300 is code of integration login, which generates necessary inter-component communication code for the components Legend, Tool Tip and Bare Pie Chart. Necessary JavaScript code can be included by enclosing the JavaScript code between statements <script> and </script> as shown at lines 10 and 30.

Each of the subcomponents is defined by tags <g> and </g>, forming a chuck of code (also known as a group for each subcomponent). In the miscellaneous code, the location of each of the subcomponents is defined by the X and Y values in the group's attribute transform="translate(X Y)" with respect to the top left corner of the container component.

The container CCG instantiates and initializes each of the subcomponent CCGs. The container CCG must implement input methods for inputting all the necessary application data that are used to initialize the CCG's for the subcomponents such as Legend and ToolTipTable.

In generating the presentation code of a subcomponent, the container CCG calls the CGM of the subcomponent CCG within the group code as follows (after each CCG for the subcomponent is properly instantiated and initialized):

```
10. out.println("<g transform='translate(X_LOC Y_LOC)'>");
20. Sub_comp.CGM(out, doc_info);
30. out.println("</g>");
```

Those three statements create a group of SVG code within tags <g> and </g> with the presentation code body of the subcomponent being between the two tags. The displaying location on display screen is defined by the X_LOC and Y_LOC with respect to the enclosing component.

Upon a user action on any of the items of the legend 302, the JavaScript mouseover event callback function of the legend 302 calls the service method of the subcomponent of the pie chart to highlight the slice. When mouse is moved over the slice, the slice is highlighted. The pie chart subcomponent contains a method, which is to register a callback function, which is called, when the service method to highlight slice is executed. The container CCG may use this method to register a callback function. Then the container CCG implements and generates this function body that calls the service method of the Info-table 304 to display the information about the pie slice 303.

In the Legend 302 and Info-table 304, the container CCG of chart uses non-selectable subcomponent, since a developer cannot select the subcomponent but can provide data by using the methods provided by the container CCG to customize the Legend 302 and Info-table 304 to effectuate their look and feel.

In using non-selectable CCGs to build subcomponents, the developer of the container CCG knows whether a subcomponent is proper component (as illustrated by the above example for full pie chart, which uses GUI CCGs for ToolTip and Legend).

(d) Container CCG is Integrated with Subcomponents by Importing their CCG Objects from External Sources.

Figure 9A:
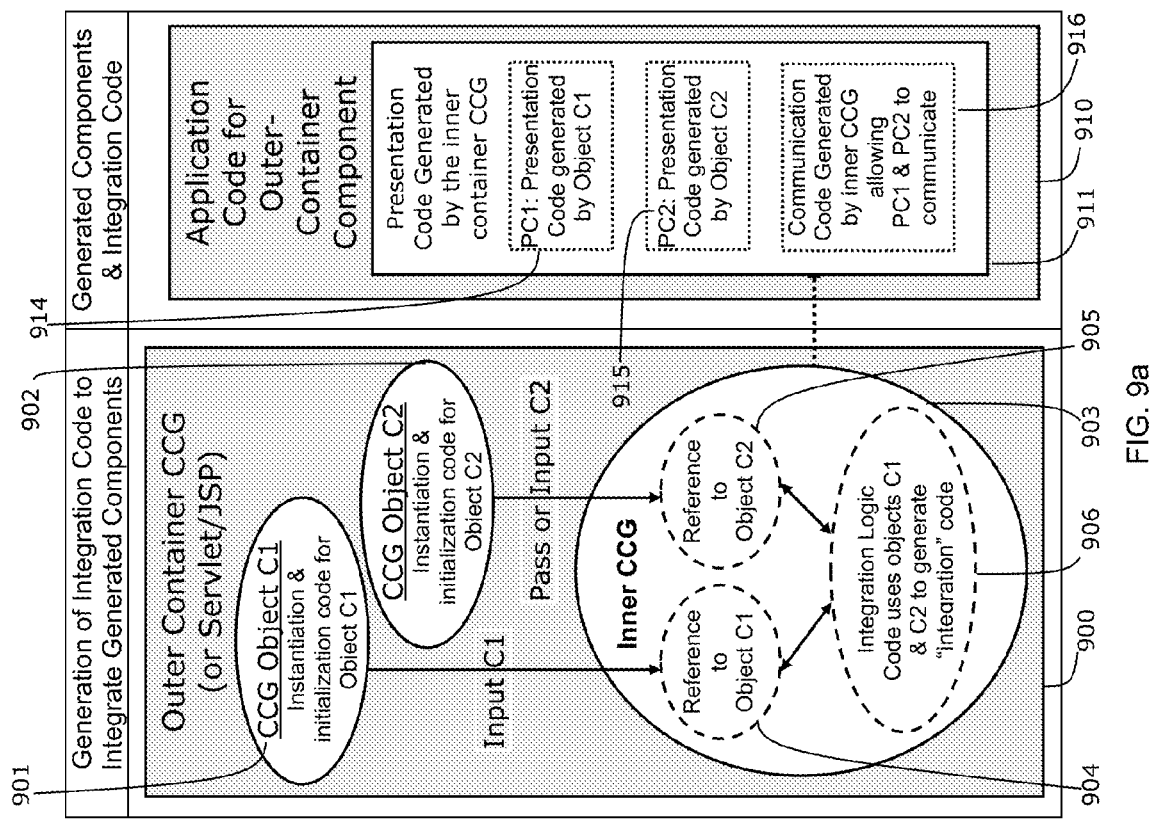
FIG. 9a shows a container CCG with the CCGs of subcomponents being instantiated locally, according to one embodiment.
Figure 9B:
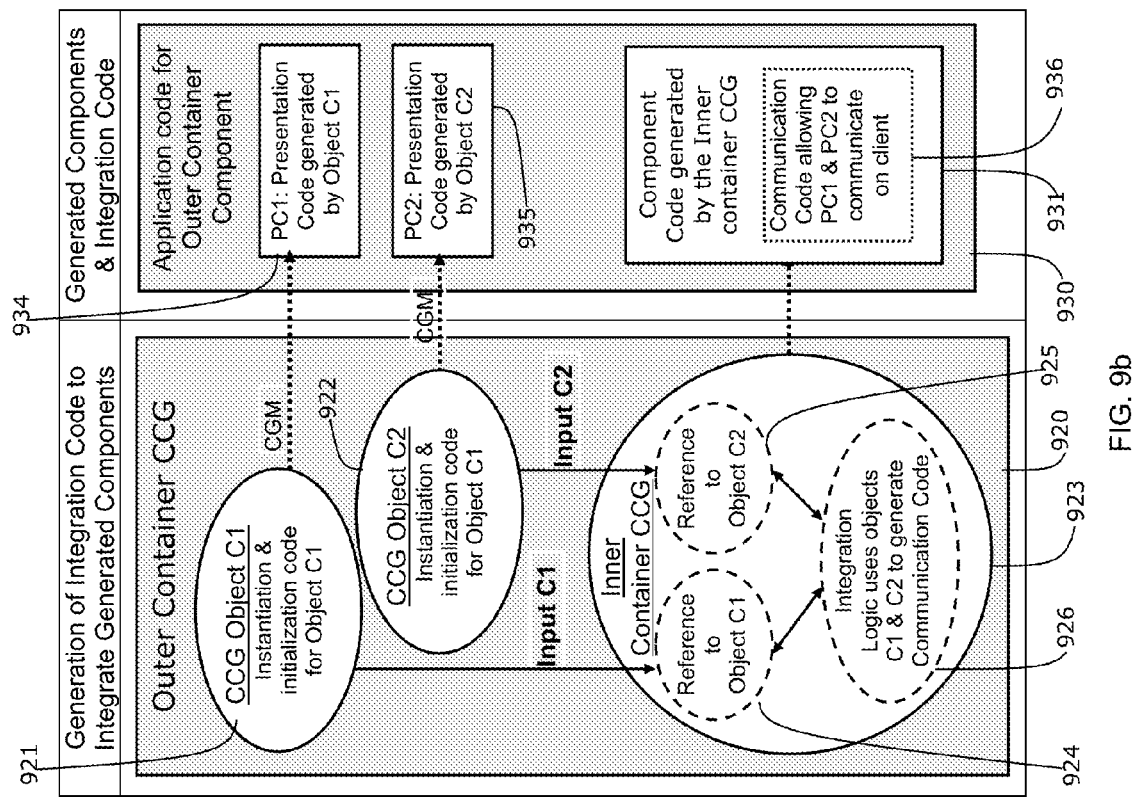
FIG. 9b shows a container CCG including an inner CCG and two CCG objects that are input into the inner CCG, the presentation code of two subcomponents generated outside the inner container CCG, and the inter-component communication code generated inside the inner CCG, according to one embodiment.
Figure 9C:
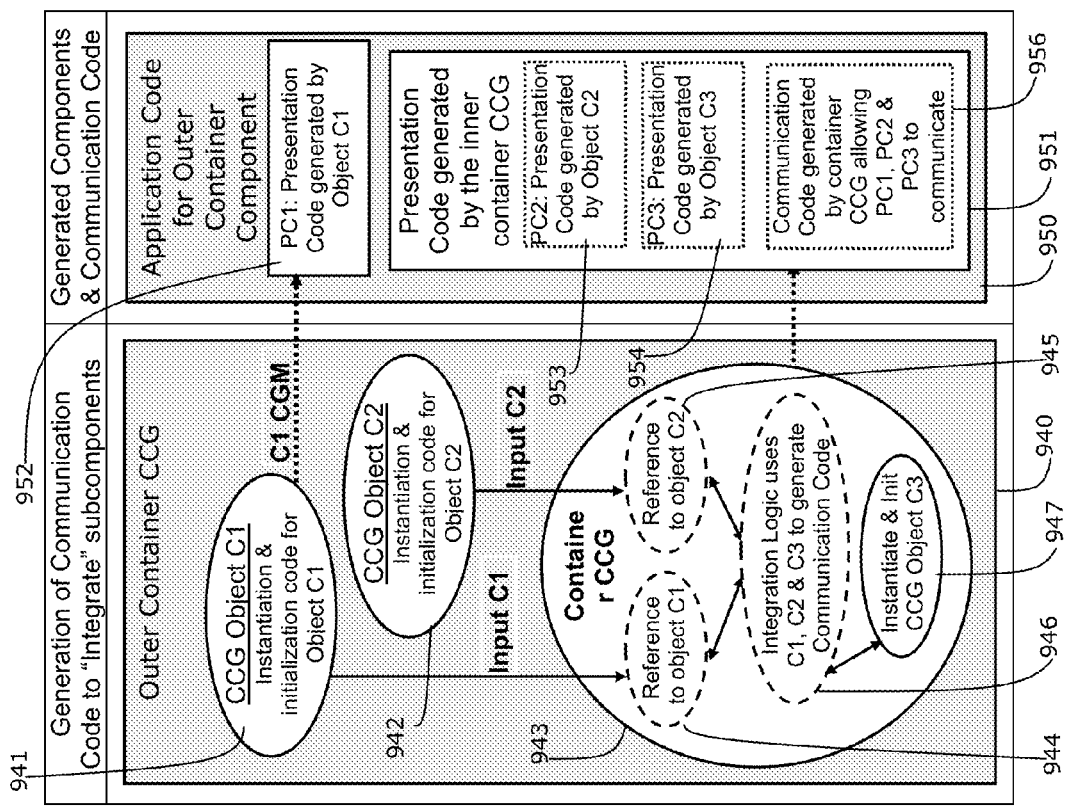
FIG. 9c shows a container CCG including an inner CCG for three subcomponents and two input CCGs, the presentation code of one subcomponent generated outside the inner CCG, and presentation code of two subcomponents and communication code, both of which are generated inside the inner container CCG, according to one embodiment.

This type of container CCG gets the CCG objects of subcomponents by any importing method provided in the programming language that is used to code the container CCG (FIGS. 9b, 9c). If the container CCG is coded in Java, the CCG objects may be input by using set methods. Alternative methods such as using a CCG for fetching code for a subcomponent from a remote computer or from a file and incorporate the code in the container component.

FIG. 9a depicts an outer container CCG 900, which includes an inner container CCG 903 and two CCGs (901 and 902). The outer container CCG 900 generates application code for outer component 910. The server code for the outer CCG 900 includes code for instantiating and initializing the CCGs 901, 902 and 903. The outer container CCG also includes server code for inputting CCGs 901 and 902 using input or set methods of the inner container CCG 903. The inner container CCG 903 saves the references to the CCGs 901 and 902 as the references 904 and 905, respectively. The outer container CCG 900 includes server code for calling the CGM of the inner container CCG 903 to generate the application code of the inner container component 911, which is a subcomponent of the component 910. The CGM of the inner container CCG 903 includes their own server code for calling the CGM of each of the referenced CCGs 901 and 902, respectively, to generate the application code of the subcomponents 914 and 915. The CGM of the inner container CCG 903 also includes integration logic code 906, which interacts with the CCGs 901 and 902 to generate the application code 916, which is necessary for inter-component communication or data exchange between the subcomponents 914, 915 and the container component 911.

FIG. 9b depicts an outer container CCG 920, which includes an inner container CCG 923 and two CCGs (921 and 922). The outer container CCG 920 generates application code for the outer component 930. The server code of the outer CCG 920 includes the code for instantiating and initializing the CCGs 921, 922 and 923. The outer container CCG 920 also includes server code for inputting the CCGs 921 and 922 using input or set methods of the inner container CCG 923, and stores the references to the CCGs 921 and 922 as the references 924 and 925, respectively. The CGM of the outer container CCG 920 includes server code for calling the CGM of each of the CCGs 921 and 922 to generate application code for each of the subcomponents 934 and 935, respectively. The outer container CCG 920 includes server code for calling the CGM of the inner container CCG 923 to generate application code of the inner container component 931. The CGM of the container CCG 923 also includes integration logic code 926, which interacts with the references 924 and 925 to generate communication code 936, which allows for collaboration between the subcomponents 934, 935 and the container component 931.

FIG. 9c depicts an outer container CCG 940, which includes an inner container CCG 943 and two CCGs (941 and 942). The outer container CCG 940 generates application code for the outer container component 950. The server code of the outer container CCG 940 includes code for instantiating and initializing the CCGs 941, 942 and 943. The CCG 940 also includes server code for inputting the CCGs 941 and 942 using input or set methods of the inner container CCG 943 and server code for saving the CCGs 941, 942 as the local references 944 and 945, respectively. The CGM of the outer container CCG 940 also includes server code for calling the CGM of the CCG 941 to generate application code of the subcomponent 952. The CCG 940 also includes server code for calling the CGM of the inner container CCG 943 to generate application code of the inner container component 951. The CCG 943 includes server code for instantiating and initializing the CCG 947 and server code for calling each of the CGMs of the CCG 945 and 947 to generate the application code of the subcomponent 953 and 954 respectively. The CGM of the CCG 943 also includes the integration logic code 946, which interacts with the CCG objects 944, 945 and 947 to generate application code 956, which allows for communication between the subcomponents 952, 953, 954 and the container component 951.

By designing the code of integration logic, the container CCG can generate a variety of communication code to establish any of the basic types of the inter-component communications. In generating communication code, the code of integration logic in the container CCG required to call the coupling-methods of one or more CCG objects of subcomponents (i) to get necessary data for integration such as names of service methods and/or (ii) to input integration data such as names of callback functions. Hence, each input CCG must have certain interfaces and the subcomponent to be imported must have certain properties, in order for the code of integration logic in the container CCG to properly call each CCG's coupling-methods for getting/setting necessary integration data.

In the cases where the CCGs of subcomponents are instantiated within the container CCG, the container CCG class code picks up only the CCG objects for appropriate subcomponents from the business point of view. The container CCG can get the names of service methods and/or to choose the names of the callback functions in generating the communication code.

For example, the developer of the container CCG for component such as full pie chart (e.g., FIG. 3a) chooses proper pre-built GUI CCGs of the subcomponents such as Legend 302 and Info-table 304. Where the developer of full pie chart can refer documentation for the interfaces of the reusable pre-built GUI CCGs to properly initialize the CCGs of the subcomponents and to get/set integration data. The developer must also refer to the interfaces (e.g., parameters and return object) of the service methods and callbacks of the subcomponents of the GUI CCGs for properly generating the inter-component communication code.

A CCG for a component is pre-built and stored in a library to be used for use as a container component of other CCG subcomponents. The container CCG can integrate the subcomponents by importing the CCG objects by using its set method. Naturally, a container CCG can use only certain CCG objects as proper building parts, and therefore it is necessary to restrict the CCG objects to certain classes derived from an abstract class that defines the necessary interface. This assures that each of the CCG objects has a necessary interface for the container CCG and is a right part for the container CCG from the business point of view. A shopping cart can only be integrated with shopping item subcomponents but not with a weather condition subcomponent. For example, shopping cart container CCG's set methods to input the CCGs of shopping items are designed to input only CCG Objects that are subclass of abstract class for shopping items. Other methods for assuring correct matches are as discussed later.

Example 9

DropDownSelectionList and Rotate-Banner

In one embodiment of the present invention, the container CCG (Appendix H and I, FIGS. 14a and 14b) takes a list of strings for a dropdown-list subcomponent and an array of subcomponent CCGs. When this container component is displayed in an SVG viewer, each of the items on the dropdown list 1401 corresponds to a subcomponent, which may be a unique text or image for the item. It shows an image for its default item. When a user clicks on the dropdown list and selects a new item on the dropdown list, the Rotate-banner hides the current subcomponent and displays the newly selected subcomponent 1400. The subcomponent 1400 is a container component, since it includes of subcomponents 1402, 1404 and 1403.

The container CCG class has Title variable to store a string for title of the container component, an array of string names [ ], an integer count for the number of the items in the dropdown list, and an array of AgileTemplate CCG sub_ACCG_list[ ]. It has a constructor, which can take four parameters: title, an array of strings, an integer, and an array of CCG objects. The container CCG class uses GUI CCG for Drop-DownList and GUI CCG for RotateBanner, which are defined as an extended class to the AgileTemplate.

In the container CCG's CGM, a CCG object of a dropdown list DDList and a CCG-object of the RotateBanner RB1 are instantiated. The code of integration logic in the container CCG then gets the service method of the RotateBanner and places the name of the service method in variable rb1_service_name and uses a unique name for the callback of the dropdown list. It then creates the body of the callback, which is part of the communication code in the application code using a series of out.println statements. It also registers this callback in the subcomponent of DDList using its CCG object's coupling-method. The container CGM calls the CGM of the RotateBanner once and the CGM of the Drop-DownList once. The components are presented in the locations of choice.

Appendix J is a JSP file. This container CCG is used to generate stock information. It initializes four variables, which are used as the parameters for the container CCG's constructor. The string variable title is assigned with a title of the component. Five ticker names are placed in a name array. Then, five ACCG objects are instantiated for the five tickers, respectively. An array of the objects of component ACCGs is also instantiated. It finally instantiates the container CCG's constructor with the four parameters and calls the CGM of the container object.

This container CCG is used to display the weather conditions for five zip code areas after corresponding changes are made in title value, the constructor used to instantiate the objects of the subcomponents. In this case, the parameter passed in the constructor of the subcomponents is the ACCG objects of weather, each of which takes a zip code rather than a ticker. Appendix J contains a JSP example.

Example 10

Stock Quote

Figure 14B:
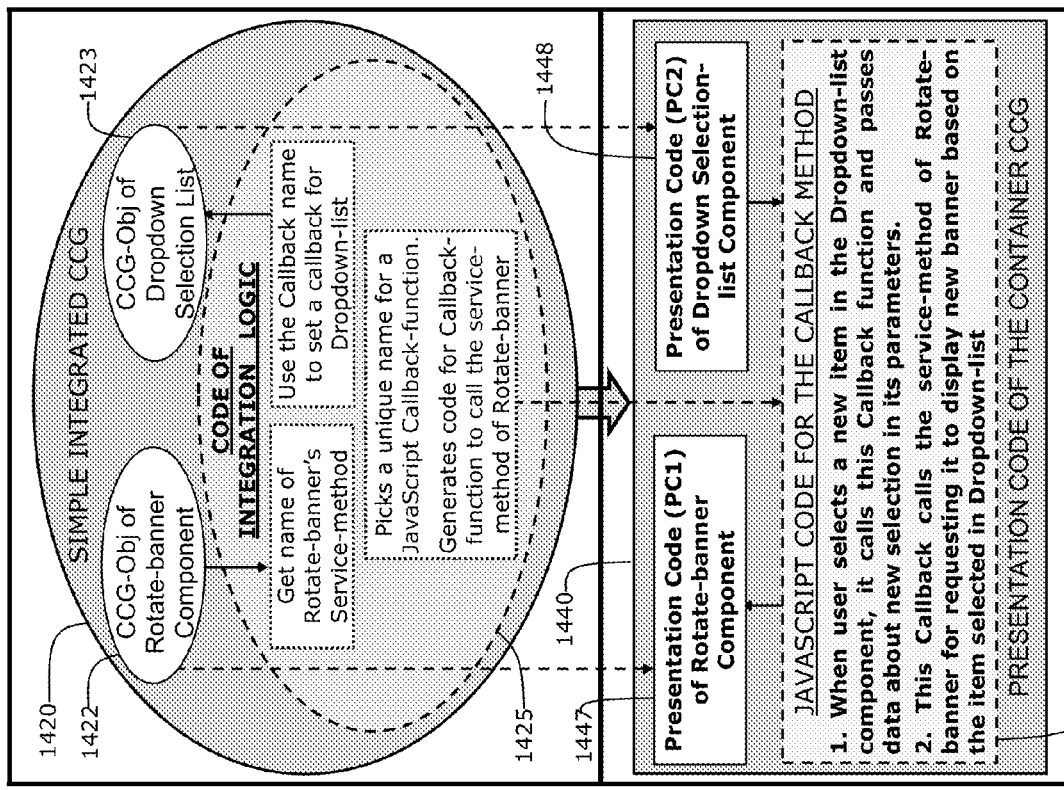
FIG. 14b shows the process steps used by the CGM of a container CCG to generate presentation code together with communication code, according to one embodiment.

One embodiment of the present invention is Stock Quote shown in FIG. 14b. This component displays a drop-down selection menu 1401 and stock quote chart 1400 for a selected item. When the user clicks on a company name on the selection menu 1401, the component displays the stock chart 1400 for the company associated with the selected name.

The application code of this component includes two components: Rotate-banner and dropdown Selection Menu. The presentation code of the Rotate-banner supports a service method, which is called to hide the currently displayed stock chart, and display a new chart when the user clicks another tickle name on the Selection menu. Upon user selection of a new company name, the presentation code of the Selection Menu calls a callback function to notify the Rotate-banner of the new selection, and the Rotate-banner displays the chart corresponding to the newly selected company name.

This CCG is built using two CCGs: Rotate-banner CCG 1422 and Selection Menu CCG 1423. The Rotating-banner CCG 1422 takes a list of subcomponents (e.g., plural stock charts) and generates the presentation code that displays one chart at a time. The Selection Menu CCG 1423, which takes a list of strings, generates presentation code that displays the selection menu.

When the container CCG is run, it uses its coupling-method to get the name of the service method for rotating the stock charts from a Rotate-banner's object, chooses a callback name, and generates the body of the callback function.

The body of the callback function contains a code statement for calling the service method for rotating the stock charts. In addition, the container CCG uses another coupling-method of the Selection Menu object and requests it to register the callback name as a callback function in the presentation code it generates for the selection menu. Thus, when a user selects a new item in the Selection Menu, the presentation code of the Selection Menu 1448 calls the callback function 1449. The callback function is called from anywhere on the web page to access the service of the Rotate-banner component 1447.

The container CCG contains code of application logic, which uses the account number to get a custom list of tickles or companies in the user's portfolio for display. This application logic code allows each of the potential users of web site to view only the stock charts of his or her choosing.

The Appendices N and O provide examples for class implementations of simple container CCGs. The Appendices R and S provide examples for non-class implementations of simple container CCGs.

6. Generating Communication Code Using Integration Data

The developer, who designs a container CCG that uses an imported CCG object as a subcomponent, needs to know whether the subcomponent is a proper building part, coupling-methods of the imported CCG and the data exchange interface the subcomponent uses.

The data exchange interfaces such as parameters to the function and return object of the function of (i) the coupling-methods of CCGs and (ii) the service methods and callbacks of the subcomponents of CCGs is designed and documented in advance. Only things that are not known at the time of development of the container CCG are the exact names of the service methods of the subcomponents of CCGs.

The exact names of the service methods are determined at runtime by each CCG usually by appending a unique string to avoid possible name conflict with other names in the application code. Hence each CCG implements coupling-methods for getting the service methods of the subcomponent and/or for setting callbacks in the subcomponent. In the point of view of the subcomponent, the input callback is a service method implemented outside, for example in the container component or a service method of another subcomponent to provide a service.

The developer, who designs and builds CCGs for container components, uses pre-defined coupling-methods of CCGs for getting/setting the integration data. If the CCGs of subcomponents are created outside and input to the container CCG, it is desirable to restrict the components of CCGs to proper type for the container component from business point of view. Also desirable to assure that the pre-defined coupling-methods that are used by the container CCG are implemented in the input CCGs.

Hence it is desirable to use methods to prevent inputting incompatible CCG or to catch error when an incompatible CCG inputted by mistake. Methods available for determining the component compatibility include (i) implementing an abstract component class that defines particular data exchange interface such as coupling-methods as abstract methods and using the class as a base class for all subcomponent CCGs (ii) placing the component class name and integration data in the presentation code of the subcomponent generated by CCG objects as long as the integration data is accessible by container CCGs.

(a) Use of Abstract Component Class in a Subcomponent

A proper integration requires both a right subcomponent and a compatible data exchange interface between the container CCG and the CCG object of the subcomponent. A data exchange interface is built into an abstract class from which a CCG of the subcomponent is derived.

By way of example, the CCG class of Shopping Items subcomponent is derived from an abstract class ShoppingItemTemplate, where the CCG class supports, for instance, a coupling-method, which is used to set a callback function in the presentation code of the item subcomponent. The code of integration logic in the container CCG uses the abstract classes data exchange interface to call the coupling-methods of the CCG object for setting a callback.

While in this example, the abstract component class uses only one service method for establishing the data exchange interface in the resultant application between two subcomponents, the abstract class may support plural methods and plural data variables, depending upon the nature of the subcomponents and number of services the subcomponent provides/consumes.

By way of example, a vender for reusable ShoppingCart container CCG can also provide abstract class for the CCGs of shopping item subcomponents. Developers of the shopping cart application derive CCGs of the subcomponents from the abstract class. The developer of the CCG object may use any image/component to present the ShoppingItem and include any other information to be filled in the XML string. There is no restriction on the presentation or business logic of the shopping-item as long as the CCG object is of a subclass of ShoppingItem class. The ShoppingItem class ensures that the container CCG can register the callback functions and the subcomponent is integrated properly.

The abstract class in this case is intended only for suitable subcomponents that use the data exchange interface. The name of ShopItemTemplate should not be used by a second abstract class for the subcomponents that use different data interface. Therefore, the container CCG and the subcomponent CCGs of type abstract class are designed for each other. The ShoppingCart container CCG accepts only the objects of subcomponents CCGs that are derived from the same abstract class. Because the data exchange interface is implemented in the abstract class, the CCG class derived from the abstract class supports its data exchange interface.

Abstract class implemented in the CCG objects used by container CCG may be a subclass of the abstract class, AgileTemplate, which defines an abstract method CGM. Therefore, an abstract class may contain both the elements used in the AgileTemplate class and the elements of the abstract component class necessary for the code of integration logic in the container CCG. The combined abstract classes can support both CGM and necessary coupling-methods for the container CCG.

FIG. 15 shows the general steps of CGM of a container CCG when the CGM is called. The process is similar to the one for the black box assembling (FIG. 7) except in two aspects: The CGM gets integration data from the object if the subcomponent belongs to an appropriate component class. If the object is unknown class or a string buffer, the CGM may put the presentation code into a string buffer and read the integration data from the presentation code. The other difference is that it generates communication code at the proper location.

Example 11

Pseudo Code for Abstract Class that Extends AgileTemplate

```
public abstract class ShopItemTemplate extends AgileTemplate {
    public abstract void addCallBackOnSelection (String cb_name);
    public abstract String getCB_AddMethodName( );
}
```

The example shows a method for setting a callback function. The presentation code of the item calls the callback whose name is in the variable "cb_name" upon selection of an item. An alternative method in the third line is used to get service method name of the presentation code and use the name to register a callback for the subcomponents.

Example 12

Shopping Cart

Figure 16:
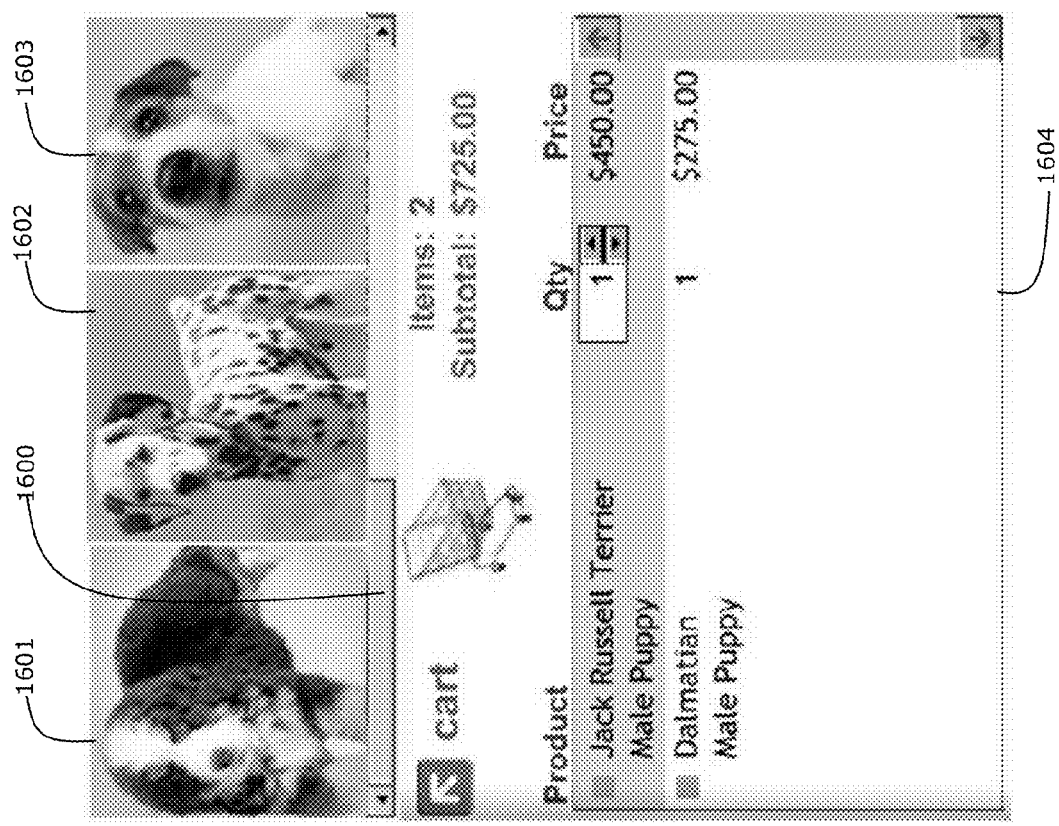
FIG. 16 shows a shopping cart application containing shopping cart's table/invoice and shopping items, according to one embodiment.

The container CCG of ShoppingCart uses a list of the CCG objects of ShoppingItems and a CCG object of Invoice/Table subcomponent and generates the presentation code for displaying the ShoppingCart component (FIG. 16). The container CCG of ShoppingCart contains constructors and methods for inputting an array of CCG objects of the subcomponents and for presenting the shopping items.

The container CCG of ShoppingCart is implemented to accept only the objects of the CCGs derived from given abstract classes. The CCG of ShoppingItem subcomponents and the CCG of Invoice/Table subcomponent need to be integrated. To accomplish this, the container CCG gets and/or sets integration data needed to each CCG for generating necessary communication code for each of the subcomponents. This is accomplished by using two abstract java classes: one abstract CCG class for Invoice/Table that exports a service method to add an item to the list of selected items to purchase; and another abstract CCG class for ShoppingItem that accepts a callback function name, which the subcomponent calls when the ShoppingItem is selected to buy. The user may double click on an item to add it to the ShoppingCart's Invoice.

Abstract class for CCG for Invoice/Table component contains a coupling-method, which is called to return the name of the service method of the subcomponent of the Invoice/Table. The service method of the Invoice/Table is called to add a selected item to the ShoppingCart, and pass the data such as price, quantity and discount about the item in the parameters of the service method. One of the parameters of the service method is a variable that has reference to an XML string, which contains the data. The service method of the CCG object of Invoice/Table component may add the XML string to an array, each of which contains an entry for one of the items that have been added to ShoppingCart, and update the invoice of the Invoice/Tale based on the items in the ShoppingCart. Whenever this service method is called to add a new item, the service method updates the XML string array and Invoice component to reflect the addition so that all items are in the invoice.

The abstract CCG class of the shopping item supports a method to input a name for the callback function for the ShoppingItem component. Optionally, this CCG may further support methods that set data values of the variables for price, options and discounts in creating the XML string array. This XML string is placed in the presentation code of each ShoppingItem. The component of ShoppingItem calls the callback when the shopping item is selected to buy and passes the XML String as a parameter to the callback.

Also, the abstract class may contain a data validation method to ensure the application data supplied by the CCG of a shopping item is correct and complete before the XML string is placed in the item's presentation code. This data validation method uses the pre-defined XML schema to validate the XML string. A data validation method in the abstract class should cause the program of implementing the container CCG to exit or flag errors appropriately when the CCG of shopping items fails to supply all the necessary data to build the XML string.

The two abstract classes, shopping-cart and shopping-items, assure that the container CCG gets all the necessary integration data for use in integration. The container CCG generates the communication code so that all the subcomponents properly can communicate with each other. The component of each shopping-item calls the callback when the item is selected to buy. The container CCG implements the body of the callback, which calls the service method of the Invoice-table to add the item to its list.

Example 13

Code of Integration Logic in Shopping Cart

Pseudo code is used to show integration logic used in the container CCG for the Shopping Cart in the above example. An ACCG for presenting the shopping-items is derived from its abstract class, thereby providing necessary interface for setting a callback. In the resulting application code, the callback is called with a respective XML string as a parameter upon user's selection of an item.

10 String Invoice_SM=InvoiceCCG.getAddShoppingItemMethod( );
20 out.println("function add_item_to_invoice(item_bar_code, xml_data) {");
30 out.println(""+Invoice_SM+" (item_bar_code, xml_data);");
40 out.println("}");

Statement 10 gets the name of the service method of the presentation code of Invoice using the CCG's coupling method InvoiceCCG.getAddShoppingItemMethod( ) Statements from lines 20 to 30 generate the body of the callback function in JavaScript and place the function in presentation code of the container component. Assuming that name of the service method is "AddToInvoice_UNQ_IDX", statement 10 gets the name and stores it in string variable "Invoice_SM". When statement 30 is run, the container CCG prints the value of "Invoice_SM", which is "AddToInvoice_UNQ_IDX". Therefore, the body of the callback function is:

10 function add_item_to_invoice(item_bar_code, xml_data) {
20 AddToInvoice_UNQ_IDX(item_bar_code, xml_data);
30 }

Then, the container CCG registers the callback function in the application code for each of the shopping items by a loop. This function causes the CCG of the item to include necessary communication code in its presentation code to call the callback function upon user selection or action.

for (int I=0; I<count; I++) {
CCG_Items[I].addCallBackOnSelection (
"add_item_to_invoice");
}

The callback function "add_item_to_invoice" registered with each item's subcomponent. Upon user selection, the application code of the shopping item calls "add_item_to_invoice", which calls the service method of the subcomponent Invoice/Table (as shown in line 20). Upon selection, the presentation code of each shopping Item calls the JavaScript callback function 'add_item_to_invoice', which adds the item to the Invoice/Table using the service method (i.e., AddToInvoice_UNQ_IDX) of the Invoice's presentation code.

7. Data Exchange Mechanisms Placed in the Application Code

The integration logic is responsible for generating necessary communication code, which is responsible for the inter-component communication. Therefore, in designing the code of integration logic, it is also necessary to understand the data-exchange mechanisms. When a component calls a service method of other component, data is normally exchanged through the variables in the service method's parameters. Optionally the service method can also return a data objects. The service method must be called by passing right number of parameters/variables and right type of the variables. Data exchange mechanisms include (1) use of XML strings, (2) use of common global variables shared by multiple components, and (3) use of hidden fields in HTML code.

(a). Use of XML Strings

Application developers can define a schema of XML data to be placed in the application code for data exchange between two subcomponents. An XML string is used to store a plurality of data items or pieces of data (along with meta-data), thereby reducing the number of variables/parameters. Appendix C1 has an example that initializes a variable "xml_data_str" with an XML String and passes "xml_data_str" as a parameter to a service method.

Since XML strings are extensible, redesigning communication code may be avoided if more data pieces are added to an XML string or XML schema. However, the subcomponents must be redesigned so that the user of the XML string could use the newly added data pieces.

By way of example, the XML string for the shopping cart and shopping items in the application code contains data of price, discounts and inventory. The designer of the CCG class for invoice usually defines an XML schema for the XML string. The CCG class for the shopping items must be designed so that the XML string conforms to the XML schema. The CCG generates invoice component so that it can access the data pieces from the XML string to add the item to the Invoice/table. The abstract class of the shopping item may support methods that set data values for variables such as price, options and discounts, and the methods are used to create and manipulate the XML string, and place the XML string in the presentation code of the subcomponent.

If a user selects an item to buy in a shopping cart application, the presentation code of the item calls a 'ShoppingCart' service method and send the XML string including pricing, name, and discount to the 'Shopping Cart' using the service method so that the service method can update the invoice.

(b). Use of Common Global Shared Variables for Data Exchange

If the subcomponent A changes the value of a variable X as a result of a user's action and if the variable containing the changed value is used by subcomponent B, data exchange between two subcomponents has occurred. In this case, the name of common variable X should not be changed to be unique because change to the variable name could make the variable inaccessible to other subcomponents. To prevent the name from being changed by attaching a unique index number or string in subcomponents, variable X should take a reserved variable name so that the name is not changed in any of the subcomponents.

(c). Use of Hidden Fields for Exchange Data

If the application code contains HTML code, data are placed as strings as hidden fields. Putting data in the hidden fields does not affect the view of the component and yet, the data can be used by other components.

8. Use of Integration Data in the Presentation Code of Subcomponents

In a case where it is difficult or even impossible for a container CCG to access the CCG objects of subcomponents, alternative methods are used to get the necessary integration data for creating communication code for the subcomponents. By way of example, if the presentation code of a subcomponent has been created and stored in a file, the container CCG cannot access the CCG object of the subcomponent. In this case, the integration data are embedded in the comment lines of the presentation code so that the data is invisible under the viewer but can nevertheless be used by the container CCG.

The developer, who designs the container CCG, can use the embedded integration data in implementing the code of integration logic. In this case, the developer needs to implement code for copying the presentation code from the file to the presentation code of the container component. Also, the container CCG may store the subcomponent's code in a string buffer and scan the code to find the integration data and use the integration data to generate required communication code. Since the integration data is embedded in the presentation code of subcomponent, the container CCG may also include utility methods for extracting the integration data from the presentation code.

By way of example, the integration data of the Show-layer component are in the form of name-value pairs, as follows:
COMPONENT_INTEGRATION_DATA SHOW_LAYER {
UNIQUE_INDEX_NUMBER=IDX_N
OBJECT_INSTENCE_NAME=layer_obj_IDX_N
ADD_SWITCH_CALLBACK=add_callback
SHOW_LAYER_SERVICE=show_layer
SWITCH_STATE_SERVICE=switch_state
}
Where, COMPONENT_INTEGRATION_DATA is a unique reserved name. This data is coded into the CGM of the component CCG so that when CGM of the object is run, it generates the above data in a commented section of the presentation code.

A special utility method is designed and used in the container CCG to search the keyword COMPONENT_INTEGRATION_DATA. This utility method is able to find the tag and read the integration data. During the run time of the container CCG, the code of integration logic calls this utility method to get the integration data for use in generating necessary communication code.

However, the use of the integration data is not limited to the case where presentation code is stored in a file. Integration data are coded into the CGM of the any subcomponent, and the CGM of the subcomponent, upon execution, generates the integration data as comments in the presentation code of the subcomponent (Appendix G has an example). For example, if the component code is fetched from a CCG Portlet running on a remote server, the container CCG can use the embedded integration data in generating communication code for the component.

Apparently, all of the above methods are used individually or in combination whenever possible. When integration of two components is based upon abstract component class, the container CCG may further validate integration data.

Moreover, a container CCG may contain a special method for verifying component class name and integration data. This method should cause the program running the container CCG to take a proper action if something is wrong with the component class and integration data. This verification method helps application developers spot the problems that the container CCG imports a subcomponent belonging to a wrong class or that one subcomponent CCG is of wrong type.

9. Basic Consideration in Designing Container CCGs

In order to use the method of the present invention, it is necessary to consider following issues:

The presentation code to be created by the container CCG should conform to the requirements of at least one of the supported programming languages supported on the platform. Variable declaration, code grouping, calling methods between subcomponents, placement of subcomponent code, and incorporation of files should be proper for the platform.

The objective of designing a reusable container CCG is to build and test the container CCG and the CCGs of imported subcomponents independently and allows the container CCG to take the CCG objects as subcomponents. The CCGs of the subcomponents are derived from an abstract class to ensure that they support necessary component interface (e.g., coupling-methods of CCG) for providing integration data. If a container CCG is designed to use presentation code containing integration data of subcomponents, a data validation method is implemented to verify whether a subcomponent is of a right type. A container CCG that directly copy subcomponent's presentation code should be capable of processing the presentation code of subcomponent, and getting the necessary integration data from the presentation code.

Subcomponents are placed in proper locations according to the guideline for building an ACCG. In coding a container CCG, it is preferable to place the main communication code such as the callback body after the variable and methods are defined in the application code. In the case where part of the communication code is generated by the CCG object of a subcomponent and the communication code of the subcomponent refers to any external function (e.g., invokes callback functions implemented outside), the code for generating the functions should appear before the code for calling the CGM of the subcomponent.

A method of avoiding variable and method name conflicts is necessary for building a container CCG, as in building an ACCG. In some situations, this method is not necessary if the names of the variables and the methods happen to be unique. In practice, it should be used to avoid potential conflicts. One of the preferred implementations is to use a common utility object in the CCG of subcomponents, which can pick up a unique ID and append it to each of the global names in the application code. In the alternative, a global lookup table is used and a name in conflict with any of the names, which have been docketed in the lookup table, is changed to be a unique name. A change is made for all instances of this name.

In building a reusable container CCG, it is necessary to know whether an imported subcomponent is of a proper subcomponent for the container CCG or whether one subcomponent can properly interact with another subcomponent.

One of the implementations is to design the container CCG to accept only CCG objects of the subcomponents that belong to certain abstract classes. All versions of CCGs intended for the container CCG should belong to the abstract classes, and is input to the container CCG using an appropriate input method. The input method should accept only CCG objects that belong to or are derived from the abstract class. In another implementation, each of the CCG objects of subcomponents provides respective integration data necessary for integration. Moreover, it is preferable for the container CCG to check and validate the integration data for component compatibility.

A container CCG should be designed so that it is used as an input CCG to a larger container CCG to build a larger container component. This makes it possible to build component hierarchy conveniently. If the container component needs to be integrated with other components in the larger container component of the larger container CCG, the container CCG should be designed with coupling-methods for returning the necessary integration data.

When a container CCG directly implements application logic or calls an ACCG which has application logic, the container CCG and the included ACCG should be designed so that application data is accessed, processed, and updated before the component is rendered on the platform, thereby making it possible to present real-time data. Alternatively the application code of subcomponent at the time of initialization or during execution on client can request additional data from data servers and use the data to update the subcomponent. This process of updating components while being presented on client is called Ajax.

A data exchange mechanism is provided if the container component and the subcomponents A and B need to exchange data during the execution of the presentation code of the container component. One of the data exchange mechanism is to use the XML string or data-objects, which are passed through the parameters of the service functions or callback functions. Alternatively, component data might be shared by using a common global variable. If presentation code is in HTML/DHTML, data are exchanged by using hidden fields. Finally, a large amount of data are exchanged though a file which is accessed by all sharing components.

Section-J

Creation of Component Hierarchy

Many methods are used to build component hierarchy.

Figure 10D:
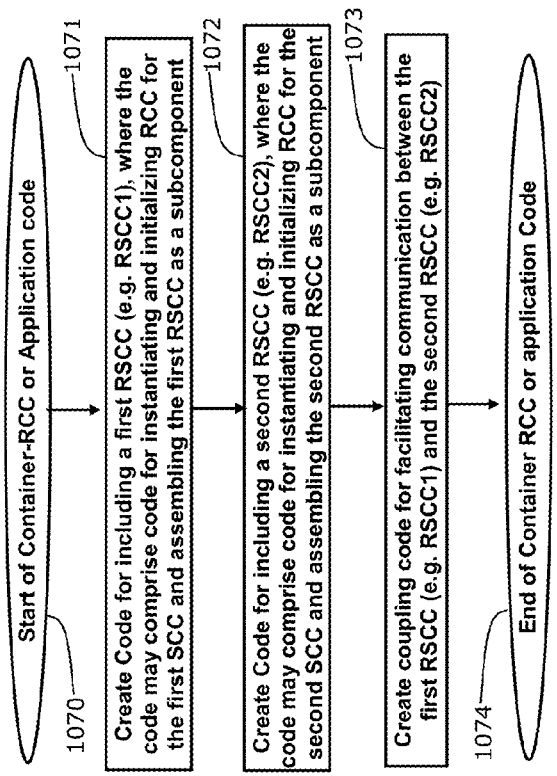
FIG. 10d illustrates an exemplary implementation of an application (or container-RCC of a container RSCC) including two RSCCs and coupling code for facilitating communication between the two RSCCs, according to one embodiment.
Figure 11A:
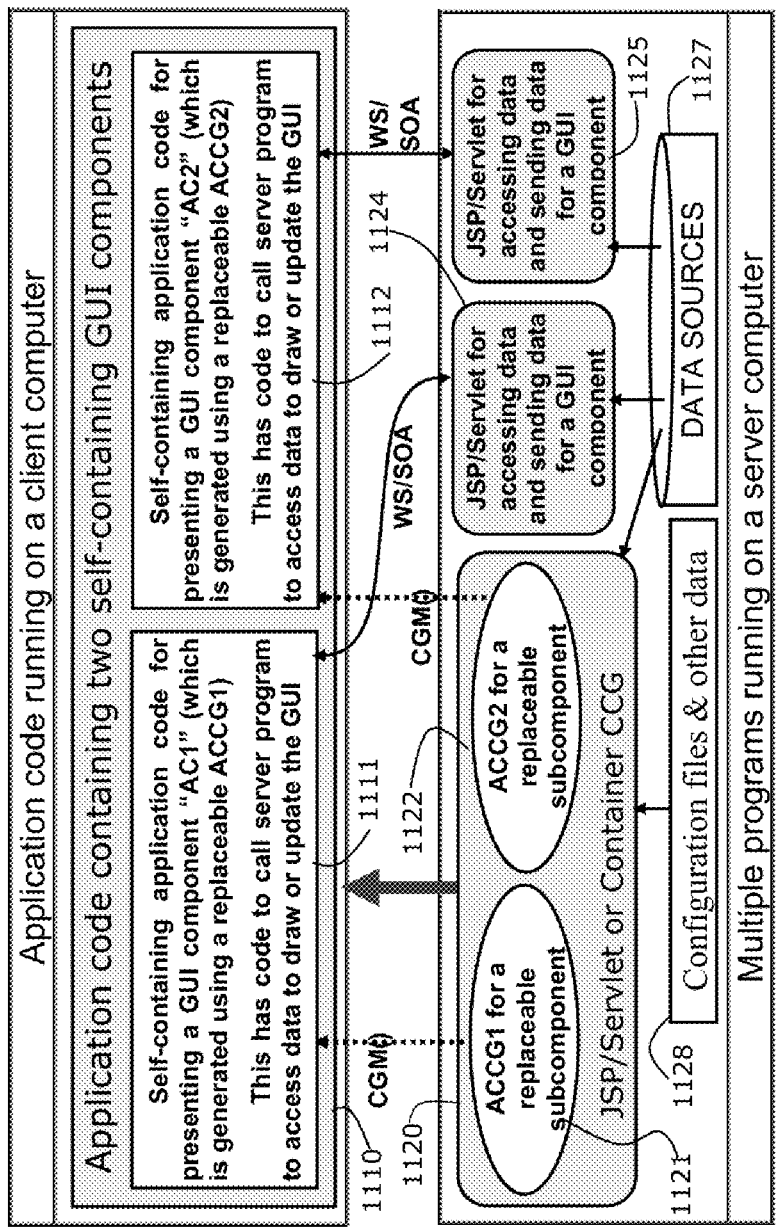
FIGS. 11a and 11b shows self-contained components in application that communicate with server JSP applications for getting data and using the data for updating the self-contained components, according to one embodiment.
Figure 11B:
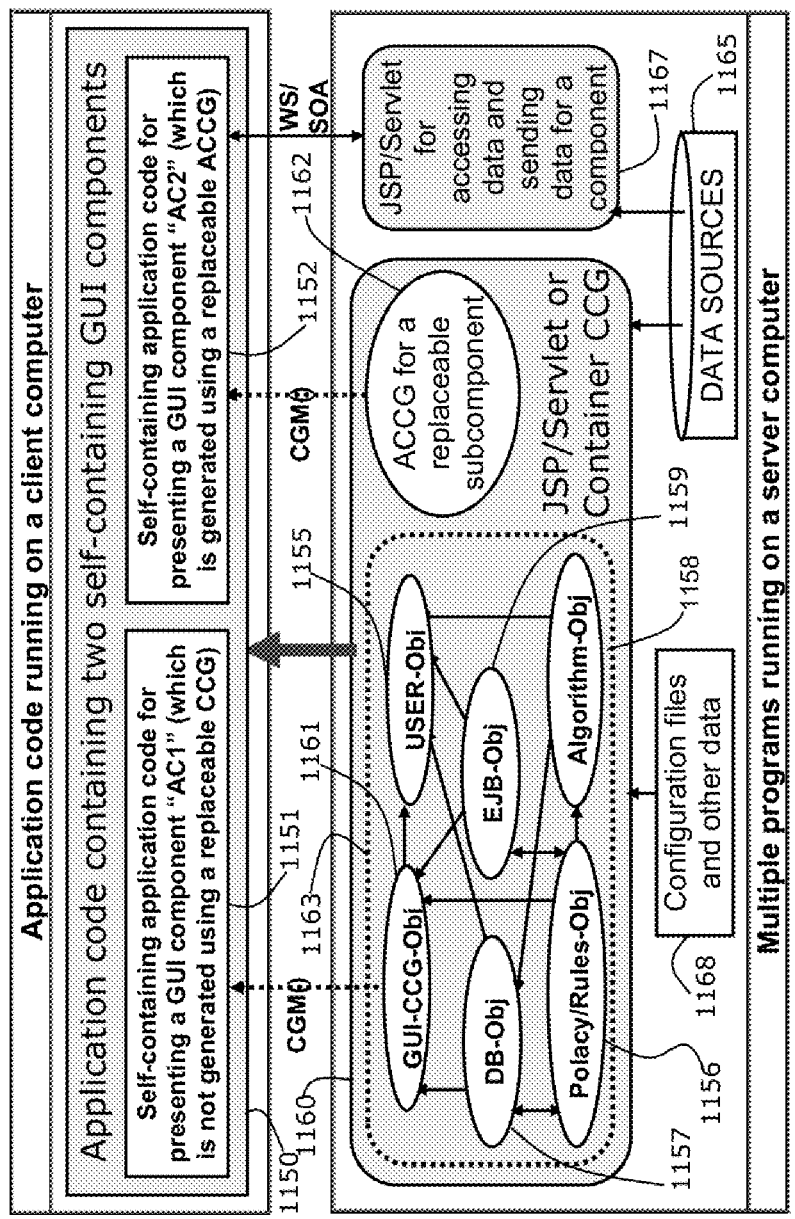
Figure 12:
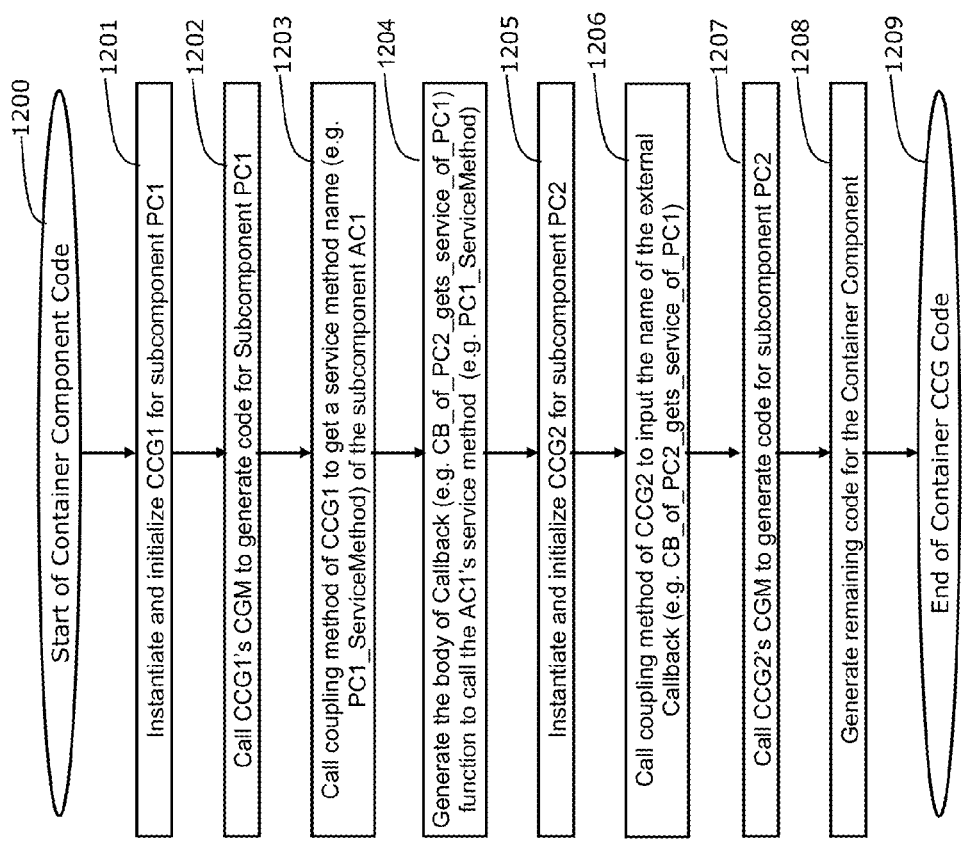
FIG. 12 shows flow chart of a CGM in a container CCG that uses two CCGs to assemble two subcomponents and also creates communication code for the subcomponents, according to one embodiment.

FIG. 12 is a flow chart that shows the steps or equivalent code sections of the CGM of a container CCG 1030 for generating a container component 1034 having two subcomponents 1035 and 1036. Reference should be made to FIGS. 10, 11 for sample pseudo code and the identity of components. The code of the CGM includes the following main code sections or process steps:

1. Step 1200 or code section 1200 is server code for start generating code for the container component 1034.

2. Code section 1201 is server code for instantiating and initializing an object CCG1 1031 for the first subcomponent PC1.

3. Code section 1202 is server code for calling the CGM of the CCG1 to generate and include the code of the PC1 1035 in the code of the container component 1034.

4. Code section 1203 is server code for requesting the CCG1 1031 to get the name of a service method (e.g. PC1_ServiceMethod) of the PC1.

5. Code section 1204 is server code for generating a callback function to call the service method of the PC1 1035. Here selected name of the callback function (e.g. CB_of PC2_gets_service_of PC1) must be unique to avoid variable name collision with other variable names in the container component 1034, and also in an application that contains many other components, if the container component required to be used as a component of the application. The container CCG 1030 can make callback's name unique by affixing a unique id (which is not done in the code section 1052).

6. Code section 1205 is server code for instantiating and initializing an object of the CCG2 1032 for the second subcomponent PC2.

7. Code section 1206 is server code for requesting the CCG2 1206 to register a callback function name CB_of PC2_gets_service_of PC1 as a callback to the PC2.

8. Code section 1207 is server code for calling the CGM of the CCG2 to generate and include the code for the PC2 1036 in the code of the container component 1034.

9. Code section 1208 is code for generating remaining code of the container component 1034.

(a). Building Container Component in Class Implementation

When a container CCG is implemented in class (e.g., instead of as JSP/Servlet), it is used as subcomponent of another container CCG. The container CCG class is used to instantiate and initialize a CCG object. Another container CCG could use the CCG object to build a subcomponent. If the CCG object is instantiated outside the container CCG, the CCG object is imported using set methods of the container CCG.

(b). Using GUI Controls to Build CCGs

GUI environments such as X11/Motif in Linux and Unix Operating Systems or Microsoft Windows API (MSW-API) provide GUI elements such as buttons, lists, check boxes and menus, known as GUI controls. The instantiated objects of the CCGs for creating GUI Controls are used as the building blocks of larger CCGs. The CCG objects generate presentation code, which renders the GUI elements. The presentation code generated by the CCG for GUI component contains service methods and event notification methods.

Like the GUI for the Windows, the presentation code of GUI Controls may have a rich set of class methods and variables to support many functionalities such as (i) handling user events and interactions, (ii) exporting service methods for external objects which use the service methods to get data or set values for variables, and access the services of the object of the control component, and (iii) allowing external objects to set callback functions for receiving notification of events and notifies them using the given callback functions when the events happen. (See Appendix K1 and K2 for radio buttons group)

(c). Building ACCGs for Use in Larger ACCGs as Subcomponents

A large web application or container component includes many components and subcomponents. It is desirable to build ACCGs for many such components and subcomponents. Each ACCG (e.g., FIGS. 4 and 5) class is custom designed for the application where the ACCG custom builds each component based on user preferences. Each ACCG class is built and tested independently. The ACCG encapsulates both business logic and presentation logic. Most of the ACCGs can be refined nearly independently to adapt to evolving business needs.

By way of example, component Hierarchical-menu is used to build component hierarchy. Each cell of the Hierarchical menu is filled by just a string variable or by a CCG object of more complicated component such as a pie chart or table. If an item passed to the Hierarchical-menu is CCG, the Hierarchical-menu class uses the CGM of the item to generate the component code. An instantiated hierarchical-menu object is passed to other large component (such as a cell of table or title of a map) as a subcomponent. This kind of component hierarchy could go on forever.

The Rotate-banner CCG (Appendix E) is a container component, which is used as subcomponent by another container CCG. The RotateBanner takes an array of CCG objects of the subcomponents. Each of the CCGs that are used by Rotate-banner may further use other CCG objects in building their subcomponents.

Theoretically, there is no limit in the size and the complexity of the presentation code of the subcomponent. However, care must be taken for such items as coordinate system and the naming of the variables to avoid collision. In practice, very large and complex presentation code has been placed as the subcomponents. No severe limitations are found for SVG components in Adobe's SVG viewer. Likewise no insurmountable limitations are found for DHTML/JavaScript components in Microsoft-IE5 or IE6.

Section-K

Component Based Software Development

One of the preferred embodiment of component-based programming for building an application using plural components includes following steps: (1) including or incorporating each component into the application, and (2) coupling the service providing component and service consuming component in order to allow the components to communicate or exchange data with each other on the client.

This process of incorporating and coupling each component should also be reversible. The component can be updated, disassembled from the application, or replaced by another component.

One of the preferred methods for accomplishing this is employing a component manager ("CM") for each component. The component manager is used (i) to properly incorporate the component into the application or container component and (ii) to properly couple the component.

In one of the preferred embodiments of the present invention, an ACCG is used as the component manager. The ACCG is a Java class, which is designed to custom build code for an application component. Each ACCG is designed to encapsulate all the necessary construction code such as application logic, presentation logic and business logic as shown in FIG. 5 and generates custom component based on each user's preferences and profiles.

Each ACCG instance is used to include a component in the application code of the container component. The ACCG also include coupling-methods, which are used to create necessary coupling code. The coupling code is necessary for the component if the component needs to collaborate or exchange data with other components in the application.

The following pseudo code shows a simple method for incorporating components into an online GUI application or a web page. If the following three ACCG Java classes are already created: (1) An ACCG StockInfoTable that takes ticker symbol of a company and generates code for stock quote table, (2) An ACCG IntraDayChart to generate code for one day's stock movement chart for given ticker symbol, and (3) An ACCG AnnualChart to generate code for one year's stock movement chart for a given ticker symbol.

The following example code for a CGM of a container component (FullStockQuote in FIG. 6) is incorporating each component as a subcomponent by including two line of code. Since each component is incorporated by including two lines of code in the CGM of the container component, the components can be removed or replaced by changing only two lines of code.

```
10. void CGM(Out){
20. Out.println("<g>");
30. AgileTemplate CF1_Table=new StockInfoTable(aci, Ticker);
40. CF1_Table.CGM(Out, 0, 0, null);
50. AgileTemplate CF2_Chart1=new IntraDayChart(aci, Ticker);
60. CF2_Chart1.CGM(Out, 0, 250, null);
70. AgileTemplate CF3_Chart2=new AnnualChart(aci, Ticker);
80. CF3_Chart2.CGM(Out, 0, 500, null);
90. Out.println("</g>");
100. }
```

The container ACCG starts calling the CGM of the container component in line 10. It first prints a canvas start-tag for the component in line 20. It then instantiates and initializes a CF1_table object in line 30 and calls the CMG of CF1_table in line 40 to generate a stock table (with X=0, Y=0). It then instantiates and initializes a CF2_chart object in line 50 and calls the CGM of CF2_chart object in line 60 to generate a intra-day chart (with X=0, Y=250). Finally, it instantiates and initializes a CF3_chart2 object in line 70 and calls the CGM of the CF3_chart2 object in line 80 to generate an annual chart (with X=0, Y=500). It closes the canvas for the component in line 90. The three images respectively for the table and two charts are placed vertically.

If one of the components needs to collaborate with another component in the application, the ACCG for the component is designed with mechanisms for creating necessary communication code as discussed above.

In a preferred embodiment of the present invention, an ACCG is designed with a minimum amount of coupling code for incorporated components. Each coupling operation used in the integration-logic method usually requires 1 to 5 lines of code. To replace a coupled component, the developer must (1) remove the code for incorporating the component, and (2) modify the code for calling the coupling-methods of the ACCG object.

An ACCG object can function like a component manger, which not only can incorporate a component in an application but also can create necessary communication code for the component in the application. Also, the component generated by the ACCG is replaced by changing the code statement from referring to one ACCG object to referring to a different ACCG object.

It is necessary to use a method to issue components are not mismatched. A typical communication interface between any two components includes a reference to a service function, the number of parameters passed to the function, the data type or format of each of the parameters, and returned data of the function. For example, an interface between Invoice-table and Shopping-items in a shopping-cart application is as follows:

var Status=add_to_shopping_cart (Interface_version, item_xml_data, call_back);

If a need arises that the Invoice-table to show additional pieces of data for each item placed in the shopping cart, but this additional data is not being passed through the parameter 'item_xml_data', then the interface must be redesigned so that the additional data are passed through the interface. The additional data are passed to the shopping_cart component in new parameters to be added to the interface or 'item_xml_data' whose XML-schema has been modified to accommodate the additional data. If the interface is updated, each of the shopping-item components must be redesigned so that they can properly request the service using the updated interface.

Therefore, it is desirable to use a generic tool to automatically detect a broken coupling or mismatched interface between two components.

Section-L

Component Manager as a Replaceable Component

A replaceable ACCG component is a module that is designed with the features that it can be easily assembled into a container component and disassembled or removed from the container component.

The ACCG includes the code of presentation logic and code of application logic. The presentation logic is implemented in reusable GUI classes for GUI components while the code of application logic uses application data to initialize GUI objects for the GUI components. Also, the ACCG includes special methods for creating necessary communication code if the component needs to communicate with any of the other components in the application. The following code illustrates replaceable property of an ACCG, where the component is included by the following lines and removed by removing the lines:

10. ComponentManger CM1=new FullStockQuote ("IBM", parameters1);
20. ParentCanvas.AddChild(CM1, x_location, y_location, parameters2);

Alternatively:

10. ComponentManger CM1=new FullStockQuote ("IBM", parameters1);
20. CM1.CGM (Out, x_location, y_location, parameters2);

If the component needs to communicate with other components in the application, the component manager CM1 is designed to support coupling methods as previously described for coupling the component with other component in the application. Since the code of integration logic calls the coupling methods of component manager CM1 in creating communication code, this component is replaced by properly redesigning the code that refers to the variable of the component manager CM1.

In a preferred embodiment, each of the replaceable components is designed for making it easy for including or removal of an SCC from an application. This is achieved by, for example, by making the communication code of the component simpler or reducing the communication code required for the coupling with each of the other components. A replaceable component instance may be removed so as to (1) assemble a better component during maintenance time or (2) to update and test the component with a higher degree of independency from the application. For example, a subcomponent such as IntraDayChart in FullStockQuote can be refined and tested independently outside of the application that includes one or more subcomponents (See FIG. 5, Section-K and FIG. 6).

One or more replaceable component ACCGs can be assembled to form a container component. The container ACCG is designed to be a replaceable component. This process can be repeated to build larger and larger replaceable components. Appendices T, U contain code, which shows an implementation for building a component hierarchy.

Figure 13A:
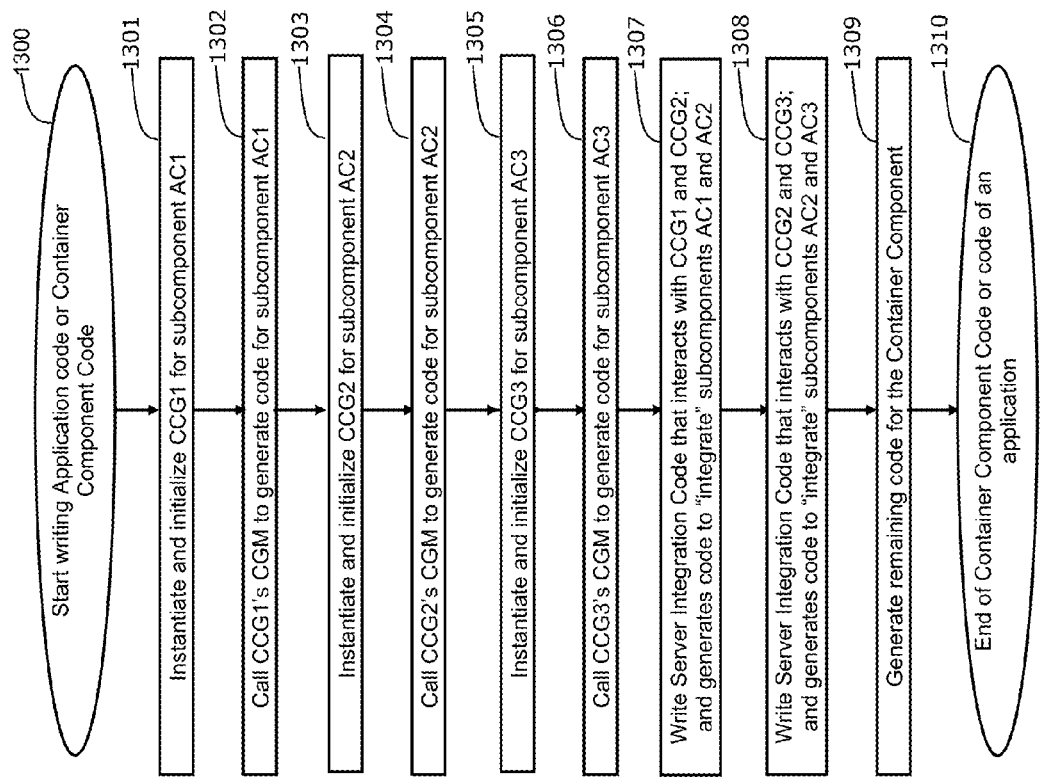
FIG. 13a shows flow chart of a CGM in a container CCG that uses three CCGs to assemble three subcomponents and also creates communication code for the subcomponents, according to one embodiment.

FIG. 13a is a flow chart that shows steps of either the CGM of a replaceable container CCG or a server program (e.g. JSP) for generating the code of a container component or an application having 3 replaceable subcomponents AC1, AC2 and AC3, and for integrating the subcomponents by creating necessary inter-component communication code for the replaceable subcomponents AC1, AC2 and AC3.

In step 1300, the process starts with writing application code or Container Component Code. In step 1301, CCG1 for a subcomponent AC1 is instantiated and initialized. In step 1302, CGM associated with CCG1 is Called to generate code for subcomponent AC1.

In step 1303, CCG2 for a subcomponent AC2 is instantiated and initialized. In step 1304, CGM associated with CCG2 is called to generate code for subcomponent AC2. In step 1305, CCG3 for a subcomponent AC3 is instantiated and initialized. In step 1306, CGM associated with CCG3 is called to generate code for subcomponent AC3.

In step 1307, server integration code (also referred to as 'integration-logic') that interacts with CCG1 and CCG2 is implemented for generating communication code for allowing collaboration or inter-component communication between the subcomponents AC1 and AC2. In step 1308, server integration code that interacts with CCG2 and CCG3 is implemented for generating communication code for allowing collaboration or inter-component communication between the subcomponents AC2 and AC3. In step 1309, remaining code for the container component is generated. In step 1310, the process ends container component code or code of an application.

In yet another embodiment (as illustrated in FIG. 8a and FIG. 13b), a method of executing a software application code including multiple RSCCs on a computing platform, wherein the software application code facilitates communication between the multiple replaceable self-contained components (RSCCs) using a service registration object (SRO), wherein each RSCC is created by instantiating and initializing an object instance of a replaceable component class (RCC) that substantially encapsulates construction code of a self-contained component (SCC) and wherein RSCCs include a first set of RSCCs that provide services and a second set of RSCCs that consumes the services provided by the first set of RCCSs, includes registering each of the services provided by each of the first set of RSCCs with the service registration object by using RSCC registration module residing in each of the first set of RSCCs, and obtaining the service registration object for the services provided by each of the first set of RSCCs by the second set of RSCCs for facilitating communication between the RSCCs in the software application code by RSCC service finding module residing in each of the second set of RSCCs upon an event selected from the group consisting of user event, sensor event, timer event, data/state change event and event/call sent to one of the RSCCs in the software application code from a code section that is external to the one of the RSCCs. The 'construction code' is described in more detail in the sections below.

FIG. 13b illustrates a flowchart for creating a software application code by including multiple RSCCs using appropriate RCCs, and facilitating communication between RSCCs, according to one embodiment. In one example embodiment, one of the multiple RSCCs includes one or more graphical user interface (GUI) subcomponents and the GUI subcomponents are included using reusable GUI classes. In another example embodiment, at least one of the RSCCs includes one or more instances of reusable components, application specific logic and code for accessing data from application specific data sources. In one example embodiment, at least one of the multiple RSCCs includes one or more sub RSCCs as subcomponents.

In step 1341, multiple RSCCs are created using multiple RCCs in an application, where each RSCC is created by instantiating and initializing an object instance of a replaceable component class (RCC) that substantially encapsulates construction code of the RSCC. In one embodiment, RSCCs include a first set of RSCCs (801, 802, and 803 as shown in FIG. 8A and SP 1710 as shown in FIG. 17) that provide services and a second set of RSCCs (805, 806, and 807 as shown in FIG. 8A and SC 1720 as shown in FIG. 17) that consume the services provided by the first set of RCCSs (as illustrated in FIG. 8a and FIG. 17).

Figure 17:
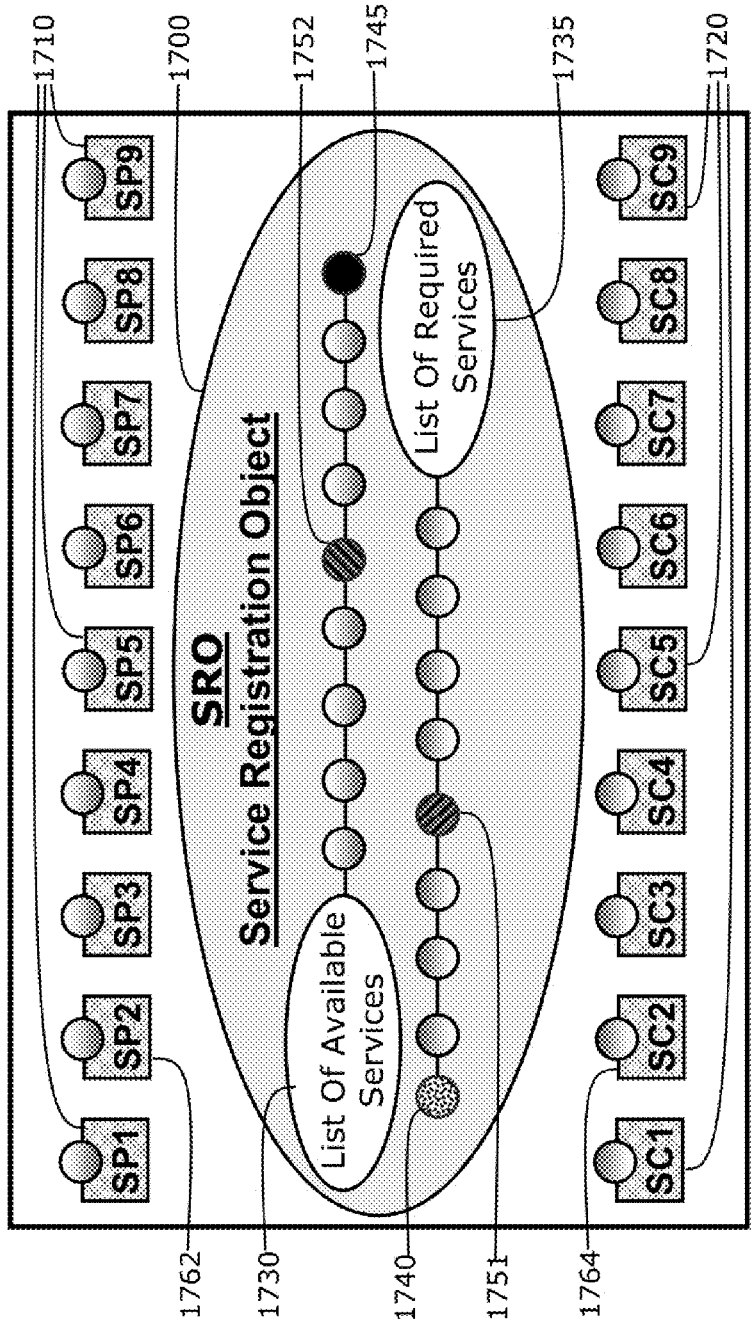
FIG. 17 shows the mechanism for managing dependencies and validating communication interfaces of RSSCs in an application, according to one embodiment.

In step 1342, an RSCC service registration module (e.g., RSCC registration code 812, 813, and 814 of FIG. 8a, where the RSCC registration code in each RSCC includes one or more lines of continuous or discrete/non-continuous code-instructions for registering one or more services provided by the RSCC) which resides in each of the first set of RSCCs is created for registering each of the services provided by each of the first set of RSCCs with a service registration object (e.g., SRO 810 of FIG. 8a and SRO 1700 of FIG. 17). In these embodiments, each of the services is registered by the RSCC registration module using a pre-defined lookup-key of the service function, or service object. Further, the service function or service object is called to obtain the service. The service registration object outputs a list of communication interfaces of an RSCC. For example, the RSCC registration modules in each of the first set of RSCCs include code for registering the services associated with the first set of RSSCs.

In step 1343, an RSCC service finding module (e.g., RSCC service finding code 815, 816, and 817 of FIG. 8*a*, where the RSCC service finding code in each RSCC includes one or more lines of continuous or discrete/non-continuous code-instructions for getting one or more services required by the RSCC) which resides in each of the second set of RSCCs is created for finding each of the required services and consuming each of the services provided by one of the first set of RSCCs for facilitating communication between the RSCCs in the software application code upon a event selected from the group consisting of user event, sensor event, timer event, data/state change event and event/call sent to one of the RSCCs in the software application code from a code section that is external to the one of the RSCCs. In these embodiments, obtaining each of the services is obtained by the RSCC finding module using a pre-defined lookup-key of the service function, or service object and by calling the service function or service object. For example, the RSCC service finding modules include code for getting the services provided by the first set of RSSCs.

Furthermore, unavailability of a service required by one of the second set of RSSCs is detected by the service registration object. Also, unused one or more services registered by the first set of RSSCs is detected by the service registration object. In addition, incompatible communication interfaces between service providing and service consuming RSCCs is also detected. These features are explained in detail with respect to FIG. 17.

FIG. 13*c* illustrates a flowchart for creating a software application code for including multiple large RSCCs, according to one embodiment. In one example embodiment, one of the multiple large RSCCs includes multiple graphical user interface (GUI) subcomponents and the GUI subcomponents are included using reusable GUI classes. For example, one or more multiple large RSCCs include one or more sub RSCCs as subcomponents. In some embodiments, the software application code includes at least 9000 lines of the application specific code, and at least one of at least ten large RSCCs and any combination of at least twenty large and medium size RSCCs, and wherein each large RSCC includes at least two hundred lines of the application specific code and each medium size RSCC includes at least a hundred lines of the application specific code. Further, the one of the multiple large RSCCs includes multiple graphical user interface (GUI) subcomponents and wherein the GUI subcomponents are included using reusable GUI classes.

In step 1351, multiple large RSCCs are created using RCCs in an application, where each large RSCC is created by instantiating and initializing an object instance of a large replaceable component class (RCC) that substantially encapsulates construction code of a self-contained component (SCC). In one embodiment, each large RSCC includes about few hundred lines of application specific code, code for accessing application specific data, or code for processing the application specific data. In another embodiment, the multiple large RSCCs include approximately about 50% of the total application specific code in the software application code. The 'application specific code' is described in more detail below in "Section-U: Application specific code of an application or RSCC". At least some of the multiple large RSCCs provides services, consumes the services or provides and consumes services. In addition, at least one of the large RSCCs includes one or more instances of reusable components, application specific logic and code for accessing data from application specific data sources.

Figure 10E:
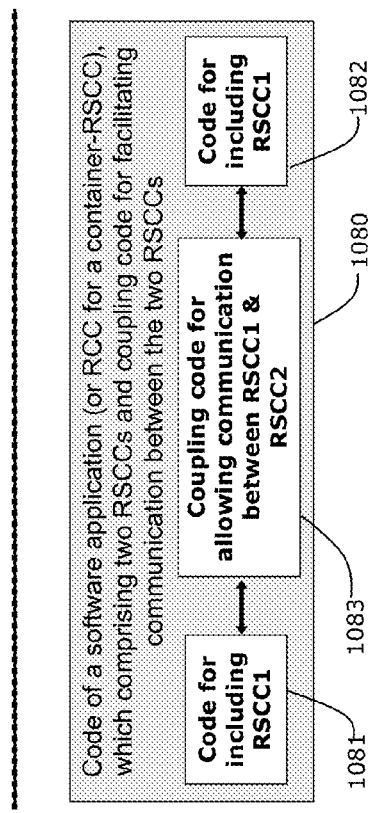
FIG. 10e shows two code-blocks implemented in a container-RSCC (or an application), were each code-block includes a RSCC (i.e. RSCC1 and RSCC2) as subcomponents and a code-block for coupling RSCC1 and RSCC2 to allow collaboration between the two subcomponents, according to one embodiment.

In step 1352, communication code is created to enable inter-component communication or collaboration between large RSCCs to enable providing services and consuming services as illustrated with respect to FIG. 10*e* and FIG. 14*b*. In one embodiment, the coupling code is created to enable communication between the large RSCCs to enable providing services and consume services by creating an RSCC registration module which resides in each large RSCC for registering each of the services provided by each of a first set of large RSCCs with a service registration object, and by creating an RSCC service finding module residing in each of a second set of large RSCCs for obtaining required services provide by one of the first set of large RSCCs for facilitating communication between the large RSCCs in the software application code upon a event selected from the group consisting of user event, sensor event, timer event, data/state change event and event/call sent to one of the RSCCs in the software application code from a code section that is external to the one of the RSCCs.

Figure 15A:
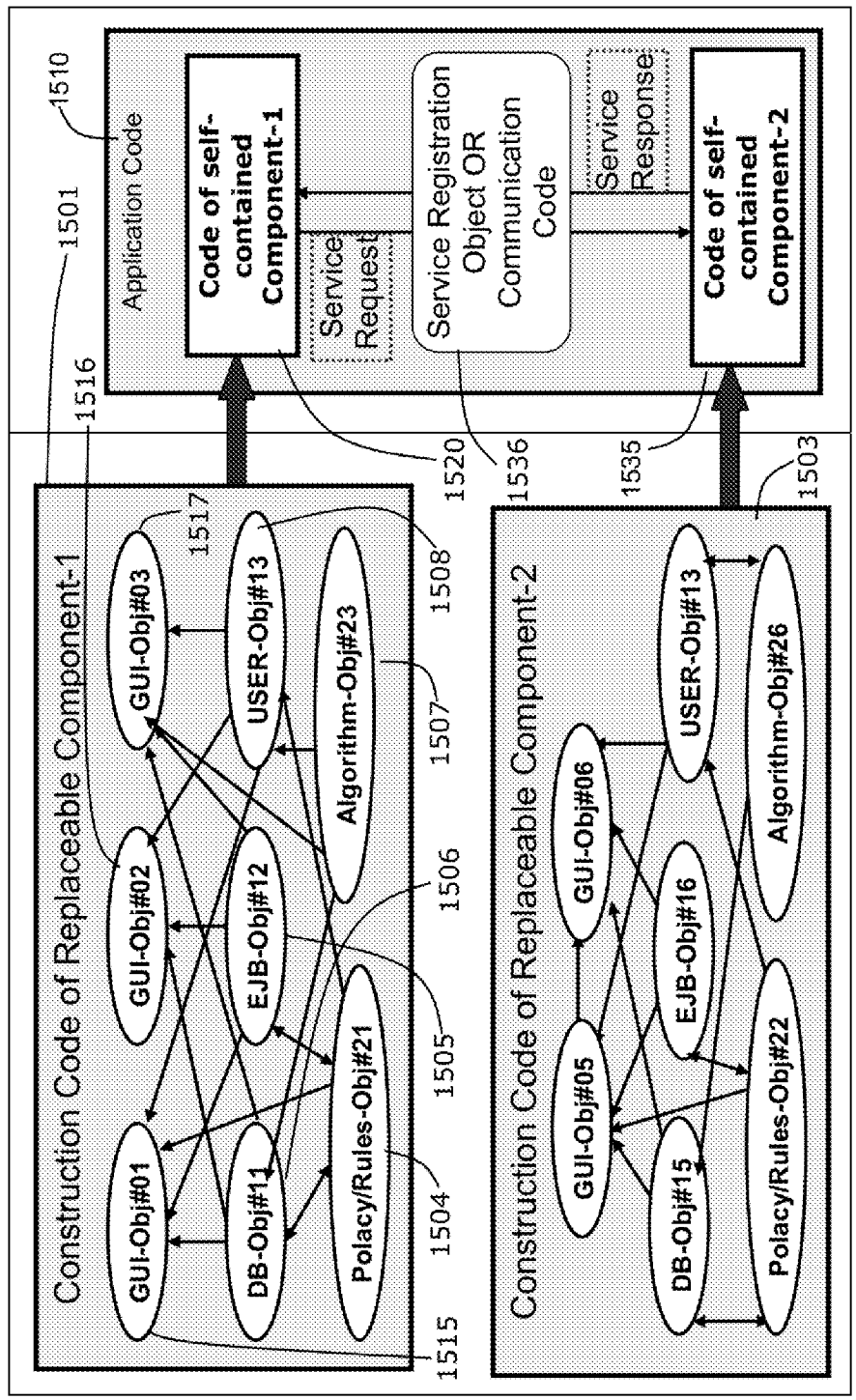
FIG. 15a shows internal construction code of two replaceable components and an application containing two self-contained components created by the replaceable components, according to one embodiment.

In one embodiment, creating the communication code to enable communication between the large RSCCs includes creating a required communication code between a first large RSCC and second large RSCC of the large RSCCs (e.g., as illustrated with respect to FIGS. 10*c* and 15*a*). In one embodiment one or more coupling-methods of RCCs for the RSCCs for creating communication code. In one example embodiment, creating the required communication code between the first large RSCC and second large RSCC includes creating a call back function in the software application code to call service associated with the first large RSCC and registering the call back function with the second large RSCC for requesting the service. In another example embodiment, creating the required communication code between the first large RSCC and second large RSCC includes creating the software application code for getting a service method of the first large RSCC from its RCC instance and inputting the service method into an RCC instance of the second large RSCC (e.g., by using appropriate coupling-methods of the RCC instances). In this case, the second large RSCC access a service associated with the first large RSCC by calling the service method.

In the example embodiment illustrated in FIG. 13*c*, a large non-web application can be created by including multiple RSCCs as subcomponents, where each RSCC is included by using an RCC. The application also creates necessary coupling code between any two RSCCs, if the two RSCCs need to communicate or collaborate with each other. FIG. 10*d* illustrates an exemplary implementation of an application (or container-RCC of a container RSCC) including two RSCCs and coupling code for facilitating communication between the two RSCCs FIG. 10*d* depicts steps for creating the application (i.e., container RCC of a container-RSCC) including just two RSCCs as subcomponents. The step 1070 creates miscellaneous initial code for the container-RCC. The step 1071 instantiates and initializes an RCC object for a first RSCC (e.g. RSCC1 1081 of FIG. 10*e*) and assembles the first RSCC as a subcomponent. The step 1072 instantiates and initializes an RCC object for a second RSCC (e.g. RSCC2 1082 of FIG. 10*e*) and assembles the second RSCC as another subcomponent. The step 1073 creates coupling code (e.g. 1083 of FIG. 10*e*) for facilitating communication between the first RSCC and the second RSCC. FIG. 10*e* depicts logical code structure of 1080 a non-web application (or container RCC of a container-RSCC) including code sections for including two RSCCs (i.e. RSCC1 1081 and RSCC2 1082) and coupling code 1083 for facilitating communication between the two RSCCs.

Example 15

Building Application by Using Replaceable Components

Figure 18A:
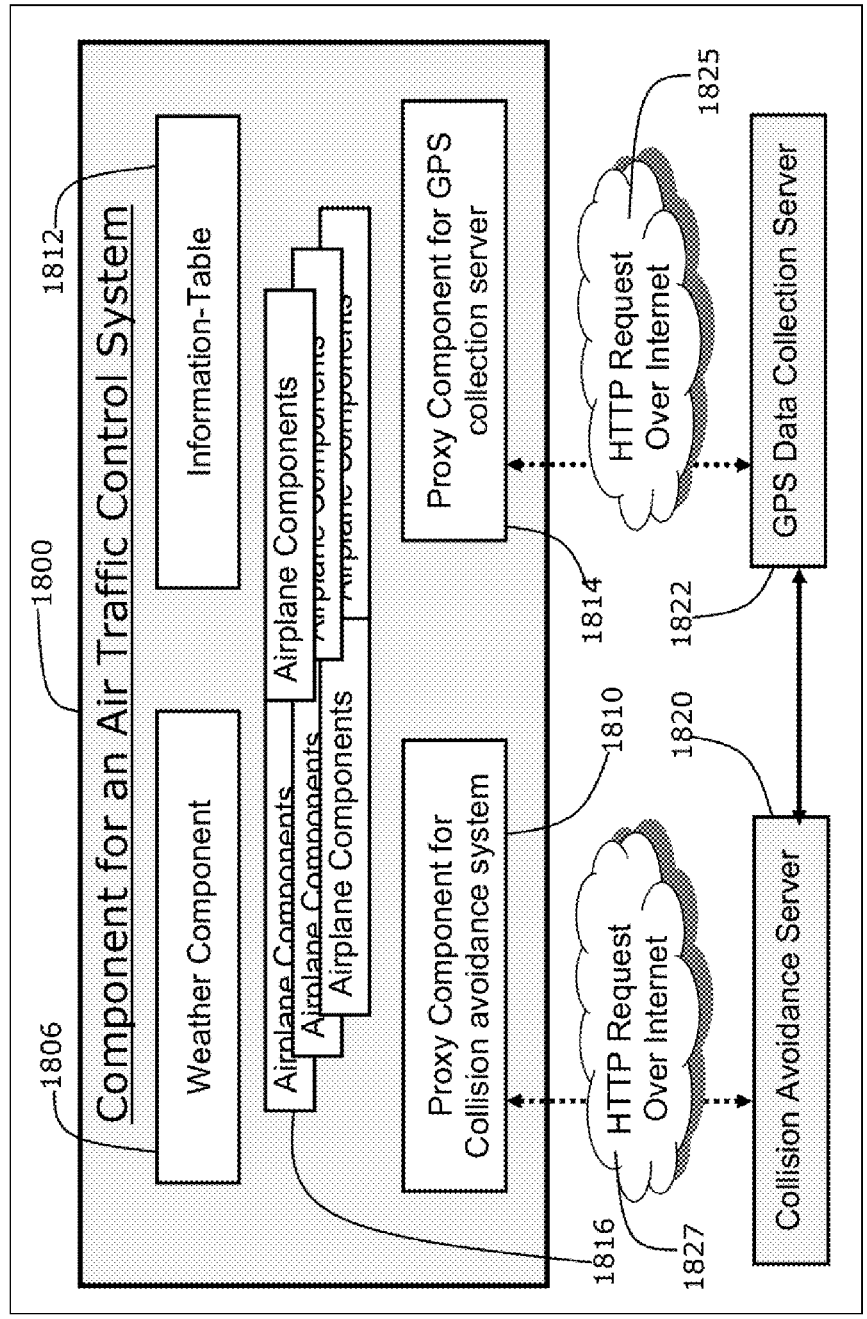
FIG. 18a shows various subcomponents in a simple air traffic control application, according to one embodiment.
Figure 18B:
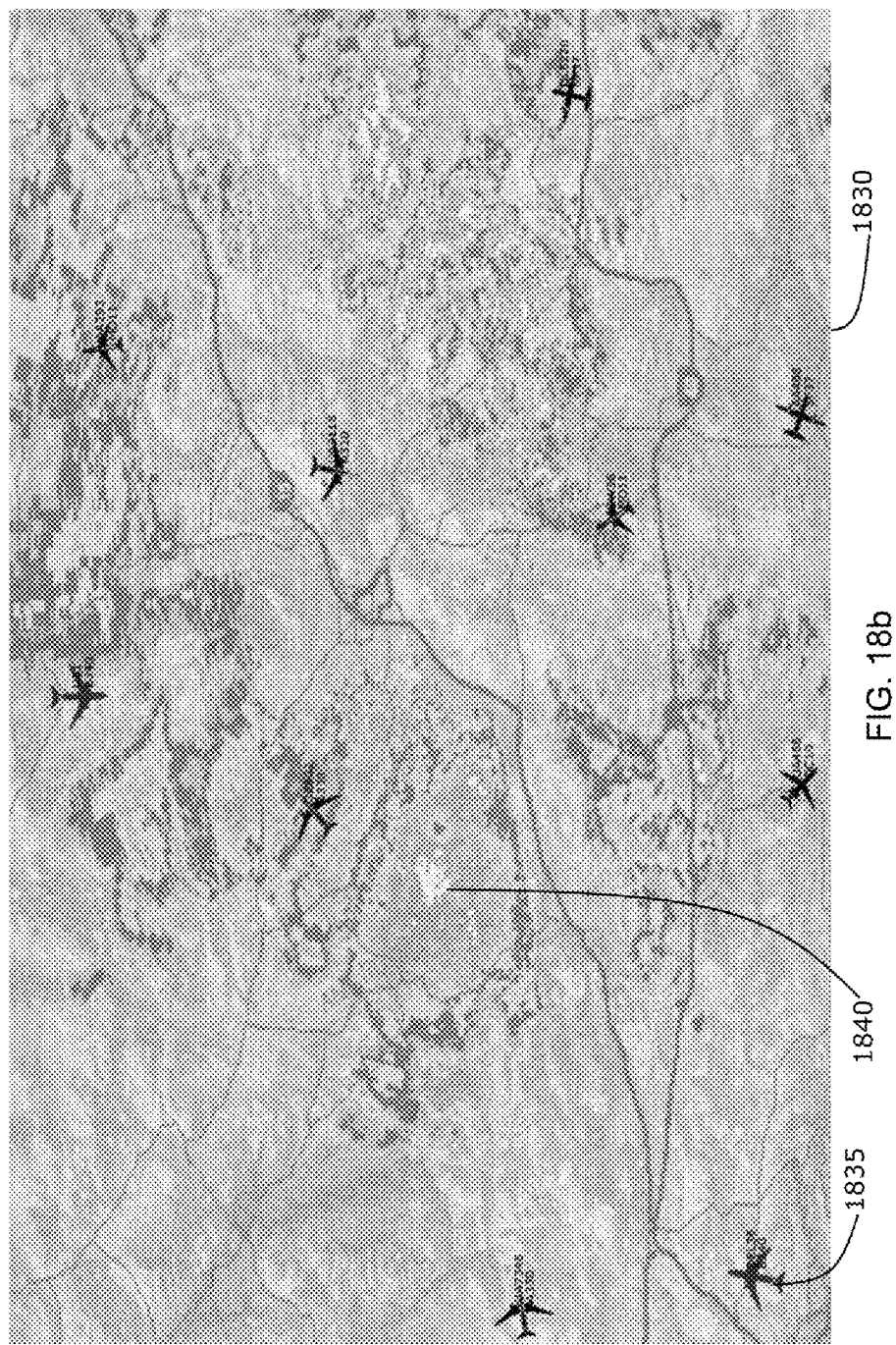
FIG. 18b shows picture of a sample air traffic control application on top of a weather map, according to one embodiment.
Figure 18C:
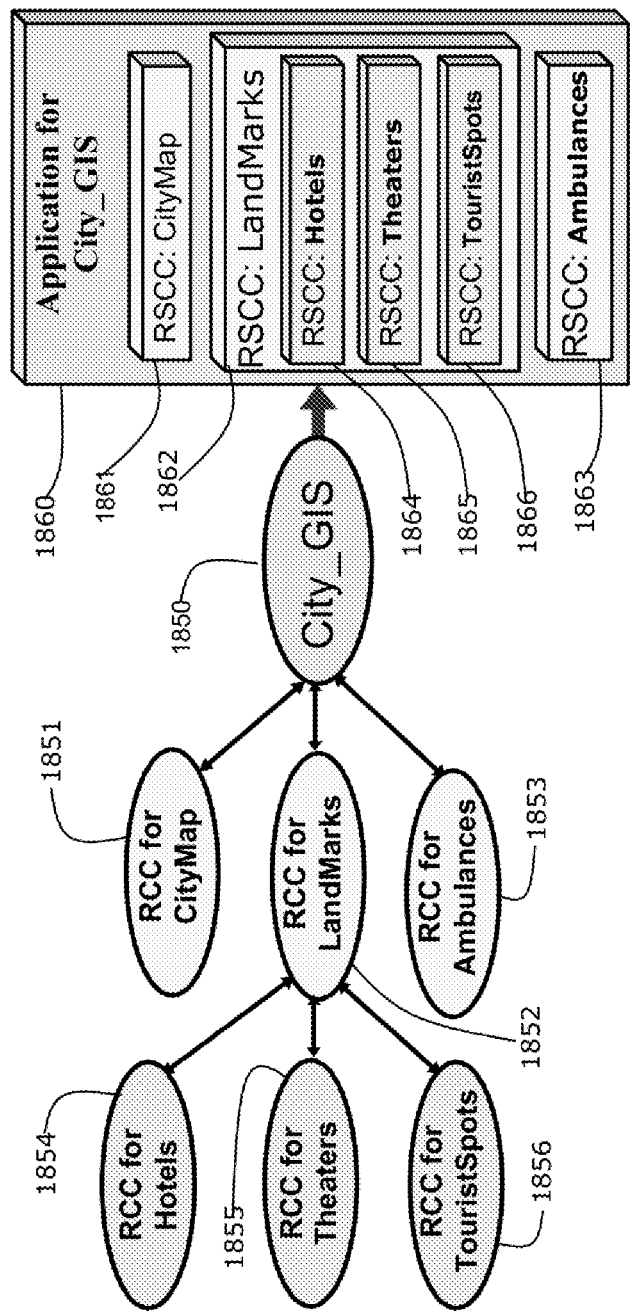
FIG. 18c shows a hierarchy of RSCCs in a sample City GIS application on the right side and on left side shows that the application code of City GIS uses 3 RCCs to assemble 3 RSCCs as components, wherein RCC for LandMarks creates a container-RSCC for LandMarks by using 3 other RCCs to assemble 3 more RSCCs as subcomponents, according to one embodiment.

A Geographical Information System ('GIS') application for a city is built by assembling three replaceable components (as illustrated in FIG. 18C): (i) city map including vector drawings such as streets and canals, (ii) important landmarks of the city, and (iii) emergency services. An ACCG (i.e. RCCs) for each of the three components is designed, developed and tested independently.

Assuming that ACCGs for the city map, city landmarks, and emergency services are respectively known as CityMapCF, CityLandmarksCF, and AmbulancesCF, which display current locations and movements of ambulances on the city map. Then, the CGM of the container ACCG, City_GIS_CF, assembles all three replaceable components as follows:

10. Void CGM(Out) {
20. RepComp CityMap=new CityMapCF (aci,ZipCode);
30. this.canvas.AddChild (CityMap, 0, 0, null);
40. RepComp LandMarks=new CityLandmarksCF(aci, ZipCode);
50. this.canvas.AddChild (LandMarks, 0, 0, null);
60. RepComp Ambulances=new AmbulancesCF(aci,ZipCode);
70. this.canvas.AddChild (Ambulances, 0 0,null);
80. this.canvas.CGM(Out);
90 }

All the above components overlap each other so each component (and its subcomponents, if any) must be drawn on a canvas with a transparent background except the component CityMap. If there is need for adding new overlaying features, additional replaceable components are created and added to the application. Also, such replaceable components can be added by using if-then-else conditional statements, which may be based on user preferences or profiles. For example, following code are added to the code listing between the line numbers 70 and 80.

20. if (User_Preferes_City_Traffic) {
30. RepComp TrafficCongestion=new BadTraffic(ACi,ZipCode);
40. this.canvas.AddChild (TrafficCongestion,0,0,null);
50.} else if (User_prefers_Air_traffic) {
60. RepComp AirTraffic=new CityATC(ACi, AirportCode);
70. this.canvas.AddChild (AirTraffic, 0, 0, null); 80. }

The first condition statement causes the ACCG to add a component for city traffic and the second conditional statement causes the ACCG to add a component for air traffic. If any of the components is too big, it is further subdivided into replaceable subcomponents. For example, the Component Manager ACCG CM for the city landmarks is divided into three replaceable subcomponents, respectively for, (1) hotels and hospitals (2) theaters and auditoriums, and (3) tourist spots. In one exemplary embodiment, assuming ACCG CM for the subcomponents is designed and developed by three different developers nearly autonomously, and is assembled by the CGM of CityLandmarksCF as follows:

10. Void CGM(Out)
20. RepComp Hotels=new CityHotelsCF (aci, ZipCode);
30. this.canvas.AddChild (Hotels, 0, 0, null);
40. RepComp Theatres=new TheatresCF (aci, ZipCode);
50. this.canvas.AddChild (Theatres, 0, 0, null);
60. RepComp TouristSpots=new TouristSpotsCF(aci, ZipCode);
70. this.canvas.AddChild (TouristSpots, 0, 0, null);
80. this.canvas.CGM(Out);
90. }

The code statements instantiate and initialize the component Hotels in lines 20, 30, the component Theatres in lines 40, 50, and the component TouristSpots in lines 60, 70. The code statement then generates the code for displaying city landmarks in line 80.

If an RSCC needs to communicate or exchange data with other components, the RSCC must be coupled. Component coupling methods such as "integration-logic" or "publish and subscribe" are used to implement necessary communication code. The design objective of each of the replaceable components is to satisfy unique needs of a single application. Thus, a replaceable component must be designed such that it's RSCC not only to be self-containing but also to have the minimum number of coupling interfaces in order to minimize the effort required for removing or replacing the component (i.e., RSCC).

The replaceable components Theaters 1855, Hotels 1854 or LandMarks 1852 are easily removed or disassembled from the application. Each replaceable component is disassembled and replaced by a newer or better component. It may also be reassembled after it is redesigned, updated, and tested to satisfy evolving business needs. Each of the replaceable components such as LandMarks 1852 or TouristSpots 1856 is custom designed to satisfy the unique needs of an intended single application. The design objective is to achieve a high degree of autonomy (or modularization) as much as possible in order to minimize the effort required to remove, update, and test the component during future maintenance periods.

The replaceable CM ACCG and their hierarchies are created using other technologies and GUI programming languages such as Adobe's ActionScript/Flex. The component is replaced by functionally equivalent new component manager and by properly redesigning the code lines that refer to old component variable. For example, each of the replaceable components such as Tourist Spots 1856 or it's container component LandMarks 1852 is assembled by using a variable TouristSpots 1856 or LandMarks 1852 respectively. Here each of the variables is an object instance of respective classes TouristSpotsCF and CityLandmarksCF. The land marks component 1862 and its subcomponents can be removed by removing the two lines of the code that refers to the variable LandMarks from the CGM of City_GIS_CF. A subcomponent of land marks component 1862 such as TouristSpots 1866 can be removed by removing two lines of code that refers to variable TouristSpots 1856 from the CGM of CityLandmarksCF.

Example 16

An Air Traffic Control System Example

The air traffic control system (as illustrated in FIG. 18a) may include the following components:

1. An information-table 1812: A static utility component is used to display an information table 1812. It exports a service method (e.g. a JavaScript function), which can be called by passing data in an XML string containing name and value pairs; and the table displays the data in XML String in a table format. The table component registers its service in the service registration object, and any other components 1816 in the application 1800 can use this service for displaying data. An example of component code for a flight Information table is shown in info_table.jsp in Appendix S3 file info_table-jsp.txt 2. Flight components: One or more airplane or flight components 1816 are used to show the Airplanes in the air space. Each component uses an XML string to store the information about the flight. The component also has a method for getting information about the flight and service method for setting/changing the colors, location, size and shape of the image of the flight and indicating the status of the flight (for example, refer to Appendix-P3). The component consists of XML data, SVG code for displaying the image and JavaScript code (e.g. Appendix-P1 and P2). Each flight component 1816 calls the JavaScript function in the information table component 1812 to display information about the flight whenever user clicks mouse on the image of the flight.

3. GPS data-collection server 1822: This component 1822, which is a non-GUI component preferably runs on a remote server, which receives data from Global Positioning Systems ("GPS") installed on each of the flights 1816. This component is implemented to run on a server (out side the code of application 1800), where the server may be located in an air traffic control center. The client computer may be located in any city as long as it can be connected to the server by a network connection. A small JavaScript proxy component 1814 is included in the SVG file, which communicates with the server component 1822 at regular intervals to get latest location information of all the flights. It then calls the component for each flight to inform the location of the flight via the network (i.e., Internet 1825). This component can convert the GPS coordinates of each flight into X, Y and Z distances in kilometer with respect to a reference point on the earth.

4. Collision avoidance system: This system is also run background on a remote server (i.e., collision avoidance server 1820). The algorithms for the collision avoidance system might be complex and speed is critical. So, it is not advisable to implement this as application component in the client application (e.g. in SVG file in JavaScript language). A small proxy component 1810 could be included in the SVG file, which gets the information from the server frequently. For each flight, the server finds the information of all the other flights, which are within a certain distance of, or approaching the flight at a critical speed. If such situation arises, the system sends an alarm to the proxy component 1810, which raises alarm, and sends a message to the components of all of the involved flights 1816, so that the flight components could set colors to indicate the danger. If different air traffic controllers are guiding different flights, this system may provide suggestions to the controllers so that they could guide the involved flights away from the collision courses.

5. A weather component 1806 for displaying weather conditions in the background of the screen: This SVG component fetches the up-to-date weather information from a server using XML data and displays the weather conditions (as illustrated in FIG. 18b) in a background view for various regions of the air-traffic monitoring area. Thus, the map looks like the weather broadcast maps commonly seen on TV. The weather component can update the weather conditions at specified time intervals using the external local source. When a user moves mouse over a flight image, the flight component gets wind speed and visibility information from the weather component and draws a circle around the flight to show the visibility. Additional information such as a numeric value of visibility may be indicated in the vicinity of the flight image. The weather information may, optionally, be stored in the XML data for each flight. In this case, the portion of the data fields can be updated periodically with the current weather information.

The component for each of the flight 1816 may be custom-generated by an object instance of reusable GUI class for flight. This collision avoidance system could be replaced with appropriate business specific systems for other location-based applications. A transportation or shipping company may track its trucks using GPS; and the shipping company may use its business specific system to determine which truck is closest to the location where a customer has a package for delivery; and a taxi company may use its business specific system to identify a nearest taxi cab for a prospective passenger.

The GUI class for Airplane.java can be used for building Air Traffic monitoring applications. An example of Java Server Page (or JSP) program for an Air traffic monitoring system is shown in flight2_example.jsp in Appendix-Q2 file flight2_example.jsp. An example of replaceable component class for limited feature Air traffic monitoring system is shown in ATC_CF.java in Appendix-Q3 file ATC_CF.java. An example of JSP program that uses the replaceable ATC_CF.java class for presenting Air traffic monitoring system for three cities is shown in atc_example.jsp in Appendix-Q4.

Section-M

Summary for Self-Containing Component (SCC) and Replaceable Component Class (or RCC)

Any properly functioning large or small GUI component (e.g. FIG. 4a or 4b) in any application is a self-contained component. Any incompletely implemented component instance cannot function or operate properly in an application. For example, a functioning pie chart 455 in an application cannot function, without properly implementing all the necessary construction code such as code for accessing required data and application logic that uses the data for initializing a GUI object of a reusable GUI class for a pie chart. So reusable GUI class for pie chart is not a self-contained component. Any instance of properly functioning pie chart is a self-contained component and all the construction code implemented for presenting the properly functioning pie chart instance is code of the self-contained component. The code of a self-contained component also include code for proper operation of the components, such as processing events (e.g. mouse clicks), providing services for external parts and accessing services of external parts, for example for fulfilling its operations and proper functioning.

If the whole construction code required for properly presenting a large self-contained component (large SCC) is not encapsulated in a class definition, it is not possible to include the SCC in an application as a unit or replace the SCC as a unit. Construction code of a large SCC is often not encapsulated in a class definition, especially if the construction code uses multiple GUI components and objects (e.g. GUI objects and other objects for building an SCC as shown in FIG. 4c, 5a or 5b). Few examples for large SCCs include AirTrafic control, Landmarks or TouristSpots in the above City-GIS example.

A replaceable component (e.g., 535 of FIG. 5b) is a class or module designed to encapsulate substantial portion of the construction code of an SCC in order to offer a means for directly or indirectly allow both assembling and removing the SCC as a unit. A replaceable component also exposes the services of the SCC through communication interfaces or coupling methods, which are used for creating communication code, where the communication code allow other parts of the application to communicate or collaborate with the SCC instance of the replaceable component.

Code for 'SCC' refers to code sections that include all the construction code for properly implementing a functional component in an application (FIG. 4c or 5a). In other words code for an SCC includes code implemented for providing functionality, features, associated data and code for accessing required data for properly running and operation of a component. Preferred embodiment encapsulates almost all of the code necessary for building an SCC in a class definition called replaceable component (or RCC), so that the SCC can be not only included into an application or web page as a unit but also removed as a unit by using RCC.

In another perspective, any user of an SCC, such as a container CCG or JSP 470 (e.g. FIG. 4d), for using the SCC as a subcomponent need to concerned only about (a) its dependencies on external services for its proper functioning and (b) its communication interfaces for inter-component communications, if its services are required by the container component or another subcomponent. Implementation of a replaceable component encapsulates substantial portion of construction code of its SCC. Hence a user (e.g. 470) of each replaceable component doesn't require understanding implementation details and internal operations.

Section-N

Implementing Replaceable Components for Non-Web Applications

The replaceable components can be implemented for desktop GUI applications. Implementation of each of the replaceable component also encapsulates substantial portion of construction code and code for data (i.e. including code for accessing data from data sources such as RDBMS). Hence an object instance of replaceable component class requires just few lines of construction code for example to input few pieces of data for including a self-contained component in an application and the self-contained component can be removed as a unit by removing or updating the few lines of code.

In case of web or online applications, server code (e.g. CGI or JSP) designed and implemented for generating application code, where the application code is sent to a client for executing on the client. But in case of desktop applications, the application code is directly implemented for executing on a desktop computer. The application code is either compiled for creating executable or interpreted for executing the application. For example, in case of web applications, the GUI CCG objects (e.g. 1031 and 1032) of CCG classes are used to generate component code (e.g. 1035 and 1036) for respective GUI components; while in case of desktop applications, GUI objects of GUI classes are called for presenting respective GUI components. Likewise, in case of web application, integration logic is implemented in server code (e.g. 1033) for creating communication code (e.g. 1037) between the GUI components. But in case of desktop applications, communication code is directly implemented in the code of application for allowing communication or collaboration between the GUI components and other objects.

For example, line charts for stock quotes can be implemented as replaceable components.

10. ComponentManger RC1=new FullStockQuote (ACi, "IBM", parameters1);

20. ParentCanvas.AddChild (RC1, x_location, y_location, parameters2);

Where line 10 instantiates and initialize an object instance RC1 of replaceable component class. Each of the replaceable components (e.g. RC1) would become self-contained component once it is instantiated and properly initialized. Some replaceable components may require more than one line of construction code for initializing. Line 20 adds the self-contained component to container component ParentCanvas at a location given by x_location and y_location. So in case of desktop GUI applications, the class definition for a self-contained component is replaceable component and a properly initialized object instance of the class is self-contained component. Each of the replaceable components substantially encapsulates construction code and/or data required for creating a self-contained component, while leaving a small portion of construction code for inputting data by container component for fine-tuning a self-contained component instance for its specific needs. In other words container component implements remaining few lines of construction code for turning the object instance of a replaceable component into self-contained component.

The reusable container GUI components such as Rotate-Banner can be designed to accept objects of replaceable GUI components as subcomponents. The reusable GUI classes for the container GUI components can be implemented so that they include of set-methods for inputting properly initialized objects of replaceable GUI components as subcomponent.

In case of web applications, the object instance of a replaceable GUI component generates code for presenting self-contained component. But in case of desktop GUI applications, the object instance of replaceable GUI component is called to draw and present its GUI component.

10. ReplicableComp AC1=new AppComp1 (ACi,app_data1,config_data1);

20. ReplicableComp AC2=new AppComp2 (ACi,app_data1,config_data1);

30. ContainerCanvas.AddChild (AC1, x_loc1, y_loc1, param1);

40. AC2.DisplayComp (ContainerCanvas, x_loc2, y_loc2, param2);

Two replaceable component instances AC1 and AC2 are instantiated and initialized at line number 10 and 20 respectively. At line 30 AC1 is passed as a subcomponent for a container component. At line 40 drawing method of AC2 is called to display its component.

In case of web applications, the container CCG implements integration logic for generating communication code for each of the subcomponents or allowing collaboration between the subcomponents (see FIG. 10b). But in case of desktop GUI application, container component implements communication code for each of the subcomponents or allow collaboration between the subcomponents.

For example communication between any two components can be accomplished by implementing a call-back method, so that, the call-back method calls service method of first component and the call-back method is registered with second component, so that, the call-back method is invoked upon a given event such as mouse click or data input. For example, below shows a sample call-back function.

10. void App_CallBack1 (comp_id1, event, data, version) {

20. AC1.serviceMethod1 (event, data, version);

30. }

The above call-back function calls service method of first component at line 20. To allow communication properly, call-back function must be registered with second component, so that, the second component calls the call-back function upon given event by passing proper data through its parameters.

10. AC2.setCallback2 (event, App_CallBack1);

So whenever a given event occurs, the second component calls service method of first component and passes data through call-back function. Hence implementing communication code between any two self-contained components of two replaceable component instances is no different than creating communication code between any two reusable GUI component instances in an application.

The container GUI components in GUI API in prior-art such as Windows/VB are not designed for inputting larger replaceable GUI components. It is often not possible for inputting large replaceable GUI components, such as ATC_CF or LandMarks, especially if the replaceable GUI components are again a container component. Furthermore it is often not possible to encapsulate construction code of a large self-contained component such as ATC_CF or LandMarks in a class-implementation, where the class-implementation is an RCC, where the class encapsulates substantial portion of construction code of a self-contained component. Although there is no limitation in newer underlying platforms and nearly same for both desktop and web-viewer/browser, the higher-level abstractions such as GUI API or reusable GUI classes in the prior art are not designed to allow encapsulation of such larger container components in replaceable component class. This invention disclosed methods for building both (i) reusable GUI classes for container-GUI components that can accept large replaceable components as subcomponents and (ii) reusable GUI classes for GUI components such as charts, dials and maps, which can be assembled as subcomponents for building larger and larger replaceable components.

A component can still be self-contained component, even if it depends on external services. To be self-contained it must encapsulate its internal construction, its operations, its subcomponents and provides communication interfaces for accessing and/or for providing services of external parts. This may be illustrated by giving an example of physical replaceable component: A FM-radio/CD-player in a car is a good example for a replaceable component of a physical product. It encapsulates all its construction and subcomponents. It can be easily plugged in and can be plugged out as a unit, for example, to be replaced by a better entertainment system. FM-radio/CD-player is self-contained (e.g., all its construction, subcomponents and internal operations or functioning are encapsulated in a container package), but dependents on car battery for 12VDC power, depend on external speakers to play music and also depends either on a CD of FM signal for getting music. Although FM-radio/CD-player contains many subcomponents, it can be easily removed from the car as a unit, if it is broken. It can be repaired independently outside of the car and tested outside by connecting to 12VDC power supply and speakers.

In prior-art most large components such as ATC_CF or Land Marks are not encapsulated or often cannot be encapsulated in a replaceable container such as class-definitions. It is desirable to build GUI API and tools for allowing encapsulation of each of the self-contained components in a replaceable container for disassembling and reassembling a self-contained component as a unit. If self-contained components are not encapsulated in replaceable-container, the code of even a small application having just two large self-contained components end up unstructured (e.g. see FIGS. 15a and 15c) making it hard to maintain each of the two components.

Figure 15B:
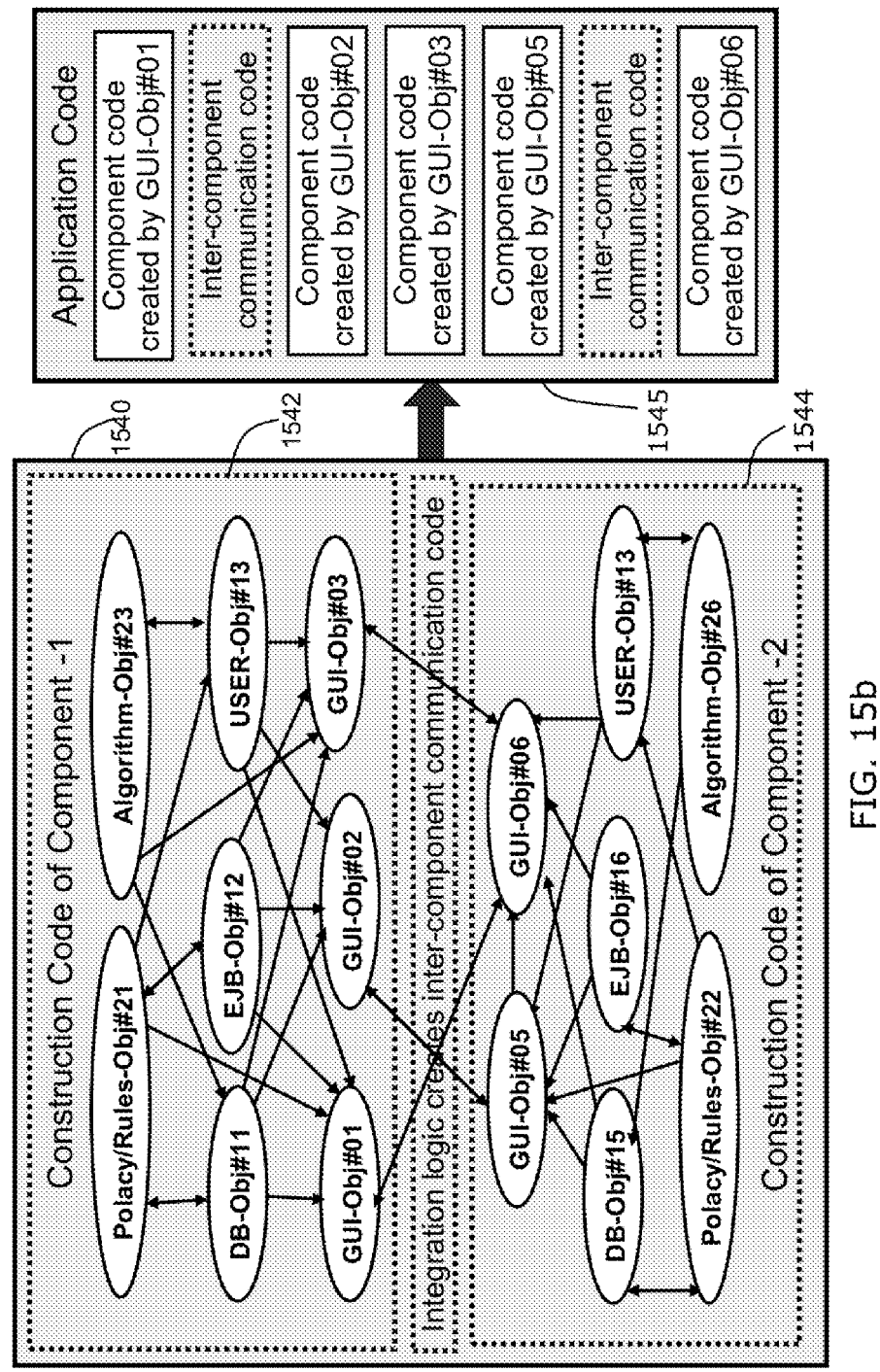
FIGS. 15b and 15c shows construction code for generating code for an application containing two self-contained components, where the application is generated without using replaceable components, according to one embodiment.
Figure 15C:
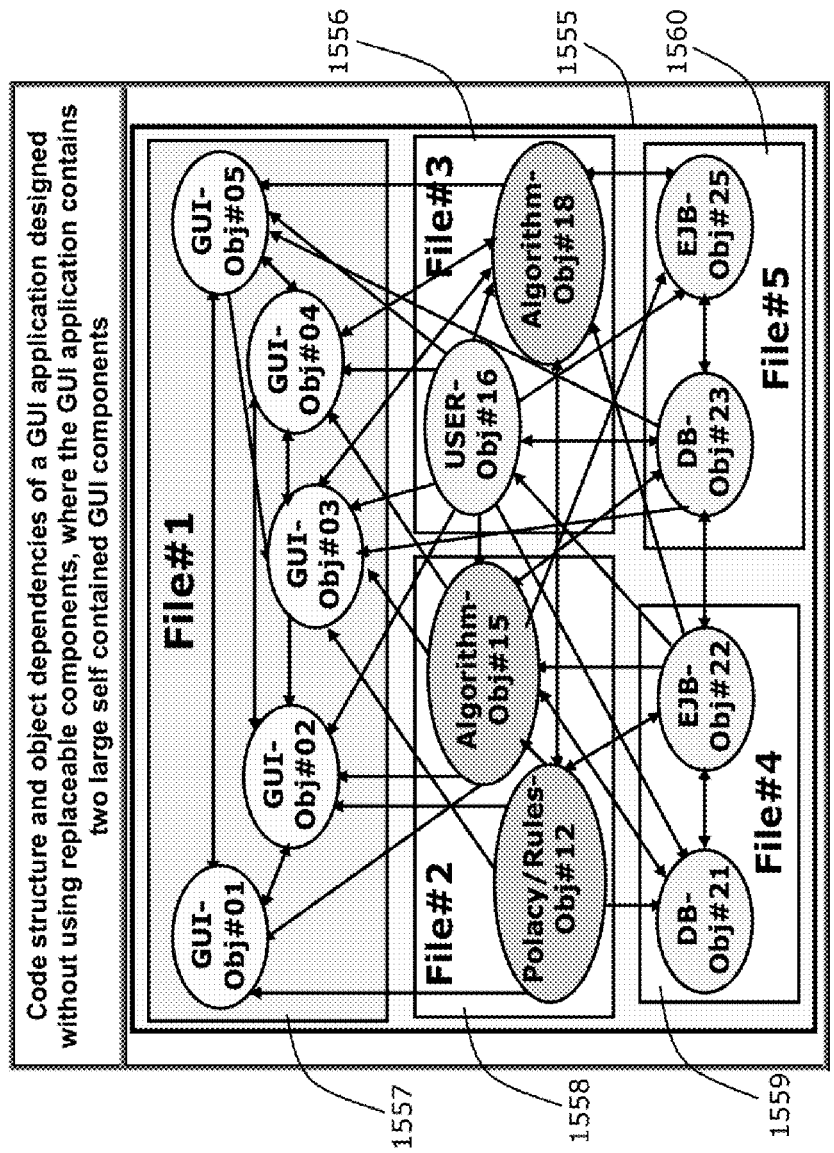

FIG. 15c shows server application code containing construction code for two self-contained components. But the construction code of the two components is intertwined, which means that one or more files include code chunks of construction code of both components with no physical demarcation or separation between various chunks of construction-code of each of the components. Hence if one of the self-contained components needs to be replaced/removed, it requires a lot of effort for locating and updating/removing construction code of the self-contained component.

This intertwining problem would only increase, if application contains more components, component-hierarchies or as more components are added to the application. This kind of wasted effort can be reduced if construction code of each of the self-contained component can be encapsulated in replaceable module such as a class definition. Hence it is desirable to implement GUI API (i.e. a set of reusable GUI Classes) so that they allow building component hierarchies by allowing such encapsulation of substantial portion of construction code of the self-contained components in a replaceable component class.

Section-O

Implementing Replaceable Components for Non-GUI Components

It is also possible to encapsulate construction code of a non-GUI component in a replaceable class definition, where the construction code is implemented to provide one or more related or similar services. These components do not present any GUI components and can be implemented for any kind of application such as either for web application or desktop application.

A class implementation of each of the replaceable components encapsulates construction code and implements interfaces for requesting services offered by the component. The communication code for such non-GUI components can be implemented either (a) In its container component, for example, by using integration-logic, or (b) within the construction code of the component, for example, by including code for registering its services with a predefined global service registration object (or SRO).

Example. 1

Spell Checker Component

Services associated with spell checking can be implemented as a class definition. This class-definition supports a service functions, such as "check_spellings ( )" and "get_suggestion_word_list( )". Where function "check_spellings ( )" can be called by passing a sentence or a phrase and the function returns a list of words that are spelled wrong. The other function "get_suggestion_word_list( )" can be called by passing a miss-spelled word to get list of potential correct words. To assemble this spell checker component in an application one needs instantiate and initialize an object instance. The object registers its services with SRO, so that any other parts in the application can lookup the services using predefined service names for requesting the services.

The main design objective of replaceable component is to separate "design and implementation of construction code of a self-contained component" from "assembling and using the self-contained component" as a subcomponent in an application. The implementation steps for assembling include (i) properly including a self-contained component in an application and creating communication code so that the self-contained component can properly collaborate with other parts of the application for performing its operations and features.

RepComp SpellChecker=new RC_SpellChecker (ACi, Dictionary, null);

SpellChecker object registers its service (e.g. "check_spellings ( )") method with the SRO using a pre defined lookup name such as "Spell Checker", for other components to look up and access the service. Many such self-contained services can be implemented as replaceable components by encapsulating their construction code in a class definition that also implements communication interfaces for coupling.

Example 2

Mortgage Calculator

Services associated with calculating mortgage and monthly payments can be implemented as a class definition. This class-definition supports a service functions, such as "get_monthly_payments( )", which can be called by passing total mortgage amount, total period of mortgage in months or years, interest rate and other parameters for calculating lists of monthly payments and various parts in each monthly payment. Each monthly payment contains two parts (i) interest component and (ii) principle component. When a lender pays a month's payment a portion it is applied to reduce the principle loan amount, where this part would be minimal in the beginning of the mortgage period and increases as the payments nearing the mortgage period. This mortgage calculation may require taking into consideration many factors such as banks-policies, tax implications and government regulations or incentives. The object registers its services with SRO, so that any other part in the application can lookup the services using pre-defined service names for requesting the services.

Example 3

A Replaceable Component Implemented for a Compiler

A compiler may implement a Replaceable Component class for processing arithmetic expressions and generate machine assembly code. When the compiler encounters an arithmetic expression or equation it calls appropriate service function of this object by passing the input stream of the file under compilation. This function processes the expression or equation for generating assembly code by using the compilation context such as variable name space and available math library.

Example 4

Collision Avoidance System for an Air Traffic Control (ATC)

Example 16, in 'Section-L' above discussed ATC and collision avoidance system. Any service such as collision avoidance system required by an application can be implemented as a replaceable component class, where the collision avoidance system implements code for frequently accessing the positions and other information such as location, speed, direction and height about each flight in the airspace. It also uses this information for detecting any emerging threat of collision. The container component of the collision avoidance systems needs to create required communication code so that, when a potential threat is detected, the collision avoidance systems contacts appropriate component to warn about the potential threat or raises an alarm for air traffic controllers.

Example 5

Services Implemented in Embedded Applications or OS

A large and complex software system such as Operating System (OS) of a computer or embedded application of complex devices implements and uses many non-GUI services. Some of those services in turn may be very large requiring thousands of lines of construction code for implementing each of the services. It is desirable to implement each of such large service-modules as replaceable component by encapsulating construction code in a class definition. Also, It is desirable to design the class definition so that its object instance to have loosely coupled interfaces (e.g. for using a SRO 810 in FIG. 8a) or simpler coupling interfaces for accessing its services or for providing services to it and easily replaceable as a unit.

In case of non-GUI applications it is desirable to manage dependencies of each self-contained component using utilities or tools (e.g. SRO in FIG. 17), where each self-contained component object is created by instantiating and initializing an instance of replaceable component class (e.g. Appendix-U2). Where properly initialized object instance is a self-contained component. The self-contained component may (a) require one or more external services and/or (b) provide one or more services for external parts. Hence each of the self-contained components further needs to be properly coupled by creating necessary communication code, if it needs to collaborate with external parts.

In one of the preferred embodiments, each replaceable component class is a subclass of an abstract class (e.g. ReplaceableComponent in Appendix-U2), which including of two abstract functions, where the first abstract function is to register all the services provided by the self-contained component and the second abstract function is to lookup and save references of all the objects or functions that provide required services. Each of the class definition of a replaceable component implements this kind of functions for registering all its services and for getting references for functions for getting required services, and calls each function whenever it needs respective service. For example, Appendix-U2 has sample implementation code for these two functions (e.g. register_all_services_provided and lookup_all_services_required) at the bottom comments section.

Each of the objects of replaceable components (i.e., RSCC) in an application registers itself with a global component management object or CMO. The CMO can be same as SRO (see FIG. 17) or it can be a different object. For example:

10. ReplaceableComponent RC1=new ServiceProvider1 (Rci, gso, sro, Data1);
20. CMO.Register_SelfContainedComponent(RC1);
30. ReplaceableComponent RC2=new ServiceProvider2 (Rci, gso, sro, Data2);
40. CMO.Register_SelfContainedComponent(RC2);

Where the class definition of ServiceProvider1 is subclass of abstract class ReplaceableComponent, hence it must implement the abstract functions of the abstract class. During initialization of the application, the CMO first calls the function of each of the objects (e.g. RC1 and RC2) to register services provided by its self-contained component. Once calling all the objects to register services, the CMO calls the function of each of the objects to lookup services required by its self-contained component. In this above simple example, self-component RC1 or RC2 can be removed by removing respective two lines or replaced by another component by properly updating the two lines.

Since code for each of the RSCC also include of code for creating required couplings between the RSCCs, such as finding required services, it minimizes required code for assembling its SCC into an application to just a few lines. Also the SCC may be removed from the application by removing the few lines. Container application doesn't require creating communication code for including such RSCC. The RCC not only allows refining its SCC with higher degree of autonomy for satisfying evolving business needs/user but also makes it simple to reuse of component code. For example, if another application need a similar component (e.g. ATC_CF), the code for RCC may be redesigned to create a new RCC so that the new RCC satisfies unique needs of the new application. Hence even if RCC is not readily reusable, the code base of RCC allows easier reuse.

Section-P Communication Between SCCs and Remote Data Sources

FIG. 11a shows a container CCG 1120 that creates application code for container component 1110, which is having two self-containing subcomponents 1111 and 1112. The container CCG 1120 instantiates and initializes replaceable component objects ACCG1 1121 and ACCG2 1122 and container CCG 1120 calls CGM of ACCG1 1121 and ACCG2 1122 for generating application code for subcomponents 1111 and 1112 respectively. The container CCG 1120 accesses require data from data sources 1127 and configuration files 1128 and uses the data for instating and initializing ACCG1 1121 and ACCG2 1122 objects. Furthermore ACCG1 1121 and ACCG2 1122 include construction code for accessing required construction data from data sources 1127 and configuration files 1128 and uses the data for constructing application GUI components 1111 and 1112 respectively.

A replaceable component class encapsulates almost all required construction code (e.g. code for data access, one or more GUI CCGs and application logic) for a self-contained component in a replaceable container such as class definition or module. In FIG. 11a ACCG2 1122 is a replaceable component. Also in effect code module 1112 is also a replaceable component, since it can be removed or replaced indirectly as a unit. But in non-web or desktop GUI applications initialized replaceable object will be the self-contained component.

Self-contained components 1111 and 1112 include of code to communicate with server programs 1124 and 1125 respectively. For example, AC1 1111 can use an URL and passes post parameters to execute server program 1124 for obtaining server data in XML format and use the XML data for updating itself. Where "WS/SOA" stands for "Web Services" or "Service Oriented Architecture". This method of components in a web page asynchronously communicating with server for obtaining XML data is popularly known as AJAX.

For example, in AC1 1111 presents a Flight image in an ATC application (FIG. 18a), upon click on the Flight image, the component calls a JSP on sever for obtaining latest data about flight (e.g. longitude, latitude and altitude etc.) and display the data in a table by calling a service method of a Info-table component. Likewise, if AC2 1112 presents a Dial image to set a new value for a device to control a PowerStation, the component calls a JSP 1125 on a computer that can physically change setting of a device (such as temperature setting) and sends acknowledgement or actual updated value back to the component 1112 AC2. AC2 uses the updated value to display value in Dial component in webpage. In this setup JSP 1125 communicates with a device driver that controls physical settings on an apparatus. When user changes settings in 1112 AC2, AC2 passes the new setting to JSP 1125. The JSP 1125 in turn calls the device driver to update the setting. The device driver updates setting and returns actual value set successfully to JSP 1125, which then returns the value to AC2 1112 to update the display. It is possible to merge AC2 1112 and JSP 1125 into a replaceable component class, if application is implemented as a non-internet desktop application.

FIG. 11b shows a container CCG 1160 creates application code for container component 1150, which contains two self-containing subcomponents 1151 and 1152. The container CCG 1160 instantiates a reusable GUI CCG 1161 object. It further contains construction code 1163 for accessing required data and configuration information from data sources 1165 and configuration files 1168 and application logic for processing the data to initialize the reusable GUI CCG 1161. Then container CCG 1160 calls CGM of GUI CCG 1161 for generating application code for subcomponent 1151. The container CCG 1160 instantiates and initializes a replaceable ACCG 1162 and calls it's CGM for generating application code for subcomponent 1152.

Although reusable GUI CCG 1161 builds code for self-containing subcomponent 1151, subcomponent 1151 is not a replaceable component since the container CCG 1160 implements or contains many lines of construction code 1163 for building the self-contained component 1151, where construction code 1163 includes many objects (e.g. 1156 to 1159), code to access data from data sources 1165, configuration files 1168 and application logic to process the data and properly initialize the reusable GUI CCG 1161. This entire construction code 1163 including many lines or sections of code in the container CCG 1160 must be properly removed to remove the subcomponent 1151. Hence although component 1151 is self-contained, it is not replaceable because it needs removing many sections of construction code 1163 from its container component CCG 1160. To be replaceable component (i) it must encapsulate substantial portion of constriction code of a self-contained component in a class definition and (ii) it must directly or indirectly allow including/removing the self-contained component as a unit.

On the other hand, a replaceable component 1162 encapsulates almost all the construction code in a replaceable container such as class definition. Also in effect code module 1152 is also a replaceable component, since it can be removed indirectly. In non-web or desktop GUI applications instantiated and initialized object instance 1162 will become self-contained component.

Self-contained components 1152 include of code to communicate with server program 1167. For example, component 1152 can use an URL and sends post-parameters over internet for invoking server program 1167 for getting data from sever in XML format and use the XML data for updating itself. Where "WS/SOA" stands for "Web Services" or "Service Oriented Architecture". In a special case, replaceable component ACCG 1162 may not contain data access code for initializing its GUI components, but implement or include data access code in code of AC2 1152. In that case, when AC2 1152 need to display its component or during initialization, so AC2 1152 calls JSP 1167 for getting data and uses the data for updating its self-contained component. JSP 1167 implements data access code for getting, processing data and sending the data to AC2 1152. AC2 1152 contains code to use the data to initialize and display its component including its subcomponents. This method is preferable if the data for component of AC2 1152 changes frequently during the period application is running in browser and the change in data need to be reflected by redrawing the component and subcomponents. For example, this method of AC2 requesting latest data from JSP 1167 may be triggered upon an associated event such as data change event or at pre-set intervals.

Each self-containing component (e.g. 1151 or 1152) can be implemented to periodically (e.g. by setting a timer) access data from servers over the Internet and use the data for redrawing or updating the self-containing component. The server contains a JSP file (e.g. 1167) for accessing required data for the self-contained component from data sources (e.g. 1165). The self-containing component 1152 uses appropriate URLs for calling the JSP files 1165 for getting required data from server.

In a preferred embodiment, a replaceable component 1162 includes of all the required code for accessing all the needed data (by accessing the data from data sources 1165) for constructing a self-containing component 1152, except in special case where the self-containing component is required to redraw itself periodically. In this special case, replaceable component 1162 does not contain data access code for getting construction data or initialization data. Instead it includes required code in the code of self-containing component 1152 for requesting service of an external JSP 1167 running on a server, which accesses latest data for constructing or initializing the component from data sources. In other words, the self-containing component 1152 includes of application code for using appropriate URL for calling JSP 1167 for getting data and redrawing itself using the data.

The self-containing components can also include of application code for requesting services of JSP files for just updating the state of the components. For example, in air traffic control application each Airplane component calls a JSP file for getting latest location and updates the location of the location on the map. This JSP is not accessing initialization or construction data, but providing a run-time service for a self-containing component. In general a replaceable component (e.g. 1162) for web application required to encapsulate all the construction code including the code for accessing all the required data for constructing its self-containing component (e.g. 1152), except in the special case where required functionality of the components is to redraw the component more than once by accessing construction data from an application (e.g. 1165) at run time (e.g. by using a JSP 1167).

In this special case, it is not practical to avoid using an external module such as JSP for accessing construction data by encapsulating all the data access code in self-contained component for web applications. For example, implementing database access code such as embedded-SQL statements in the code of self-contained component (e.g. 1152) is not practical or desirable due to issues such as security risks or performance. Hence this result in moving few sections of construction code such as application logic for processing data or authenticating user profile in to an external JSP file. But in case of a replaceable component for desktop GUI applications, it is possible to encapsulate this data access code in the replaceable component 1162. So implementing external module for data access can be eliminated in case of desktop applications, where self-contained component 1152 can access data sources directly. Except in the above special case, each self-contained component encapsulates almost all construction code, data and code for accessing data, in one of the preferred embodiments.

Although application component (e.g. client side GUI component) is self-containing, server side class (e.g. ACCG java class) creating the application component is not self-containing but substantially self-containing. That is, the ACCG class encapsulates substantial part of construction code for its self-contained component, and object instance of ACCG class requires few pieces of data for completely initializing the ACCG object. A container CCG or application implements few lines of construction code to supply few pieces of data to an ACCG object before requesting the ACCG object to create a self-contained component.

10. RepComp IBM_quote=new StockQuoteRC (ACi, "IBM", config_data);
20. IBM_quote.display_comp(ParentCanvas, x_loc, y_loc, config_data);

Where the newly created object IBM_quote at line 10 is used to draw the component on a parent canvas at line 20. At line 10, container component inputs construction data such as ticker symbol "IBM" and ACi object (see AC_Info class in Appendix-D2), which include of few pieces of data such as DB-connection objects, browser/viewer type/version or profile of requesting user.

Likewise, each replaceable component class for the desktop applications is substantially self-containing but not self-containing. Each of the replaceable component classes are often designed so that it's object instance (e.g. 1081 or 1082) needs just few lines of construction code for inputting few pieces of data. Once the object instance (e.g. 1081 or 1082) is initialized by supplying required data, the object will become self-contained component for the desktop application.

Each self-containing component in an application includes two kinds of code to properly perform its functions or operations required by the application (i) construction code, which includes all the code that is required for creating and proper operation of a self-containing component and (ii) parts of communication code, service functions and interfaces for providing and getting services, which includes the code that allows the self-contained component to collaborate with external parts in the application. Each of the self-contained components may also includes code for communicating with pre-defined global object such as service registration object or global services object for establishing communication links with external modules (e.g. FIG. 8*a*). Also container components including self-contained components create communication code for the self-contained components, where the communication code (e.g. 1037 in FIGS. 10*b* and 1083 in FIG. 10*d*) is not construction code for the self-contained components.

Example 17

Illustrates Difference Between Using and not Using Replaceable Components

FIG. 15*a* shows an application 1510 containing 2 self-contained components 1520 and 1535, which are created by 2 replaceable components 1501 and 1503 respectively. Where class definition for each replaceable component (e.g. 1501) uses many objects and encapsulates construction code for building its self-contained component (e.g. 1520). FIG. 15*b* shows an application 1545 containing the same two self-contained components 1520 and 1535 shown in FIG. 15*a*, but in FIG. 15*b* they are created by a JSP 1540 without using any replaceable components. JSP 1540 uses all the same objects and similar construction code used for constructing both the self-contained components (i.e. 1501, 1503) for creating the same application, so that applications 1545 looks and functions exactly like application 1510.

Since construction code for each of the two components is not encapsulated in a replaceable class, JSP 1540 merges all the construction code sections of both self-contained components (e.g. 1520 and 1535). For example, if each of the two self-contained components (e.g. 1520 and 1535) is created as an independent JSP (e.g. 1501 or 1503) file and tested, for example by two developers or by same developer but independently from each other and If it is not possible to encapsulate construction code of each self-contained component 1520 and 1535 in a replaceable class, then it requires more effort for merging the code bases of two components in JSP 1540 that creates application containing both components. Although FIG. 15*b* is showing construction code in separate dotted boxes 1542 and 1544, physical structure of the merged code of two large components unlikely so well demarcated for each component (e.g., by exclusive set of files consisting of construction code of each of the SCCs). Although FIG. 15*a* and FIG. 15*b* creates same application and each SCC have same construction code, but the code of each SCC is organized quite differently or source code for one application is modularized/structured (i.e. structured or organized) quite differently from the source code of the other application.

FIG. 15*c* presents object level tightly coupled dependencies in an application containing two medium or large self-contained components, where construction code of each SCC is not encapsulated in a replaceable component class. As shown in FIG. 15*a* construction of each self-contained component 1520 and 1535 requires many objects and implementation of many lines of code for exchanging data between the objects. Furthermore in this example the self-contained components 1520 and 1535 need to collaborate with each other, so application also contains communication code 1536 for the self-contained components 1520 and 1535.

Both self-contained component and replaceable component are new type of components introduced in this invention. For example, in prior art such as an object-oriented programming (OOP), if a self-contained component requires communicating with another self-contained component, usually one of the objects (e.g. a GUI object upon mouse click) in first self-contained component communicates with an object in the second self-contained component. Hence in OOP, no distinction is made between (i) Construction code of a self-contained component, which includes of code for allowing data exchange between objects used for internal operation or building a self-contained component and (ii) communication code allowing data exchange between two self-contained components, which also include data exchange between two different objects, where each object belong to a different self-contained component.

In this scenario, in some cases, same objects (e.g. DB or EJB) may be designed for accessing required data for both self-contained components. So both self-contained components use same class-object, hence changes to the class design impacts both self-contained components. Although certain objects and class definitions (e.g. reusable GUI classes) can be shared or used across multiple self-contained components, caution must be taken to properly manage the unnecessary dependencies they could inadvertently create between self-contained components. Furthermore construction code of each self-contained component may span across multiple source code files as shown in FIG. 15*c*. In that case, the code structure further degrades as more and more features are added to each of the self-contained components, for example, for satisfying evolving business needs. So to remove a self-contained component from an application, it is required to remove many objects and construction code used for building the self-contained component and also required to update communication implemented for the self-contained component.

FIG. 15*c* depicts how the code sections likely be spread across many files, if an application containing two large self-contained components is created without knowing about replaceable components and making any conscious effort for identifying construction code of each of the components. In this implementation of FIG. 15*c*, there is no effort is made to distinguish between communication code and construction code of each of the self-contained components (e.g. 1520 and 1535). FIG. 15*c* depicts how a typical OOP applications are implemented, since replaceable components and self-contained components are new kind of software components and/or also it is not practically possible to encapsulate a large self-contained component such as AirTrafficControl or LandMarks using most if not all available reusable GUI APIs.

In case of a large application containing many large components created without using any replaceable component as shown FIG. 15*b* or 15*c*, it requires many times more work for removing or replacing each of the self-contained components. To make any modifications to just one self-contained component, it requires more effort to find all the code sections constitute the construction code of the component, since there is no clear physical demarcation for many construction code sections implemented for the self-contained component (e.g. a set of exclusive files including substantial part of construction code for each SCC). Some of the source code files (e.g. see files in FIG. 15*c*) of program also include construction code of more than one self-contained components. So changes to construction code of a self-contained component have a risk of inadvertent impact on code or functionality of other self-contained components. Hence considerable wasted effort can be avoided by using replaceable components, for example, in locating all the construction code sections of each self-contained component, if all the construction code sections of the component are encapsulated in independently maintainable and testable class.

In a preferred embodiment, each RSCC is custom designed in the context of a specific application and in the context of other RSCCs in the application. For example, the RSCC for CityATC (i.e., City GIS application of Example 15, in Section-L) is created to fit the component for city map (i.e. CityMapCF), for example, by using proper coordinate system and size. Also, if an RSCC needs to communicate with other RSCCs, each of the communication interfaces in the RSCC is designed to properly communicate with other RSCCs. For example, if two RSCCs are communicating using "Service Registration Object" (e.g., as illustrated in FIG. 8*b* and FIG. 17), then both RSCCs are designed to use a lookup-key and a service function format (e.g., number of parameters, return object of the service function and their types) for each communication interface. In one of the preferred embodiments, if an application or container-component includes two RSCCs and needs to create a coupling between the two RSCCc for allowing communication between the two RSCCs, each of the coupling interfaces in each of the two RSCCs are designed to be compatible with each other in order to reduce the code required for creating the coupling.

In a preferred embodiment, the objective of encapsulating construction code-sections of each of the SCCs is to avoid mixing of construction code-sections of multiple SCCs in multiple application files, since such mixing makes it harder to find construction code of an SCC, for example, to redesign, to reuse code or to remove the SCC. In other words, the objectives of the RCC are (i) making simpler to find the code-sections of its SCC, for example, to redesign the SCC or to reuse its code for creating similar SCC for another application, and (ii) making it simpler to either include or remove its SCC as a unit. For example, if code-sections of an SCC are not encapsulated in an RCC, removing the SCC from its application requires error-prone work to remove code-sections of the SCC, which are mixed with other code-sections of the application.

If a large application (e.g. see City GIS application) is created without using replaceable components, physical code structure of the application unlikely reflects the independence or separation between construction code sections of each of the self-contained components in the application. Also such application design doesn't make any distinction between construction code and communication code. Even if the construction and communication code sections are structured to maintain some kind of logical separation between the self-contained components, any initial logical structure would erode as changes are made to each the components and communication code.

If the construction code of each of the self-contained components is not encapsulated to physically maintain separation between construction code sections of multiple self-contained components, it is harder to preserve the initial design structure, especially if new developers (i.e. who are not the original developers of the earlier versions of self-contained components) are making the changes. In case of using the RCCs, it is possible to preserve higher degree of independence of each of the component's construction code. For adding new features or functionality to a self-contained component, it is required to change either construction code or communication code (e.g. communication interfaces), or both. The class definition of a replaceable component (e.g. 1501 and 1503) is updated to make changes to construction code. The replaceable component's (e.g. 1501 and 1503) coupling-methods and its interfaces may also need to be changed to support new features, where the coupling-methods and interfaces are part of the construction code. If the communication interfaces are changed, then either the communication code in the component's container component or other parts of the application that are using the interfaces for collaborating with the component must be changed accordingly. It is desirable to use tools for detecting any broken interfaces, if one of the self-contained components is updated.

Whenever an SCC is updated or refined, it is desirable to assure quality and performance of the SCC by testing the SCC and its interfaces independently (i.e. outside its application). Encapsulating each of the SCCs (e.g. Landmarks_RC or each of its subcomponents such as TouristSpots) allow testing the SCC independently. If a large SCC (e.g. Landmarks_RC or City_ATC_RC) is not encapsulated in an RCC, often whole-system must be tested to assure quality after making a change to the SCC. It is desirable to check quality of a large system by assuring quality of each of its SCCs and compatibility of the communication interfaces between the SCCs by using tools such as SRO (FIG. 17).

Section-Q

Description of Replaceable Components or RCCs

Replaceable component (e.g. 1501 and 1503) classes are different from other kinds of software components. Each RCC is custom designed to satisfy unique needs of an application and to allow for easy updates to meet often-unpredictable evolving future needs. The main design objective of the replaceable components is to increase to the highest degree practical (1) self-containing and (2) reducing coupling by minimizing the number of interfaces and code needed for coupling of its SCC. An RSCC is considered as self-containing even if it collaborates with or depends on a few external services in its operations or functioning as long as its collaboration is either providing services or consuming external services through communication or coupling interfaces. The main design objective of a replaceable component is not reuse of component but to meet unique needs of an application, to be self-containing, and be easily replaceable in order to easily adaptable to evolving needs.

Replaceable components are different from the reusable components such as GUI API or GUI CCG classes. A replaceable component in general requires redesigning its code to create a new version for use in a new application. In one of the preferred embodiments, an RCC designed not only to satisfy current unique needs but also to reduce effort required to meet future needs of the application. Otherwise, a reuse of a replaceable component of an application in a new application without creating a new version likely compromises the flexibility of the new application and discourages updates to the RCC for meeting evolving needs of each of the two applications.

In contrast, the design objective of a reusable GUI class of a large GUI component is to make the GUI class reusable across multiple applications without the need for redesigning the component for each of the applications. Hence, a reusable GUI class is designed to offer many configurable features and interfaces for initializing and configuring its GUI component to meet unique needs of each of the applications. For example, to build a large functional self-contained GUI component (e.g. line chart 512 or 612) for an application requires many lines of code for accessing data 505, application logic in addition to instantiate, initialize and configure the GUI object 501 instance of a reusable GUI class. To properly remove the GUI component 512 from the application requires removing or updating all those lines of code associated with the GUI component in addition to the code for instantiating and initializing the GUI object. Although line chart 512 is self-contained and if not coupled for communication with an external part in its container application, the GUI object of the line chart alone is not a replaceable component because code of application logic and data access for line chart is not encapsulated within the component scope (e.g. an ACCG class definition). For example, a reusable GUI class of a large GUI component in general can be neither self-contained nor replaceable. However, a replaceable component 500 is a self-containing class implemented to satisfy unique needs of an application where the class-definition includes not only data access code and application logic code but also the code for instantiating and initializing multiple GUI objects (e.g. 501, 502) using respective reusable GUI classes.

A replaceable component is a smaller self-contained replaceable part of a larger application. For example, a container component can assemble a replaceable component (e.g. FullStockQuote in FIG. 6) by (i) instantiating an object variable using the replaceable component's class definition, and (ii) implementing a few lines of code for initializing and coupling the replaceable component using the object. The replaceable component can be disassembled from the container component by changing or removing the code statements that refers to the variable. A component is replaceable if it can be implemented as either a module or a class definition abstract, which encapsulates all the required code of the component in the abstract. When all the code of the component is well encapsulated in the abstract, the component can be assembled into an application by writing a few lines of code and can be disassembled from the application by removing or updating those lines of code.

The dependency or coupling between any two components means that the components collaborate with each other by requesting each other's services. Two software components are said to be coupled in this disclosure, if the components are self-contained and their service interface is designed so that they are coupled by including a few lines of communication code and uncoupled by deleting or updating the communication code. When a component is self-contained, the component usually communicates or collaborates with other components of a larger application through service interfaces (e.g. for getting services of other components or for providing it's own services to other components). For example, communication code for allowing collaboration between two self-containing components such as shopping cart and shopping item to add a shopping item (e.g. 1602) to shopping cart (i.e., as illustrated in 1604 of FIG. 16) upon user's click on the shopping item 1602 is different from, construction code for accessing data by using a database object and using the data to initialize an object of a reusable GUI class to construct a component.

A replaceable component provides a method for testing its application component independently, according to one of the preferred embodiments. This method is used when existing functions, features or services need to be improved or there is a need for overcoming any shortcomings in the current version. To redesign and test a replaceable component independently outside any application, a small test application is created, which includes code for (i) including the replaceable component's RSCC, (ii) necessary code for accessing and testing any of the services provided by the replaceable component's RSCC, and (iii) necessary code for providing any of the services needed for the replaceable component's RSCC under testing. For example, each replaceable component is a class definition abstraction, which encapsulates a self-contained component so that the component can be replaceable as a unit by using an object instance variable and offers means for testing independently outside the application, according to one embodiment.

In contrast, although reusable classes such as CCG GUI classes of a large GUI component is not self-contained because reusable GUI classes requires many lines of code and data for constructing a self-contained GUI component. Example 15 under 'Section-L' shows few examples for the replaceable components. Each of the RCCs (e.g. LandMarks or TouristSpots) is a substantially constructed self-contained component-part of an application, which can properly function in the application to process user inputs such as mouse clicks or collaborate with other components by providing or requesting services. Each RSCC is designed to have service interfaces and the interfaces must be properly coupled if its component needs to collaborate with other parts of the application, according to one of the preferred embodiments.

SCCs may depend on one or more global service objects, some of which are discussed below. If an SCC depends on one or more global service objects, its test application also includes the global service objects, so one of the preferred embodiments, encapsulate each of such shared service objects in a class definition, so that each shared service object (e.g. APP_xyz_Services below) can be included in test application by writing few lines for instantiating and initializing an object instance. To minimize effort needed for testing a replaceable component class independently using a test application, it is desirable to reduce the number of couplings of its SCC with other components and the number of global service objects that the SCC depends on.

The coupling code for a SCC is included in its container component or within the code of the SCC. If the server code of integration logic is responsible for generating the coupling code, part of the coupling code may be within the container component but outside the SCC's code. Alternatively, the coupling code can be included in the code of the SCC if it uses predefined global services. Any component can be designed to contain code for requesting a predefined global registration object to look up necessary services. An application can predefine and include global message window object (e.g., APP_xyz_Services), which is used by any SCC in the application if it needs to display a message.

APP_xyz_Services.Display_message_window (message_type_code_num, message_string, config_info, call_back);

Where "APP_xyz_Services" is a shared services object including multiple service methods and "APP_xyz_Services.Display_message_window" is calling one of the service methods to display a message in a popup window. The following statements illustrate three service calls for displaying three massages:

APP_xyz_Services.Display_message_window (INFO_MSG, "CONGRATULATIONS! Your test score is: 99%", NULL, NULL);

APP_xyz_Services.Display_message_window (ERROR_MSG, "You entered a negative number for age, enter a number between 0 and 150", NULL, NULL);

APP_xyz_Services.Display_message_window (ERROR_GET_ANSWER, "There is an Error in calculation, do you wish to continue?", NULL, take_action); Function take_action (selection) {if (selection==YES) do_something( )}

Any RSCC in an application can use such predefined global service objects. Each global service object may provide more than one service method. For example:

APP_xyz_Services.Send_event_log_message (SECURITY_ERROR_LOG, "This user trying to access secure data area", user_id);

Removing an RSCC that depends on a shared service object won't cause errors in the shared objects, since such shared service object does not depend on RSCCs. Hence, RSCC still can be easily disassembled or reassembled. However, care must be taken when redesigning a shared or global service object. When new features are added to the global service object, backward compatibility must be maintained. If many components depend on the global service object, removing the global service object can cause errors in many components. The global service object is not a replaceable component.

Each global service object can be designed as a class definition so that it needs fewer lines to include an object instance in any application. In the following example, code line 10 includes a file containing a class definition (e.g. APP_MSG service_class) and line 20 instantiates a global service object (i.e. APP_xyz_services is an object instance of class APP_MSG_services_class).

10. <script xlink:href='Global_JavaScript_Classes/APP_MSG_services_class.js' language='text/ecmascript'/>"
20. var APP_xyz_services=new APP_MSG_service_class ( );

Alternatively, in case of web-applications, an ACCG (e.g. APP_Services_ACCG1 Java class) is implemented to generate application code of a global service object using a given name (e.g. "APP_xyz_services"). For example, below is sample code to include the Global object using the ACCG:

10. <% Global_Ser_Obj=new APP_Services_ACCG1 (aci, "APP_xyz_services");
20. Global_Services_Obj.CGM (Out); %>

In a preferred embodiment, the replaceable component includes all the necessary code such as code for accessing application data, code of application logic and presentation code for building a self-contained component. FIG. 5 shows an example of a replaceable component. The GIS application (See example 15, 'Section-L') provides examples for a few replaceable components. Each replaceable component is assembled into a large application as a subcomponent or may run as an independent application by providing services the component requires or accessing services offered by the component. For example, it is possible to test each replaceable component (e.g., CityLandmarksCF, AmbulancesCF or CityATC) independently by assembling into a simple test application, which contains additional code for providing required services for testing. When it is necessary to update or refine a replaceable component, its class implementation can be redesigned independently. It then is tested using the test application, which may use static data from files to conduct tests for various cases. Once the component passes all necessary tests, it is assembled into a large application.

In summary, a replaceable component is a class-definition or module custom designed to substantially encapsulate construction code of a self-contained component (SCC) with the features that (a) it can be used to easily assemble or include its SCC in an application, (b) its SCC can be easily disassembled or removed from the application, and (c) it includes methods, interfaces and code to allow for coupling of the component with other parts of the application if the component needs to communicate or collaborate with other parts of the application.

Section-R

A Mechanism for Managing and Validating Dependencies Between the RSCCs

An application can be created by assembling many RSCCs as shown in FIG. 17. Plural RSCC 1710 offer one or more services for other components. Likewise, plural RSCC 1720 depend on one or more services offered by other components. It is thus desirable to have a tool for automatically detecting broken dependencies or incompatible interfaces between any two RSCCs. During the initialization of the application, each of the RSCCs registers each of its services with the Service Registration Object ("SRO") 1700. Likewise, each of the RSCCs registers each of the services that the RSCC requires (or depends on) with the SRO 1700. The SRO 1700 builds a list of all available services 1730 and a list of all required services 1735. After the initialization of the application, the SRO 1700 compares the two lists, match the available services 1730 with the required services 1735, and create a diagnostic report showing all mismatches. The SRO also detects that (i) a required service 1740 for a RSCC is not available, (ii) an available service 1745 is not used, and (iii) a required service 1751 and an available service 1752 are incompatible. Missing services and incompatible services are also known as dependency or interface problems. Those problems may arise after one of the service-providing RSCCs is updated while one of the dependent RSCCs is not updated properly. The unused services are removed during the cleaning up the application code.

The SRO 1700 is used to facilitate communication between two components, for example a service providing component 1762 and service consuming component 1764. Service providing component (1762) registers a service function using a predefined service name (e.g. "Shopping Cart Type3") with the SRO. Service consuming component 1764 calls the SRO's lookup method for finding the service function by using the predefined service name (i.e. "Shopping Cart Type3"). The name of the service and interface of the service function must be defined in advance of designing the two components (1762, 1764) so that the components are implemented to communicate with each other properly. The interface of a service function includes service version, type of the object returned by the service function, number of parameters and type of each parameter of the service function. The service providing component 1762 is designed to include information about the interface 1752 and a unique id for the component (e.g. its Class name) when registering service function with SRO. The service-consuming component 1764 is designed to include information about the interface 1751 and a unique id for the component when it calls SRO's method for looking up or at the time of initialization. SRO 1700 is designed to use the information 1751 and 1752 to detect incompatible communication interface if one of the two components is redesigned and the other component is not updated accordingly.

This method of using the SRO 1700 to manage component dependencies or detecting incompatible interfaces is not limited to web applications, and can be used in any software application including SCCs or RSCCs. Each SCC may offer one or more services and also consume one or more services of other components. The services listed in the SRO 1700, the available services 1730 and the required services 1735, can be used for building tools or utilities such as (a) an utility for finding all the other components that depend on a given component or service; or (b) an utility for graphically displaying each component as a node in a network map and connection lines between the components as dependencies (the image is referred to as component dependency map). Each of the components or nodes on the map may be a hot link for opening a new window that displays services the component provides or consumes and a list of components that consume or provide each of the services. The SRO 1700 may create a file containing the lists 1700 and 1730 upon exiting the application or on a given event such as clicking on a designated button. A tool is build to read the lists from the file to display the component dependency map.

An application may implement two service registration objects, SRO1 and SRO2. Here SRO1 (FIGS. 8a, 8b) is for facilitating communication between each of the service-consuming components and each of the service-providing components in the application like the method discussed above while SRO2 is for managing dependencies between service-consuming components and service-providing components. To allow for managing dependency, each of the SCCs in the application also separately registers (i) each of the services it offers along with information about the communication interface and (ii) each of the services it needs along with information about the communication interface with the SRO2 (FIG. 17). The SRO2 uses the information about the communication interfaces for managing dependencies by (i) detecting incompatible communication interface between any two components or (ii) finding all the communication interfaces of a component. This second SRO is different in that it has storage space for accepting information about communication interfaces for each service entry and a method for adding service with interface information. In addition, this second SRO also has the code necessary for finding all communication interfaces for a component, the code for comparing whether a required service is missing from the available service list, and the code for comparing whether the communication interface of a requested service is same as the communication interface of an available service.

Section-S

Figure 6B:
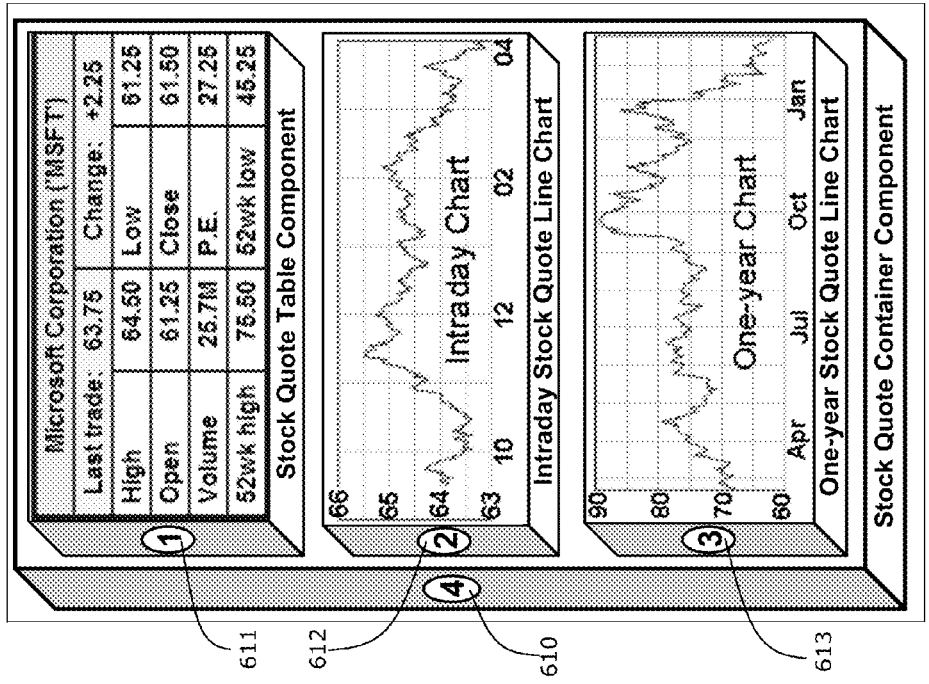

Example for Self-Contained Components (or SCCs), Replaceable Component Classes (or RCCs) and Description for Construction Code FIG. 6a shows an application or container component 600 including three self-contained components they are (i) Stock quote table 601, (ii) A line chart to show stock movement for a day 602, and (iii) A line chart to show stock movement for a year 603. FIG. 6b shows the container self-contained component 610 and its three self-contained subcomponents in 3D to highlight each of the self-contained components. FIG. 6c shows the code of a JSP or container component that implements construction code for presenting all the three self-contained components 601, 602 and 603 in FIG. 6a. FIG. 7a shows alternative method that uses three replaceable components for building the three self-contained components 601, 602 and 603, where each replaceable component encapsulates construction code of each self-contained component. Although both server programs shown in FIG. 6c and FIG. 7a respectively accomplish the same task, which is presenting a full stock quote of a company including three self-contained components, each used a different design method.

For larger application containing many large components and subcomponents, the design that uses replaceable components offer better division of labor, modularization and reduces work needed to refine and test each of the components and subcomponents. For example, if each of the self-contained components is encapsulated in a replaceable component, the component can be independently refined and tested, for example, for satisfying evolving business needs or to overcome any shortcomings in the initial implementation, according to one of the preferred embodiments.

FIG. 7b shows how each of the replaceable components encapsulates construction code for creating each self-contained component, where the construction code including code such as code for accessing data, code for using objects and code for exchanging data between the objects. Here the objective for the replaceable components is not only division of labor by allowing building and testing each component independently but also preserving autonomy for allowing refining and testing independently (e.g., away from its application) during future maintenance cycles. FIGS. 15b and 15c shows dependencies between objects of an application that containing just two self-contained components, if the construction code of each of the self-contained components is not encapsulated in replaceable components or if it is not possible to encapsulate the construction code of each of the self-contained components in a class definition.

A replaceable component not only encapsulates code for accessing substantial portion of data required by its self-containing component but also encapsulates substantial portion of application logic for using the data for initializing or constructing various parts of its self-containing component. Construction code includes configuration and customization for satisfying unique needs of the application such as security or user preferences. Hence almost all of the reusable GUI components (e.g. reusable GUI class for presenting a line chart) cannot be replaceable self-contained components, because they depend on their container component for substantial portion or all the application data. Often container component of a reusable GUI object provides all the application data and application logic for presenting a GUI component (e.g. FIG. 4a). For getting the required data, the container component must often use application specific data sources (e.g. RDBMS), db-schema and implement data access code for getting the required data from the data sources. Furthermore the container component must implement application logic to process the data for building a component.

The main intention is to build and test each replaceable component as an independent application as much as practically possible. Also main intent especially is to preserve that kind of autonomy or independence throughout the life of the application maintenance cycles such as updating and testing the component to satisfy evolving application needs. In practice most components need to collaborate or communicate with external parts and/or depend on external services for proper operation. So the design intent of a replaceable component is to make it simpler for creating a test application for testing the RCC independently, where test application provides required services for its SCC and also to test services provided by the SCC.

The design intent of each of the replaceable components is to minimize the code required for properly coupling its self-contained component, if the component required collaborating or communicating with external parts. This does not necessarily mean minimizing the data pieces required by the component for the collaboration. The design intent is just to minimize the number of communication interfaces by passing as much data as practically possible through each interface, without sacrificing its functionality, features or operation for satisfying unique needs of the application. Also it is desirable to implement the communication interfaces simpler or loosely coupled (e.g. by using a SRO 810 in FIG. 8a), in order to minimize the code and effort required for implementing communication code and for disconnecting communication dependencies associated with the self-contained component.

For example, if a shopping-cart/invoice-table requires many pieces of data for adding each purchased shopping-item, it is desirable to pass all the data pieces through one interface (i.e. The service function for adding a shopping-item must be designed to pass all the data pieces in its parameters). Wherever possible using one interface is preferable over using multiple interfaces where each of the interfaces passes a subset of total data pieces required by the shopping cart. One of the main design intent of a replaceable component is to minimize number of interfaces and communication code required to couple and uncouple its self-contained component.

Designing a component to be more configurable and customizable might not only turn more reusable by multiple applications, but also increases code or data required to incorporate or assemble the component. Hence making a component more reusable often reduces its replaceability, since it increases the construction code required to assemble or disassemble the component. Hence designers must often require choosing one over the other. For example:

10. ReplicableComp RC1=new FullStockQuote (ACi, "IBM", Config_StyleObj);
20. ReplicableComp RC1=new FullStockQuote (ACi, "HPQ", Config_StyleObj);

Where the input data is a ticker symbol of a company and a style object, where style object determines styling such as fonts of text or color-coding of graphic elements. It is certainly more desirable inputting a ticker symbol over implementing a component (e.g. IBM_FullStockQuote) for each company. However, in few cases inputting certain configuration data is desirable, such as a style object. This forces container component to create config-object and input to each of the instances of replaceable component objects, hence each replaceable component becomes replaceable by a lesser degree. Hence allowing more and more configuration by container component reduces degree of replaceability. It is often required that all the components in a container component need to use consistent style, which can be defined by the container component in the style object. Alternative method is creating a config-file and implementing construction code in the replaceable component for reading the config-file, so container component don't need to implement code for creating and inputting config-object. Hence it is desirable to move construction code of a self-contained component as much as practically possible in to its replaceable component class in order to minimize the construction code required to implement in a container component for including and assembling the self-contained component.

10. RepComp LA_weather=new WetherForecastRC (ACi, ZipCode1);

20. RepComp NY_weather=new WetherForecastRC (ACi, ZipCode2);

Where input data includes a zip code, which instructs replaceable component to get weather data for a location or city (e.g. FIG. 4c). Often it is required to implement such replaceable components, which require few pieces of data from the container component. So design intention of each of the replaceable components is to minimize data and code required for instantiation and initialization, in order to minimize required construction code to no more than few lines for assembling an instance of its self-contained component.

Although application component (e.g. client side GUI component) is self-contained, server side replaceable component class (e.g. ACCG java class) creating the application component is not self-contained but substantially self-containing. That is, the ACCG class encapsulates substantial part of construction code, yet the ACCG object instance requires few pieces of data for initializing and creating a self-contained component instance. So container CCG of an ACCG implements few lines of construction code to supply few pieces of data for the replaceable component for creating its self-contained component.

A container application or a component required to implement few lines of code to instantiate and initialize a replaceable component by inputting few pieces of data for construction and configuration of its self-contained component. For example, the following inputs application data such as airport code, scaling parameters (e.g. to fit in container component) and other configuration data.
ReplicableComp RC1=new ATC_CF (ACi, "JFK", Config_Obj, Scale_Obj);

Although increasing reuse or configurability is useful, the replaceable components should not sacrifice replaceability for reuse or configurability, according to one of the preferred embodiments. But in many cases, the designers must make a trade off, if they get substantially large benefit, for each construction method they support for reuse or for allowing configuration of its self-contained component. In such case the replaceable components can support a few construction methods to enhance its reuse or configurability, while preserving the replaceable property. That is, the component is still replaceable even it requires few more pieces of data, as long as it requires just few lines (e.g. fewer than 2 to 9 lines) to assemble the component into an application. This construction code is not including any communication code implemented by its container component for the self-contained component. Therefore in order to maximize replaceability, each replaceable component must encapsulate substantial portion of construction code (e.g. application logic or data access code), while allowing a few construction methods for container component in order to enhance reusability or configurability, if such configuration or construction methods offer substantial benefits, according to one of the preferred embodiments.

Reuse may be categorized in to two types (i) Reuse of class definition to create multiple replaceable components in a single application, and (ii) Reusing across multiple product lines, where the class definition is used to include one or more replaceable components in multiple applications. It is desirable to make a replaceable component more reusable within an application, but should not concern much about reuse across applications, in one of the preferred embodiments. Both have different dynamics, such as, if reused across multiple software products, the business needs of each product are likely diverge in future upgrades. Also one must update and test multiple products or applications, whenever a replaceable component is redesigned for any one of the applications. If a component is updated (e.g. its interfaces) for an application, it forces updating and testing all the other applications using the same class definition of the component. This kind of overhead conflicts with one of the requirements of the replaceable components, which is to make the replaceable components easily adoptable to changing business needs of its application. For example, to add additional capabilities, some times require updating database schema (e.g. 401) to accommodate additional data and the component class must be redesigned to access the new data. This forces other applications to make substantial changes to their database, if they like to preserve reusability.

But certain components can be designed to be both replaceable and reusable. For example, a vendor for city maps can build comprehensive database of information for creating maps and offer multiple versions of replaceable component classes to choose for city maps for multiple applications. In this case, most of the overhead cost of redesign, maintaining backward compatibility and/or testing the reusable classes is bear by the map component maker and the applications occasionally need to compromise on certain unique requirements (e.g. if a feature is not supported by such third party reusable components). If this kind of classes still requires more than few lines (e.g. over 12 or 25 lines) of configuration or construction code, in order to increase degree of replaceability for its self-contained component, yet another replaceable component class can be implemented that encapsulate this code for instantiating an object instance along with the more than few lines of configuration or construction code for initializing the object.

Hence if a container component or container CCG needs to supply a lot of application or configuration data or needs to implement lot of application logic to a reusable component (e.g. GUI API provided by a vendor or third party) for constructing its self-contained component (or a service-object, in case of non-GUI-component), then the component is not a replaceable component. It is desirable to encapsulate this kind of reusable component and associated construction code to make it a replaceable component. A replaceable component must encapsulate about 90% of its construction code such as code for application logic and code for accessing application data, leaving just about 10% or less of the construction code for the container component in order to assemble its self-contained component. A replaceable component must require no more than 'few lines' of code to include its RSCC in an application, where the approximate limit for 'few lines' could be 5 or more, which is determined appropriately based on the application context and nature of the RCC, but each RCC of a large RSCC must encapsulate no less than 90% construction code, in one of the preferred embodiments.

If two self-contained components need to collaborate or communicate with each other, respective communication interfaces are predefined, so that, each self-contained component is implemented with proper communication interfaces or code in order to collaborate or communicate properly. For example, if first component is providing a service and second component is requesting the service, then the interface for requesting the service is predefined and shared with the designers of other components. The second component that depends on the service of first component is implemented with code or interface for properly requesting the service. For example, if components are coupled using SRO (e.g. FIG. 8a or 8b), then first component implements code to register its service with SRO and the second component implements code to lookup the service in SRO and to request the service. Alternatively container component implements required communication code (e.g. 1033 and 1037) for allowing collaboration between the components by using interfaces of the components.

Since one of the main objectives of the self-contained components is to be adoptable to changing unique needs and easily replaceable, the interfaces are also easily adoptable to unique changing needs and to minimize code required for coupling the component. Interfaces of a self-contained component are often not standardized for reuse across multiple applications, since such standardization and reuse makes the self-contained component less replaceable. But the interfaces of certain global objects such as GSO discussed above for displaying various kinds of messages are standardized hence it is harder to change or replace, since any change in its interfaces forces changes in multiple components. It is preferable to use interface versions to implement new interfaces for newer updates, so that older versions maintain backward compatibility and allow each of the self-contained components to upgrade when needed or allow some time to update to use new interfaces. Such global objects are often not easily replaceable.

Description of 'construction code' for a self-containing component: "Component construction code" or "Construction code" is all the code that is implemented for constructing a self-containing component and performing its operations. Examples for construction code includes, but not limited to, code for accessing data from data sources, code for accessing configuration information, code for storing data, code for application logic for processing the data, code for proper functioning of the component, instantiate and initializing CCGs (e.g. GUI CCGs and ACCGs) for presenting subcomponents. If the subcomponents need to communicate with each other, the code to couple the subcomponents is also a part of the construction code of the self-contained component. FIG. 5b shows a self-contained component that contains two charts (i.e. a line chart and a bar chart). The construction code uses many objects and implements construction code such as code for accessing data from some objects and code for inputs data into some objects. Furthermore uses few objects for processing business logic such as rules/policies, user-profile and security or preferences.

"Component communication code" or "communication code" is the code implemented for allowing data exchange or collaboration between two self-contained components or between a self-contained component and an external part such as part of its container component or container application. Any code implemented or created outside for allowing communication or collaboration between a self-contained component and external parts (e.g. parts of the application and another component) is not construction code of the component. For example, any external communication code created (e.g. 1135 in FIG. 10b) by external code such as integration logic (e.g. 1033 in FIG. 10b) in a container component is not construction code for the self-containing component (i.e. 1035 or 1036), but communication code of the self-contained component. But this external communication code is construction code of container component 1034.

In other words, construction code includes of communication points (e.g. service functions or coupling methods) for creating communication code. Any external code such as integration logic in a container component uses communication points (i.e. service functions or coupling methods) of the component for creating communication code. So connection points are part of construction code and external communication code created for allowing communications is not part of construction code of self-contained component.

However code implemented for allowing data exchange between objects used in building and for proper operation of a self-contained component is construction code and not communication code. FIG. 5a shows construction code for a self-contained component. For example, code implemented for allowing data exchange between GUI-Obj 502 and DB-Obj 505 for initializing a GUI component is not component communication code but the code is part of component construction code. Likewise, in case of non-web application, code implemented for allowing data exchange or collaboration between GUI-Obj 502 and Algorithm-Obj 504, for example, in response to an event (e.g. mouse or timer) or for processing an external service request is also construction code.

All the interfaces and code implemented behind the interfaces such as functions implemented for providing services for external parts or components are also part of construction code of the self-contained components. All code implemented such as interfaces, code for initiating and requesting external services required by the component is part of its construction code. Of course, since external code provides services requested by a self-contained component, the external code is not part of the construction code of the self-contained component. Any code implemented for performing any internal operations of a self-contained component is construction code. For example, if objects 501 and 502 need to collaborate to perform an operation, such as processing an external service request, whole code implemented for performing the operation is construction code 510. In case of web-applications, the GUI components created by GUI objects 501 and 502 collaborate with each other, but in case of non-web-applications the GUI objects 501 and 502 collaborate with each other.

Any code implemented to allow collaboration or data exchange between objects or subcomponent of a self-contained component is construction code of the self-contained component. For example, if a user event such as mouse click on a bar in 513 requires a visual response from 512, the code implemented for this kind of collaboration or communication between subcomponents 512 and 513 is construction code of component 515. Likewise, code implemented in an Air Traffic control component (See FIG. 18a) that allows communication between an Airplane component 1816 and Info-table 1812 is construction code for the container Air Traffic control component 1800.

On the other hand, a self-component component can implement communication code at design time to collaborate with pre-defined global service objects or external components. In case of a self-contained component using external service objects, such as, registration object, the code implemented inside the self-containing component to register services or lookup and get services is both communication code and construction code depending on the context. For example, if a code of a self-containing component includes of the following code to register its services, which is both construction code and communication code depending on the context:

String ServiceName="Service of Self-containing component";

SRO.registerService(ServiceName, service_object);

Likewise for example, if a code of a self-containing component includes of the following code to request a service of an external pre-defined service-object, which is both construction code and communication code depending on the context. For example, an application may pre-define a global service-object for providing generic services for many components.

String Message="Some Message";

MessageObject.DisplayMessage(code, Message);

Since this kind of code allows self-containing component to communicate with external parts and any changes made to implementation of communication code or external modules providing the services may effect proper collaboration, in that context it is considered communication code. The design and implementation of a self-containing component making an assumption that those external objects (e.g. MessageObject or SRO) will be present in any application, if the application includes the self-containing component depending on those components. This communication code is implemented at the design time of the self-containing component and included within the code of self-contained component, so in that context it is treated as construction code.

In summary any code implemented for performing internal operations of a self-contained component is construction code of the self-contained component. Some indicative operations of a self-contained component include functionality and features implemented such as (i) responding to mouse, keyboard or timer events, (ii) finding and/or requesting and getting external services or (iii) responding to service requests of external parts.

Hence all the code implemented to lookup and getting external services is construction code of a self-contained component. The external service is provided by either another component or module in the application or a JSP running on a remote computer (See FIGS. 15a and 15b). So this external code module is not part of the construction code of the self-contained component. Also code implemented inside a self-contained component for providing services to external parts such as (a) code implemented for fulfilling the service requests and (b) service interfaces such as service functions to be called for requesting the services is construction code.

Any code implemented inside a self-contained component for registering services of the self-contained component with a service registration object is part of construction code, where the registration allows other components to lookup for finding and requesting the services. Alternatively a container component or application can get the service method name of a self-contained subcomponent and register the service with service registration object. In that case the code implemented by container component is just communication code and not construction code of the subcomponent.

Each replaceable self-contained component or RCC/SCC includes of necessary construction code for accessing application data from data sources either (a) local source such as from RDBMS by implementing JDBC/ODBC code for accessing data or (b) remote data sources such as from remote data servers by implementing AJAX, SoA or Web-services methods. In case of non-web applications (e.g. a desktop application), both RCC and SCC are combined into one class-definition and its object-instance, so RCC implements the necessary construction code for accessing data and for constructing various parts or subcomponents of the component. In this disclosure, the term RSCC refers to an SCC module created by an initialized object instance of an RCC (in case of web applications). In case of non-web applications, RSCC refers to an initialized object instance of RCC (since RCC and SCC are same).

In case of the web-applications, each RCC runs on server and creates application code for its SCC, where either (a) RCC may implement construction code for accessing necessary data and for constructing various parts of SCC (e.g. by initializing reusable GUI classes for sub-components just one time on server before generating application code for its SCC) or (b) the generated application code of SCC may include of construction code for accessing necessary data from given remote data sources periodically and for updating or constructing various parts of the SCC (e.g. by updating or inputting data and redrawing GUI sub-components periodically as shown in FIG. 11a). For example, if an SCC needs to be updated whenever data or state is changed, then generated code of SCC must include of construction code to not only get data but also use the data to reconstruct parts or subcomponents of the SCC. But if an SCC may be constructed only once, then RCC can implement necessary construction code for accessing data and for using the data for initializing various parts or subcomponents of the SCC.

If an SCC requires/provides services, then the construction code of RSCC also implements or includes of communication interfaces and coupling methods. The container component or application uses them for creating coupling code for the SCC so that the SCC can collaborate with other parts of the application. Alternatively construction code of each SCC may include of part of communication code to look-up/register services (e.g. FIG. 8b).

In case of the SCCs, there is an important distinction between construction code and communication code. A component can be still self-contained, even if it requires external services for proper operation of the SCC. The communication code allows an SCC to collaborate with external parts For example, in a shopping application, an SCC for shopping item may request service of shopping-cart/invoice-table SCC. The shopping-item SCC may not request the service of shopping-cart SCC, if it is not selected at all or may request the service multiple times, if shopping-item is selected multiple times.

Section-T

Summary about Replaceable and Self-Contained Components

In brief, a self-contained component is a module or object, which can be operated independently outside of the container product without requiring any alterations to the construction of the self-contained component. A replaceable component is a class definition or a module implemented to encapsulate substantial portion of construction code of a self-contained component in order to be used to assemble an instance of self-contained component in an application as a unit. So a replaceable component requires a few lines of initialization and communication code for creating an instance of self-contained component. This ability to operate a self-contained component independently by implementing little or no construction code is useful for evolving the component independently, for example, for refining or fixing shortcomings in the component and testing it independently (before reassembling). Of course, for operating a self-contained component independently requires coupling the component (e.g. implementing communication code) in order for providing services needed by the component and accessing services provided by the component.

A replaceable component is a class (or RCC) definition that encapsulates substantial portion of construction code of a self-contained component (or SCC). Where an instance of an SCC can be included in an application by instantiating an object instance of its RCC and properly initializing the object by implementing remaining few lines of construction code. The properly initialized RCC's object functions as SCC in case of non-web application; while in case of web applications the RCC's object is called to create its SCC.

One of the main design intent of an RCC and its SCC is not only to satisfy unique custom needs of an application but also to easily adoptable to future evolving requirements of the application, for example, by making it easy to replace or by making it easy to refine the RCC/SCC independently. Also allow testing the RCC/SCC independently for example to assure proper operation, interfaces and quality before incorporating into the application. Hence most RCCs are rarely reusable across applications because of many factors or reasons, such as designed to not only satisfy unique current requirements but also must be easy to redesign for satisfying often-unpredictable future custom requirements. In practice, often two applications could not use same data sources such as data-producer, database or database schemas. Since most RCC include of data access code, where the code is implemented to access already existing data sources, proprietary or custom data of an application.

For example, many GIS applications require Air traffic system discussed in above example, but the RCC of City_ATC_RCC might not be reusable because another new application for another country likely having different kind of data source, rules, regulations or database schema. However it is possible to take a copy of City_ATC_RCC source code and redesign the class to properly access data from the data sources of new application. Hence, an RCC might not be readily reusable, but most of the code base created and knowledge gained can be reused for creating similar RCC for any another application. For example, many applications built for a given business domain or vertical such as GIS, insurance or banking requires many similar SCCs, where the difference in functionality, features or operation between any two SCCs likely be no more than 20%. Hence an SCC encapsulated in an RCC can be more easily reused than an SCC that is not encapsulated in an RCC, because collecting all the source code spread across many files (e.g. as illustrated in FIG. 15b or 15c) requires more effort.

If an application is created by assembling RCC/SCC, then it is easier to assure the quality of the application by independently testing each component's quality and compatibility of its interfaces for each of the components. If a large SCC, such as Landmarks or City_ATC, in an application is not encapsulated in an RCC, then it is not possible to test it independently for assuring quality of the SCC outside of the application, so the whole application need to be tested whenever any of the SCC is redesigned to assure overall quality.

Although reusability is not the design intent of the replaceable component classes (or RCC), a small percent of the RCC of large self-contained components (or SCC) such as spell-checker (or an RCC that takes a zip code and creates a city street map) may be readily reusable in more than one application. Very few such large replaceable component classes are also readily reusable across multiple applications and application domains because they only require generic implementation and often don't require both data and code specific to any application, domain or context. Furthermore such a replaceable and reusable component rarely requires application specific modifications for satisfying evolving business needs. For example any changes or improvements made to such replaceable class for one application, likely to be needed by the other applications that are also using the replaceable component. If that is not the case, it is preferable to make a separate copy of the class code and redesign the class implementation for satisfying the unique needs of each new application. Henceforth each copy of the replaceable component class could evolve to satisfy unique evolving needs of respective application.

It is desirable to encapsulate construction code of each large SCC (e.g. CityATC of container component CityLandmarksCF above having subcomponents) in an RCC because: If construction code of an SCC is not encapsulated in an RCC and the code sections of the SCC ends up mixed with code sections of other SCCs and spread across many files (e.g. FIGS. 15b and 15c). Then for example, (a) it is very hard to redesign the SCC independently for example to satisfy evolving business needs or to independently test for assuring its quality after a redesign of the SCC and (b) it is very hard to extract various code sections from many files to get whole construction code of an SCC, for example, for reusing of the code in a new application by redesigning the code of the SCC.

Section-U

Reusable Components Verses Replaceable Components

The reusable components (e.g., reusable GUI Classes or API) are designed to be highly flexible and configurable so that they can be used in many applications without redesigning the code of the reusable component class. Each large reusable component (e.g., a GUI class for a line chart or bar chart) often requires implementing many lines of construction code in the application to configure the component instance to meet unique needs of the application.

Furthermore, each reusable component class is designed to be generic, and hence requires inputting application specific data to initialize and configure its object instance. Application also needs to implement many more lines of construction code, such as code for accessing and processing raw data. Where, all this associated construction code is implemented in the code of application to include a component using a reusable component class. All this custom construction code is implemented outside the reusable class definition. Therefore, all this associated construction code in the application must be removed to remove the resultant fully functional SCC included using the reusable class.

On the other hand, each RCC or RSCC is custom designed to satisfy unique custom needs of just one application, hence can be designed to encapsulate the whole construction code, such as, application logic for accessing specific data (from application specific data sources), processing the data, instantiating and configuring many reusable components. Each RSCC is designed for a specific application, where objective of each RSCC is to minimize the number of lines of code required for an application to include its SCC. So each RSCC is rarely reusable (i.e., without redesign of its code) in more than one application.

Since each RSCC is designed to address a specific problem of a given application, it is possible to create (i) large RSCC including many reusable components (e.g., CityATC may use reusable GUI Classes for Airplanes, Helicopters and GUI controls like Pop-up windows, Charts, Buttons, Text or Info-tables etc.) and (ii) container RSCC (e.g. CityLandMarksRCC 1852 of FIG. 18C) including many large sub-RSCC (e.g. TouristSpots 1856 or Hotels 1854 of FIG. 18C etc) and reusable components.

For example, FIG. 18C illustrates a component-hierarchy of a sample City_GIS application 1860 created using three RCCs (i.e. City map RCC 1851, Landmarks RCC 1852 and Ambulances RCC 1853) for including three RSCCs (i.e. City map RSCC 1861, Landmarks RSCC 1862 and Ambulances RSCC 1863) respectively, where RCC for container-RSCC LandMarks 1852 uses three other RCCs (i.e. Hotels RCC 1854, Theatres RCC 1855 and Tourist spots RCC 1856) for including three sub-RSCCs (i.e. Hotels RSCC 1864, Theatres RSCC 1865 and Tourist spots RSCC 1866) respectively for its RSCC 1862.

A class definition of either a re-usable component class (or RUCC) or a replaceable component class (or RCC) may refer to or depend on many other files such as images or source files (e.g., class files of other components or utilities etc.). Hence the total code base for each of the component class includes all the associated files of the component. Hence to properly get rid of the code base of the component, it is required to clean up or remove the files exclusively associated with the component (since some files may be associated with more than one component) from the rest of the files associated with the application. But it is possible to remove a component from an application by removing object instance of the component and associated code from the code of the application. So it is not necessary to clean up the files of no longer used component classes, but it is desirable to cleanup such unused files.

Example 18

Finer Differences Between The Replaceable & Reusable Components in Another Perspective The difference between the replaceable component classes (or RCC) and re-usable component classes (or RUCC) can be illustrated in another perspective using a borderline component that could be both replaceable component and reusable component. For example a replaceable component (e.g. City Air traffic control RCC CityATC1) is custom designed for a GIS application for City-A. If another GIS application for another city City-B also requires CityATC2, whose requirements matched nearly 95% of what CityATC1 already has. If it requires redesigning the CityATC1 to satisfy unique needs of City-B, then CityATC1 is not a reusable component. Even though 95% of the code of CityATC1 is reused for creating CityATC2, it is just a code reuse and not component reuse.

It is most likely possible to redesign CityATC1 so that it can be configurable to the GIS applications for both city-A and city-B. But such reusable CityATC1 class will be no longer replaceable, if each application require to implement more than few lines of construction code for configuring CityATC1 object. This construction code also includes any code for accessing and processing the configuration data for configuring CityATC1. Also components such as CityATC1 in two applications for two different customers most likely take separate evolutionary paths for satisfying evolving user needs of respective applications in future releases. If that is the likely case, it may not be desirable to make such components reusable, since one of the objectives of RSCC is to satisfy not only current unique needs of its application but also desirable to minimize effort required to adapt to often unpredictable evolving future needs. This example is just to illustrate finer differences between the main objectives of replaceable and reusable components.

Figure 19A:
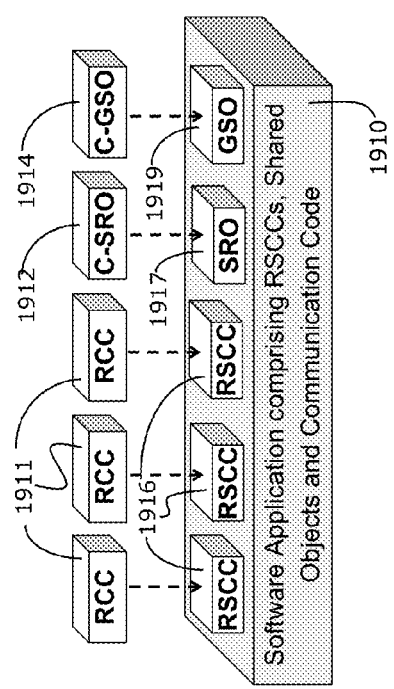
FIGS. 19a-b illustrate a sample configuration of a computing platform for executing the software application including RSCCs, according to one embodiment.

FIG. 19*a* shows a software application 1910 implementing a few lines of code for instantiating and initializing three object instances of RCCs 1911 for including respective RSCCs 1916. The application 1910 includes code for including shares objects by using respective class definitions such as class-definition 1912 for 'Service Registration Object' (SRO) 1917 and class-definition 1914 for Global Shared Object (GSO) 1919, where GSO 1914 includes service methods for displaying message windows or logging of messages. Software application 1910 includes communication code for allowing communication between the RSCCs 1916 and other modules/objects in the software application.

Figure 19B:
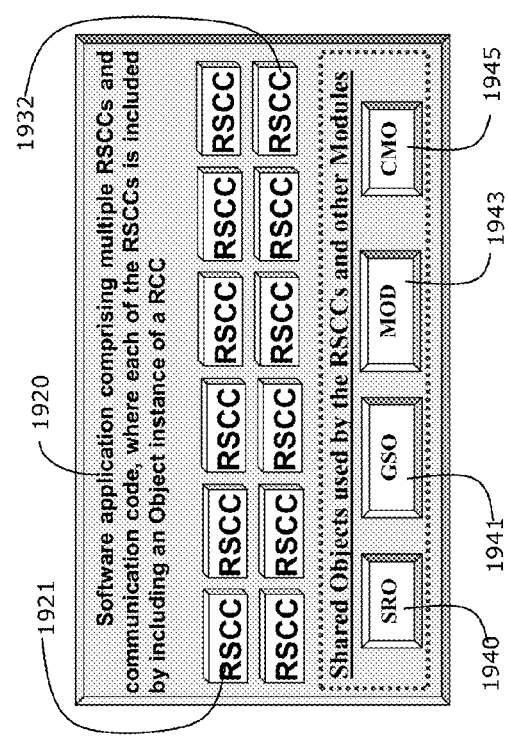

FIG. 19*b* shows a software application 1920 having RSCCs (1921 to 1932), a Service Registration Object (SRO) 1940 and Component Management Object (CMO) 1945 for managing couplings between the RSCCs. The application 1920 includes two shared objects GSO 1941 and MOD 1943 module for miscellaneous services. The application 1920 includes coupling code for allowing communication between some of the RSCCs. Some of the RSCCs include code for using SRO 1940 to access each other's services. Also, some of the RSCCs include code for requesting services of GSO 1941 or MOD 1943.

Figure 20:
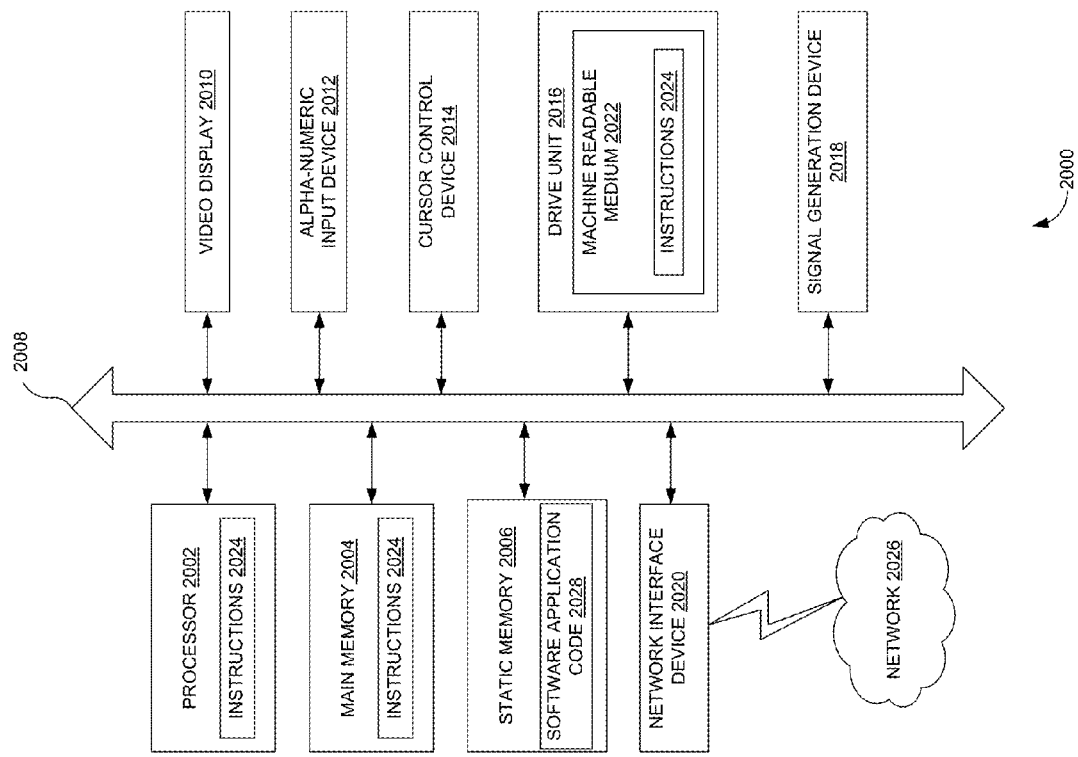
FIG. 20 is a diagrammatic system view of a data processing system in which any of the embodiments disclosed herein may be performed, according to one embodiment.

FIG. 20 is a diagrammatic system view 2000 of a data processing system in which any of the embodiments disclosed herein may be performed, according to one embodiment. Particularly, the diagrammatic system view of FIG. 20 illustrates a processor 2002, a main memory 2004, a static memory 2006, a bus 2008, a video display 2010, an alpha-numeric input device 2012, a cursor control device 2014, a drive unit 2016, a signal generation device 2018, a network interface device 2020, a machine readable medium 2022, instructions 2024 and a network 2026.

The diagrammatic system view 2000 may indicate a personal computer and/or a data processing system in which one or more operations disclosed herein are performed. The processor 2002 may be a microprocessor, a state machine, an application specific integrated circuit, a field programmable gate array, etc. The main memory 2004 may be a dynamic random access memory and/or a primary memory of a computer system. Further, the main memory 2004 also includes a software application code 2028 including multiple large RSCCs. The static memory 2006 may be a hard drive, a flash drive, and/or other memory information associated with the data processing system. Also an application including RSCCs can be stored on a computer readable medium connected to computer using appropriate protocols such as NFS (Network File Server) or SAN (Storage Area Networks).

The bus 2008 may be an interconnection between various circuits and/or structures of the data processing system. The video display 2010 may provide graphical representation of information on the data processing system. The alpha-numeric input device 2012 may be a keypad, keyboard and/or any other input device of text (e.g., a special device to aid the physically handicapped). The cursor control device 2014 may be a pointing device such as a mouse or touchpad. The drive unit 2016 may be a hard drive, a storage system, and/or other longer term storage subsystem.

The signal generation device 2018 may be a BIOS and/or a functional operating system of the data processing system. The network interface device 2020 may perform interface functions (e.g., code conversion, protocol conversion, and/or buffering) required for communications to and from the network 2026 between a number of independent devices (e.g., of varying protocols). The machine readable medium 2022 may provide instructions on which any of the methods disclosed herein may be performed. The instructions 2024 may provide source code and/or data code to the processor 2002 to enable any one or more operations disclosed herein.

In accordance with the above described embodiments with respect to FIG. 20, the system includes a processor 2002, and memory 2004 operatively coupled to the processor 2002, wherein the memory includes a software application code 2028 including multiple large RSCCs having instructions capable of: creating each large RSCC by instantiating and initializing an object instance of a large replaceable component class (RCC) that substantially encapsulates construction code of a self-contained component (SCC), wherein each large RSCC includes about few hundred lines of application specific code, code for accessing application specific data, or code for processing the application specific data, and wherein the multiple large RSCCs includes approximately about 50% of the total application specific code in the software application code, and where at least some of the multiple large RSCCs provide services, consume the services or provide and consume services, and creating coupling code to enable communication between large RSCCs to enable providing services and consuming services. However it is possible that few of the large RSCCs neither provide nor consume services.

An article including a computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

Section-V

Application Specific Code of an Application or RSCC

In the process of building a software application, it is required to create (e.g. design and implement) many lines of code specifically for the application, where all the code created is 'application specific code' for the application. In general, any software programming languages code and other kinds of instructions such as files containing scripts, configuration data that are created in the process of creating an application is application specific code, since such code or contents of files can effect on functionality (e.g. can alter behavior or features) of the application. But code created for other purposes, such as, code (e.g. scripts, data files) created for testing an application is not application specific code, since such code is used only to test the application, but changing the code don't alter the application's features or functionality.

However code associated with API, modules, platforms or components that are not created specifically for an application, but are used in the application are not application specific code for the application. Examples for non-application specific code includes (i) the applications use many pre-built components such as reusable modules, API (e.g. GUI-API or math library) and platforms (e.g. OS or RDBMS), or (ii) an application likely able to use many available modules such as modules created by third parties or code created for using in other software applications, where each module is not specifically created for the application or redesigned specifically for satisfying unique need of the application.

Application specific code of an application includes the union of any kind of code instruction (e.g. programming language code or instructions in configuration or data files that could have any effect on behavior or features of the application) created for the application such as code-sections, modules, files, functions or classes. Where the union of the code instruction is set-theory union, in order to avoid counting same code instruction twice.

1. Any code for application logic or business logic implemented as a part of designing and developing an application (or RSCC) is the application specific code (e.g. FIG. 5a) for the application (or RSCC). An example for application specific code includes code for accessing application data from application specific data sources, processing data and using the data in the application.
2. Code implemented to instantiate and initialize instances of reusable classes or modules, and also code implemented for using the instances. But the application specific code does not include the implementation code of the reusable class or module. The reusable classes or modules are implemented often by third parties and/or independently from the application to be generic and reused in many applications. Examples for reusable classes or modules include reusable GUI classes for the GUI components, math libraries or system libraries etc.
3. Code implemented to use shared objects or general-purpose utilities of the application such as service registration object (e.g. SRO), Request-obj, Session-obj (e.g. see FIG. 4b) and global message service object (e.g. APP_xyz_Services) is application specific code. But the application specific code does not include the implementation code of the classes or modules of the shared objects or general-purpose utility modules (e.g. functions or classes). Since the shared objects or general-purpose utilities are shared by multiple RSCC and other parts of the application, their implementation code is not application specific code (for calculating the application specific code).
4. Any code implemented in functions, modules or classes (e.g. EJB, Algorithm and Configuration etc. see FIGS. 4a and 4c), which are implemented specifically for an application is application specific code for the application. Also if source code of an RSCC or module is obtained from an old application and redesigned the source code for a new application, the union of reused application specific code and redesigned application specific code is counted as application specific code for the new application.
5. All the other miscellaneous code implemented specifically for an application such as code for exchanging data between various parts, event processing or communication code between various components or modules, is application specific code for the application. Another example for miscellaneous code includes, code implemented for customizing various parts of application/RSCC based on user profile and/or preferences is application specific code.

In general, any code (e.g. modules, files or classes) that is designed and implemented in the process of creating a software application is the application specific code for the software application. Any code that is not specifically implemented keeping an application in mind is not application specific code for the application. For example, many reusable classes and modules are not specifically implemented keeping an application in mind.

The total application specific code is union of all the application specific code in all the source files (e.g. programming language code and configuration files etc.) for the application. The union operator is used for determining the total application specific code, so that no code (e.g. lines of code) is counted twice. The total of all the application specific code for all the RSCCs included in an application is union of all the application specific code of all the RSCCs.

Since shared objects such as service registration object (e.g. FIG. 8a or 17), Request-obj, Session-obj (e.g. see FIG. 4b) and global message service object (e.g. refer to APP_xyz_Services above) are used within RSCCs and also outside the RSCCs but with in the applications, their implementation code is excluded from counting in both applications and RSCCs (for avoiding ambiguity). But if an approximate break-up is required for all the RSCCs in an application, then if application specific code for all the RSCCs include of 50% of the total application specific code, then 50% of the implementation code of shared classes may be added to the total application specific code of all the RSCCs. Where adding code of any two means taking a union of code for both.

Hence, total application specific code for an application is union of all the above listed applications specific code. A large application is defined as an application that requires implementing about 8,000 lines or more of application specific code. Total application specific code for all the RSCCs in an application is union of all the applications specific code within each of the RSCCs in the application. A large RSCC is defined as a RCC class that including few hundred lines of application specific code. If an application or container-RSCC (e.g. 710 in FIG. 7a) is created by including one or more sub-RSCC by using sub-RCCs, the total application specific code for the application or container-RSCC includes union of all the application specific code of all the sub-RCCs (e.g. used in code-sections 701, 702 and 703 in FIG. 7a) and any application specific code implemented in the application or RCC of the container-RSCC. So if an container-RSCC, whose RCC implementing just 10 lines of code for include sub-RSCCs still can be large RSCC, if the union of total application specific code of all of its sub-RSCCs exceed few hundred lines of application specific code.

If union of application specific code of all the RSCCs of an application exceeds 50% of total application specific code of the application, then majority-share (or major-part) of the application is said to be designed and implemented as RSCCs or RCCs. Many older applications contain unused code, for example, due to replacing obsolete features by implementing new code, but if old code is not completely removed. Any unused code in an application must not be counted as application specific code for the application, when determining total percent of application specific code encapsulated in all of the RSCCs in the application.

If a set of software applications or systems are created from a common source code base (e.g. files, modules or classes) and furthermore the features and functionality of many components in each of the applications varies slightly from similar component in another application in the set of applications, then such set of applications are called product-family or product-line. Building such family of software applications from a common source code base is called product-family of product-line engineering, where each application in the family is created by configuring and/or redesigning various modules/components from the common source code base. For example, Nokia using such product-family engineering method for building OS and applications for various models of cell-phones it designs each year.

It is possible to build such product families by using RSCCs. It is possible to use product line engineering methods for RSCCs, if multiple applications are using nearly similar SCC-instances of a component, where functionality or features of the SCC-instances differs or varies not significantly between the applications in the product-family. In case of certain components, it is possible to encapsulate construction code of both commonalities and variances of the SCC-instances in a reusable class. For example, it is possible to create such a reusable class, if data source for the SCC-instances is fixed or standardized (e.g. City street map), or the component needs little or no application specific data. To implement such a reusable class for a component, it requires documenting both commonalities, and variances of each of the SCC-instances of each application. The reusable class for the component is implemented so that it can include a SCC-instance that support all the common features and also allow configuration of each SCC-instance to satisfy feature variances required by each application. Then each application can build its own RCC that implements code to instantiate a SCC-object of the reusable class and also remaining construction code to configure the SCC-object to satisfy its unique needs (i.e. feature-variances).

Since the code implemented for such a reusable class specifically designed just for one product-family, where applications in the family are created from a common code base, the reusable class code need to be counted as application specific code in each of the application and in the RSCC in the application. This is an exception, where code for such a reusable class is counted as application specific code of an application or RSCC, if application or RSCC is using the reusable class. Also if a reusable component class is designed and implemented specifically for an application or RSCC, then the code implemented for the reusable class is application specific code for the application or RSCC. For example, if no suitable reusable GUI class for Airplane is available for an Air Traffic control application and a reusable GUI class for Airplane is created, then the class code is application specific code for the Air Traffic control application.

It is often desirable to modularize large portion of the total code designed and developed for an application (i.e. application specific code) in to modules that possess higher degree of autonomy. In general the SCCs posses higher degree of autonomy and possible to reduce couplings effort by creating simpler coupling interfaces. Hence one of the preferred embodiments encapsulates application specific code required for the SCCs in RCCs. For example, if sample CityGIS application presented in Example 15, in Section-L is designed to modularize nearly 90% of the application specific code into multiple RCCs, then only about 10% of the total application specific code is left un-modularized. Each RCC may be refined and tested with higher degree of autonomy. If one of the SCCs is not encapsulated in a RCC, the application specific construction code of the SCC likely mixed with other un-modularized code of the application, which requires more effort to find construction code of the SCC for refining (e.g. to add a feature or fix a bug) and testing the SCC after refining its code.

In one of the preferred embodiments, RCCs are designed for better modularization of the total application code, as explained: In this embodiment, each RCC is custom designed for a specific application keeping in mind unique needs and context of the application. For example, each RCC for an application can use any of the shared utilities and objects (e.g. Global service objects such as 'SRO' or APP_xyz_Services discussed above), which are part of the application context. The RCC is designed to have autonomous code base, which is a set of exclusive files including most of the application specific code of its RSCC. In more than one RSCC or application is using certain files (e.g. configuration or images) or files associated with modules (e.g. utilities such as SRO APP_xyz_Services), those files cannot be part of the exclusive code base for any one of the RSCC. The RCC is designed to minimize number of lines of code a container component or application required to create for including its RSCC, for example, to reduces effort required to remove the RSCC or replace the RSCC with a new version of RSCC.

If code-sections for constructing each large SCC of an application are not encapsulated in a RCC, it requires lot more work to create and test a new version of SCC by using the exiting code-sections. For example, it needs more error prone work to find the code-sections created for constructing the SCC, if the code-sections are mixed with other application code and spread across many files, where each file likely contains other application specific code of the application or other RSCCs. If some of the code-sections of the SCC are redesigned for creating a new version of SCC by adding or refining features or functionality, it is not possible to test the new SCC autonomously away from the application. For example, if the code base of a SCC is encapsulated in a RCC, its RSCC can be tested autonomously by creating a test application that just provides required services by the SCC and consumes services provides by the SCC.

If the code base (e.g. application specific code for construction) of an SCC is not encapsulated in a RCC that having autonomous code base (e.g. an exclusive set of files including application specific code for the SCC), it requires more effort to extract and reuse the code base of the SCC, for example, if another application requires about 80% of the features or functionality implemented in the SCC but need to refine, remove or add remaining 20% of the features or functionality for creating a new SCC for the another application (or a newer version of SCC for its application).

Section-W

Use of the Method and System of the Present Invention

The method is used to build a wide range of reusable GUI container CCGs that implement complex GUI-Metaphors such as On-Line Analytical Processing Cubes (OLAP-Cubes), shopping-carts, master-detail tables for database applications, GPS-maps, and air-traffic control systems. Also, it is possible to support reusable GUI container CCGs for simulation of DNA/Genetic composition, visual representations of chemical formulas and online games. It is possible to implement custom application specific ACCGs, which isolate and encapsulate the code of application logic for custom-creating each subcomponent. The reusable GUI container CCGs encapsulate the code of integration logic and automate the integration of subcomponents.

In the preferred embodiment of the present invention, Java is used on the server side, and W3C's SVG and JavaScript, which is an XML-based presentation language, is used on the client side. Any programming language such as .NET/C# on the server side, and any XML based presentation languages such as Adobe's MXML/Flex or XAML implemented in the Avalon subsystem of Vista Windows Operating Systems can be used on the client side to achieve the same goal.

XML includes a feature known as the Document Object Model (DOM), which is an API (application programming interface) for HTML and XML documents (e.g. to manipulate the elements in the XML documents). The DOM defines the logical structure of documents and the way the elements in a document is accessed and manipulated. The DOM allows programmers to build documents that may contain navigation structure and methods for adding, modifying, or deleting elements and content. Many objects found in an HTML or XML document can be accessed, changed, deleted, or added using the DOM. Documents are modeled using objects, and the model encompasses not only the structure of a document, but also the behavior of a document and the objects (e.g., GUI elements and components) of which it is composed. This invention is intended to cover this method used under the Avalon subsystem. The XAML/SilverLight is expected to support similar or equivalent features of the XML based graphical elements.

The approach to declaring graphical elements is commonly referred to as declarative GUI programming. The XML based graphical technologies such as XHTML/DHTML, XAML, SVG, VML, X3D and SMIL fall under this category. They are ideally suited for representing or dynamically building larger component hierarchy in the XML Tree. Each of the sub-trees in the XML tree may represent a component. Each of the sub-trees of the component tree represents its subcomponents. This tree of components and component-hierarchies is created by program and dynamically manipulated in runtime on client.

The code generated for the application component may include any of the technologies to present the component on any platform running a browser, a viewer or other equivalents. The invention may be practiced with any of the commercial browsers which support at least one of the XML-graphical formats or namespaces. Understanding the specifications of programming languages/technologies used on a platform, any person skilled in the programming art can design CCGs and ACCGs to achieve the same results for the platform according to the teaching of this disclosure. While most of the CCGs in the examples are presented in the Java language, it is not so limited. If a container CCG is built in C++ or other suitable programming languages, the CCG objects of sub-components are inputted to the container CCG by any method supported in the languages. However, the different languages may require the library of basic components for presenting them.

In case of a non-web application, the RCCs for an application can be created using any Object-oriented programming language such as Java, C# or C++. Incase of non-web GUI application, each RCC for a GUI_SCC uses reusable classes for GUI components for presenting GUI sub-components in the SCC. Although many modern underlying platforms (e.g. Adobe's Flash/AIR or Microsoft's SilverLight) have no inherent limitations, most of the other higher-level GUI APIs are not capable of encapsulate large SCCs such as CityLandmarks or CityATC in a class definition for creating RCCs, where a GUI API is a library of software modules and components including a set of reusable class for GUI components and/or other utilities.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

COMPACT-DISC APPENDIX

Two (2) identical Compact Disc-Recordables (Copy 1 and Copy 2), containing computer program listings, pursuant to 37 C.F.R. 1.77 and 1.96, constitute a part of the specification of this invention and is incorporated by reference herein for all purposes. The CD discs were created on Jun. 19, 2009, with ASCII Carriage-Return/Line-Feed as line terminators, conform to the ISO 9660 standard, include two identical files: Appendices_c_file1.txt and Appendices_c_file2.txt, each of which is of 91821 bytes, and contains the code for the following programs.

A. Application code of RotateBanner in SVG and JavaScript;
B. Application code of Show_layer in SVG and JavaScript;
C1. Application code of code for testing Service Registration Object (SRO) in JavaScript and SVG;
C2. Application code of Registration Class for SRO in JavaScript (.js);
D1. Source code of AgileTemplate class in Java;
D2. Source code of AC_Info class in Java;
D3. Source code of UniqStrId class in Java;
D4. Source code of AppConfigInfo class in Java;
E. Source code of Rotate banner in Java;
F. Source code of subcomponents in JSP;
G. Source code of ShowLayer in Java;
H. Source code of RB_DDL_IntTemp in Java
I. Source code of rb_ddl_it_stocks for Stock-info in JSP
J. Source code of rb_ddl_it_weather for Weather-info in JSP
K1. Source code of RadioButtons application code in SVG;
K2. Source code of RadioButtons class definition in Java;
L. Source code of CheckBoxes class definition in Java;
M. Source code of RB_RB_IntTemp in Java;
N. Source code of SL_CB_IntTemp in Java;
O. Source code of rb_rb_example.jsp in JSP;
P1. Source code of Airplane.svg in SVG;
P2. Source code of Airplane_class.js in Java Script;
P3. Source code of Airplane class definition in Java;
P4. Source code of AirlinerCF class definition in Java;
Q1. Source code of flight_example.jsp in JSP;
Q2. Source code of flight2_example.jsp in JSP;
Q3. Source code of ATC_CF replaceable component class in Java;
Q4. Source code of atc_example.jsp in JSP;
R1. Source code of DrawingArea class definition in Java;
R2. Source code of canvas_test.jsp in JSP;
S1. Source code of get_info.jsp in JSP;
S2. Source code of get_loc.jsp in JSP;
S3. Source code of get_info_table.jsp in JSP;
T. Source code of Webservices_class.js in JavaScript;
U1. Source code of SRO_CallBacks sample pseudo code in text;
U2. Source code of ReplaceableComponent abstract class in Java; and
V. Read me text provides instructions for using the above files for either for practicing or testing some of the application code of GUI components, GUI CCG classes and replaceable component for ATC (Air Traffic Control).

What is claimed is:

1. A computer implemented method for creating a software application code including multiple Replaceable Self-Contained Components (RSCCs), wherein the software application code facilitates communication between the multiple RSCCs using a service registration object, comprising:
creating each RSCC by instantiating and initializing an object instance of a Replaceable Component Class (RCC) that substantially encapsulates construction code of a Self-Contained Component (SCC), wherein the multiple RSCCs comprise a first set of RSCCs that provide services and a second set of RSCCs that consume the services provided by the first set of RCCSs;
creating an RSCC registration module which resides in each of the first set of RSCCs for registering each of the services provided by each of the first set of RSCCs with the service registration object; and
creating an RSCC service finding module which resides in each of the second set of RSCCs for consuming each of the services provided by one of the first set of RSCCs for facilitating communication between the multiple RSCCs in the software application code upon an event selected from the group consisting of a user event, a sensor event, a timer event, and a data/state change event, and an event/call sent to one of the multiple RSCCs in the software application code from a code section that is external to the one of the multiple RSCCs.

2. The computer implemented method of claim 1, wherein registering each of the services provided by each of the first set of RSCCs with the service registration object, comprises:
registering each of the services by the RSCC registration module using a pre-defined lookup-key of a service function or service object, wherein the service function or service object is called or used to obtain the service.

3. The computer implemented method of claim 1, wherein creating the RSCC service finding module which resides in each of the second set of RSCCs for consuming each of the services provided by one of the first set of RSCCs, comprises:
obtaining each of the services by the RSCC finding module using a pre-defined lookup-key of a service function or service object and calling the service function or service object.

4. The computer implemented method of claim 1, further comprising:
detecting unavailability of a service required by one of the second set of RSSCs by the service registration object.

5. The computer implemented method of claim 1, further comprising:
detecting unused one or more services registered by the first set of RSSCs by the service registration object.

6. The computer implemented method of claim 1, further comprising:
detecting incompatible communication interfaces between service providing the first set of RSCCs and the second set of RSCCs.

7. The computer implemented method of claim 1, wherein one of the multiple RSCCs comprises multiple graphical user interface (GUI) subcomponents, and wherein the GUI subcomponents are included using reusable GUI classes.

8. The computer implemented method of claim 1, wherein at least one of the multiple RSCCs comprises one or more sub-RSCCs as subcomponents.

9. The computer implemented method of claim 1, wherein the service registration object outputs a list of communication interfaces of an RSCC.

10. The computer implemented method of claim 1, wherein at least one of the multiple RSCCs comprises one or more instances of reusable components, application specific logic, and code for accessing data from application specific data sources.

11. A method of creating a software application code including multiple Replaceable Self-Contained Components (RSCCs) comprising large RSCCs and medium RSCCs, comprising:
creating each RSCC by instantiating and initializing an object instance of a Replaceable Component Class (RCC) that substantially encapsulates construction code of a Self-Contained Component (SCC),
wherein the software application code comprises at least 9000 lines of total application specific code and application specific code of the multiple RSCCs comprises at least 50% of the total application specific code in the software application code, or the software application code comprises at least one of (i) at least ten large RSCCs or (ii) any combination of at least twenty large RSCCs and medium RSCCs,
wherein each large RSCC comprises at least a couple of hundred lines of the application specific code, code for accessing application specific data, or code for processing the application specific data, and each medium RSCC includes at least a hundred lines of the application specific code, and
wherein at least some of the multiple RSCCs provide services, consume the services, or provide and consume the services; and
creating coupling code to enable communication between the multiple RSCCs to enable providing the services and consuming the services.

12. The method of claim 11, wherein creating the coupling code to enable communication between the multiple RSCCs to enable providing the services and consuming the services, comprises:
creating an RSCC registration module which resides in each RSCC for registering each of the services provided by each of a first set of RSCCs with a service registration object; and
creating an RSCC service finding module which resides in each of a second set of RSCCs for obtaining required services provided by one of the first set of RSCCs for facilitating communication between the multiple RSCCs in the software application code upon an event selected from the group consisting of a user event, a sensor event, a timer event, and a data/state change event, and an event/call sent to one of the multiple RSCCs in the software application code from a code section that is external to the one of the multiple RSCCs.

13. The method of claim 11, wherein creating the coupling code to enable communication between the multiple RSCCs to enable providing the services and consuming the services, comprises:
creating a required communication code between a first RSCC and a second RSCC of the multiple RSCCs.

14. The method of claim 13, wherein creating the required communication code between the first RSCC and the second RSCC, comprises:
creating a call back function in the software application code to call a service associated with the first large RSCC and registering the call back function with the second RSCC for requesting the service.

15. The method of claim 13, wherein creating the required communication code between the first RSCC and the second RSCC, comprises:
creating the software application code for getting a service method of the first RSCC from its RCC instance and inputting the service method into an RCC instance of the second RSCC, wherein the second large RSCC accesses a service associated with the first RSCC by calling the service method.

16. The method of claim 11, wherein at least one of the multiple RSCCs comprises one or more sub-RSCCs as sub-components.

17. The method of claim 11, wherein at least one of the multiple RSCCs comprises one or more instances of reusable components, application specific logic, and code for accessing data from application specific data sources.

18. The method of claim 11, wherein one of the multiple RSCCs comprises multiple graphical user interface (GUI) subcomponents, and wherein the GUI subcomponents are included using reusable GUI classes.

19. A method of executing a software application code including multiple Replaceable Self-Contained Components (RSCCs) on a computing platform, wherein the software application code facilitates communication between the multiple RSCCs using a service registration object, wherein each RSCC is created by instantiating and initializing an object instance of a Replaceable Component Class (RCC) that substantially encapsulates construction code of a Self-Contained Component (SCC), and wherein the multiple RSCCs comprise a first set of RSCCs that provide services and a second set of RSCCs that consumes the services provided by the first set of RCCSs, comprising:
registering each of the services provided by each of the first set of RSCCs with the service registration object by using an RSCC registration module residing in each of the first set of RSCCs; and
obtaining the service registration object for the services provided by each of the first set of RSCCs by the second set of RSCCs for facilitating communication between the multiple RSCCs in the software application code by an RSCC service finding module residing in each of the second set of RSCCs upon an event selected from the group consisting of a user event, a sensor event, a timer event, and a data/state change event, and an event/call sent to one of the multiple RSCCs in the software application code from a code section that is external to the one of the multiple RSCCs.

20. A non-transitory computer-readable storage medium for creating a software application code including multiple Replaceable Self-Contained Components (RSCCs), wherein the software application code facilitates communication between RSCCs using a service registration object having instructions that, when executed by a computing device, cause the computing device to perform a method comprising:
creating each RSCC by instantiating and initializing an object instance of a Replaceable Component Class (RCC) that substantially encapsulates construction code of a Self-Contained Component (SCC), wherein the multiple RSCCs comprise a first set of RSCCs that provide services and a second set of RSCCs that consume the services provided by the first set of RCCSs;
creating an RSCC registration module which resides in each of the first set of RSCCs for registering each of the services provided by each of the first set of RSCCs with the service registration object; and
creating an RSCC service finding module which resides in each of the second set of RSCCs for consuming each of the services provided by one of the first set of RSCCs for facilitating communication between the multiple RSCCs in the software application code upon an event selected from the group consisting of a user event, a sensor event, a timer event, and a data/state change event, and an event/call sent to one of the multiple RSCCs in the software application code from a code section that is external to the one of the multiple RSCCs.

21. A non-transitory computer-readable storage medium for creating a software application code including multiple Replaceable Self-Contained Components (RSCCs) comprising large RSCCs and medium RSCCs having instructions that, when executed by a computing device, cause the computing device to perform a method comprising:
creating each RSCC by instantiating and initializing an object instance of a Replaceable Component Class (RCC) that substantially encapsulates construction code of a Self-Contained Component (SCC),
wherein the software application code comprises at least 9000 lines of total application specific code and application specific code of the multiple RSCCs comprises about at least 50% of the total application specific code in the software application code, or the software application code comprises at least one of (i) at least ten large RSCCs or (ii) any combination of at least twenty large RSCCs and medium RSCCs, wherein each large RSCC comprises at least a couple of hundred lines of the application specific code, code for accessing application specific data, or code for processing the application specific data, and each medium RSCC includes at least a hundred lines of the application specific code, and wherein at least some of the multiple RSCCs provide services, consume the services, or provide and consume the services; and creating coupling code to enable communication between the multiple RSCCs to enable providing the services and consuming the services.

22. The non-transitory computer-readable storage medium of claim 21, wherein at least one of the multiple RSCCs comprises one or more instances of reusable components, application specific logic, and code for accessing data from application specific data sources.

23. A system for creating a software application code including multiple Replaceable Self-Contained Components (RSCCs) comprising large RSCCs and medium RSCCs, comprising:

a processor; and a memory operatively coupled to the processor, wherein the memory includes a software application code including multiple RSCCs having instructions capable of:

creating each RSCC by instantiating and initializing an object instance of a Replaceable Component Class (RCC) that substantially encapsulates construction code of a Self-Contained Component (SCC), wherein the software application code comprises at least 9000 lines of total application specific code and application specific code of the multiple RSCCs comprises at least 50% of the total application specific code in the software application code, or the software application code comprises at least one of (i) at least ten large RSCCs or (ii) any combination of at least twenty large RSCCs and medium RSCCs, wherein each large RSCC comprises at least a couple of hundred lines of the application specific code, code for accessing application specific data, or code for processing the application specific data, and each medium RSCC includes at least a hundred lines of the application specific code, and wherein at least some of the multiple RSCCs provide services, consume the services, or provide and consume the services; and creating coupling code to enable communication between the multiple RSCCs to enable providing the services and consuming the services.

24. The system of claim 23, wherein at least one of the multiple RSCCs comprises one or more instances of reusable components, application specific logic, and code for accessing data from application specific data sources.

* * * * *